US007352972B2

(12) United States Patent
Franklin

(10) Patent No.: US 7,352,972 B2
(45) Date of Patent: Apr. 1, 2008

(54) METHOD AND APPARATUS FOR THE ZONAL TRANSMISSION OF DATA USING BUILDING LIGHTING FIXTURES

(75) Inventor: Philip G. Franklin, Anaheim, CA (US)

(73) Assignee: Convergence Wireless, Inc., Corona del Mar, CA (US)

( * ) Notice: Subject to any disclaimer, the term of this patent is extended or adjusted under 35 U.S.C. 154(b) by 196 days.

(21) Appl. No.: 11/351,308

(22) Filed: Feb. 9, 2006

(65) Prior Publication Data

US 2006/0275040 A1 Dec. 7, 2006

Related U.S. Application Data

(63) Continuation-in-part of application No. 11/154,317, filed on Jun. 16, 2005, now abandoned, and a continuation of application No. 10/956,449, filed on Oct. 1, 2004, now abandoned, and a continuation of application No. PCT/US04/33078, filed on Oct. 1, 2004, which is a continuation-in-part of application No. 08/997,570, filed on Dec. 23, 1997, now Pat. No. 7,006,768.

(60) Provisional application No. 60/034,176, filed on Jan. 2, 1997.

(51) Int. Cl.
*H04B 10/00* (2006.01)

(52) U.S. Cl. ........................ 398/172; 398/127; 398/130

(58) Field of Classification Search ........ 398/118–131, 398/172
See application file for complete search history.

(56) References Cited

U.S. PATENT DOCUMENTS

| 3,900,404 | A | * | 8/1975 | Dachs | ........................ 398/172 |
| 4,355,309 | A | * | 10/1982 | Hughey et al. | ........ 340/825.53 |
| 4,493,114 | A | | 1/1985 | Geller | |
| 4,656,475 | A | * | 4/1987 | Miller et al. | ........... 340/825.57 |
| 4,856,090 | A | | 8/1989 | Kitani et al. | |
| 4,937,586 | A | * | 6/1990 | Stevens et al. | ............. 343/702 |
| 4,962,466 | A | * | 10/1990 | Revesz et al. | ................. 705/14 |
| 5,148,158 | A | * | 9/1992 | Shah | ......................... 340/3.7 |
| 5,193,201 | A | * | 3/1993 | Tymes | ....................... 708/191 |
| 5,321,542 | A | | 6/1994 | Freitas et al. | |
| 5,424,859 | A | * | 6/1995 | Uehara et al. | .............. 398/127 |
| 5,506,715 | A | * | 4/1996 | Zhu | ........................... 398/111 |
| 5,635,915 | A | * | 6/1997 | Gray | ..................... 340/825.57 |
| 5,657,145 | A | * | 8/1997 | Smith | ......................... 398/172 |
| 5,661,468 | A | * | 8/1997 | Marcoux | .................... 340/7.1 |

(Continued)

Primary Examiner—Agustin Bello
(74) Attorney, Agent, or Firm—William G. Lane

(57) ABSTRACT

This invention relates to the zonal transmission of data by radio means and optionally by optical means through the modulation of light from common building light fixtures, including the light output of fluorescent, mercury vapor, and other arc or discharge lamps and fixtures; a system for the reuse of radio frequencies by smart radios, and the accurate locating and tracking of objects or persons as they move through a building; by means of creating a communications system which exploits the existing infrastructure of a building to facilitate the transmission of relatively secure control and communications data via creation of a multiplicity of area-limited interference-free communication zones. The system facilitates the transmission of wide-area as well as zonal-specific data. The system facilitates the creation of a database that contains present location and history location and movement data of persons and objects as they move through a building.

20 Claims, 26 Drawing Sheets

U.S. PATENT DOCUMENTS

| | | | |
|---|---|---|---|
| 5,719,567 A | 2/1998 | Norris | |
| 5,726,644 A * | 3/1998 | Jednacz et al. | 340/825.52 |
| 5,838,116 A * | 11/1998 | Katyl et al. | 315/307 |
| 5,903,373 A | 5/1999 | Welch et al. | |
| 5,910,653 A * | 6/1999 | Campo | 250/214 AL |
| 5,959,754 A * | 9/1999 | Sakurai et al. | 398/99 |
| 6,198,230 B1 | 3/2001 | Leeb et al. | |
| 6,310,440 B1 * | 10/2001 | Lansing et al. | 315/149 |
| 6,400,482 B1 | 6/2002 | Lupton et al. | |
| 6,426,599 B1 | 7/2002 | Leeb | |
| 6,504,633 B1 | 1/2003 | Hovorka et al. | |
| 6,794,831 B2 | 9/2004 | Leeb et al. | |

* cited by examiner

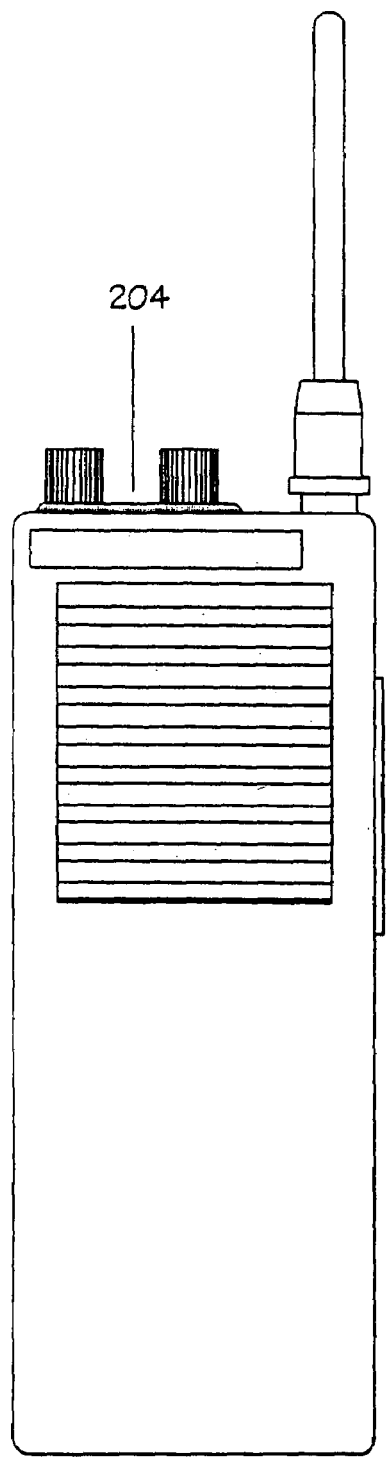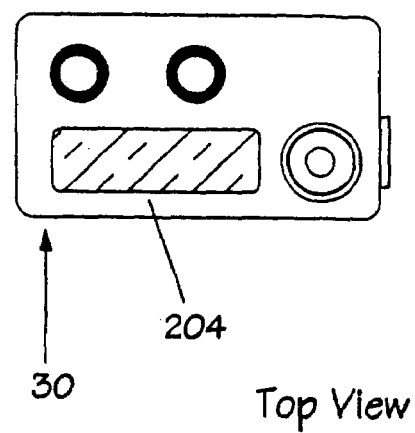
FIG. 16B
FIG. 16A

T8 Version

T12 Version

METHOD AND APPARATUS FOR THE ZONAL TRANSMISSION OF DATA USING BUILDING LIGHTING FIXTURES

This patent application is (1) a continuation of U.S. patent application Ser. No. 10/956,449 filed on Oct. 1, 2004 now abandoned, which is a continuation-in-part application of U.S. patent application Ser. No. 08/997,570 filed Dec. 23, 1997 now U.S. Pat. No. 7,006,768, which claims priority on Provisional Application No. 60/034,176 filed Jan. 2, 1997; and (2) a continuation-in-part of U.S. patent application Ser. No. 11/154,317 filed Jun. 16, 2005 now abandoned, which is a continuation of U.S. patent application Ser. No. 08/997,570 filed Dec. 23, 1997 now U.S. Pat. No. 7,006,768, which claims priority on Provisional Application No. 60/034,176 filed Jan. 2, 1997; and (3) a continuation of pending PCT International Application No. PCT/US04/33078 filed on Oct. 1, 2004, which claims priority on pending U.S. patent application Ser. No. 10/956,449, which is a continuation-in-part of U.S. patent application Ser. No. 08/997,570 filed Dec. 23, 1997, which claims priority on Provisional Application No. 60/034,176 filed Jan. 2, 1997.

BACKGROUND

1. Field of Invention

This invention relates to the transmission of data by the modulation of the light output of fluorescent and other arc lamps; including the visible or invisible light output of fluorescent lamps, neon lamps, mercury vapor lamps, high or low-pressure sodium lamps, or other high-intensity discharge lamps, or any metal-halide based lamps.

This invention also relates to radio communication devices, more particularly to microprocessor controlled radio communication devices operating in and around buildings.

This invention also relates to the art of transmission of data, covering a limited area, by the modulation of a low-output radio transmitter, which is powered by the light output of fluorescent or other lamps; including the visible or invisible light output of lamps. The transmitter is designed to be small, inexpensive, and easy to install.

2. Description of Prior Art

Several methods for the transmission and reception of data messages exists. Many of these have application to offices, factories, and to buildings or complexes of buildings in general. For example, low-powered radio transmission can be used to transmit and receive data messages within a building, or the optical and infrared spectrum can be used for the transceiving of data.

However, the use of radio frequencies requires licensing and coordination for their use. Given the overcrowded radio spectrum in some areas, said licensing may be nearly impossible. In addition, while radio facilitates the transmission of data, in general that data transmission is limited in bandwidth and therefore limited in the speed of transmission. Additionally, radio energy is hard to confine, and there it is not practical to limit data transmission to the confines of any one building or office within a building or office.

In contrast, infrared transmission of data has the benefit of no licensing requirement, higher available bandwidth, and ease of confinement. However, as infrared energy is not transparent to walls or other structures, the cost of installation of an independent building-wide infrared-based transmission system is extreme. That is, each office and hallway within a building must be equipped with one or more infrared transmitters in order to provide coverage to the entire building. Each infrared transmitter will require lines for it's operating power and a data line for the data that is to be transmitted, thus requiring a supporting infrastructure that is both extensive and expensive.

In addition to wireless optical transmission as examined above, several examples exist of using modulated light in conjunction with optical fibers for the transmission of data, but these do not lend themselves to application to devices that are portable or mobile within buildings or offices.

Radio communications devices typically found in the present day business environment include one and two-way radio pagers; traditional, SMR (Specialized Mobile Radio) and "trunked" two-way radios; Cellular and PCS radiotelephones; and a wide-range of other radio devices.

These devices can be operated on either privately-owned radio systems, or on systems owned and operated by an RCC (Radio Common Carrier) or CCC (Communications Common Carrier) [a "Public Carrier"]. Public Carrier systems tend to cover large service areas often including several counties, states, or more. Indeed, some Public Carriers offer services that cover the entire U.S., Europe, or the world.

Today it is common to see pagers sold over the counter at retail and wholesale stores. While the buyer typically purchases the pager out-right, the wide-area paging service of the Public Carrier is typically leased. A user commonly enters into a contract for services by the Public Carrier on a month-to-month or yearly basis.

While Public Carrier systems tend to cover large geographic areas, private systems, for reasons of licensing and the high initial cost of equipment, tend to be limited to servicing small geographic areas.

Many private systems are designed to provide coverage to pagers and radios located within just one building or a set of buildings. That is, many private radio systems are designed to limit their coverage to radios and radio users who are in or around a particular high-rise, office building, or factory (an "In-House" system).

Since the expense involved in building a private radio system that covers a large geographic area can exceed hundreds of thousands of dollars, the services that a Public Carrier provides are deemed adequate by the vast majority of large-area services users. In such services, delays of up to five minutes can be expected given the large areas served, and given that the user is typically one of thousands or millions who must share the same radio frequency.

In contrast, in In-House systems (such as those used for the day-to-day operations of a factory or high-rise business office,) such time delays are unacceptable and cannot be tolerated. Short time-delays of even one minute prohibit Public Carrier-serviced pagers from being used for many applications such as rapid notification of incoming phone calls, rapid notification of e-mail messaging, equipment status messaging, and other sophisticated In-House communications services.

Because of technical and practical limitations, most pagers are utilized for either In-House radio paging service, or for Public Carrier wide-area paging service; but not both. Indeed, there are several users who carry two pagers on their person: one for the In-House system, and one for the wide-area Public Carrier system.

What is lacking is a pager that can concurrently receive Public Carrier generated wide-area paging signaling, and locally generated In-House paging signaling, without interference; and with minimal use of the over-crowded radio spectrum.

In a similar manner, cellular telephones lack the ability to operate on private In-House systems. Because of technical problems such as co-channel interference, cellular radio-telephones typically operate only on one of two Public Carrier cellular systems in any one geographical area.

Co-channel interference is especially a problem on radio control-channels utilized for the transmission of cellular system control data. Any radio interference on the control channel will cause the system to loose control of the radio device, and therefore incomplete or improper operation of the transmitting device may occur. Because private In-House systems will necessarily operate in close proximity to each other, co-channel interference and other types of harmful interference will likely occur. Therefore, private In-House systems thus far have not been granted licensing by the FCC.

Public Carrier cellular system fees are prohibitively high for most private In-House applications. Yet, many Public Carrier cellular users, when inside their office, would like to use their radio-telephones as their office telephone.

What is lacking is a solution that allows cellular radio-telephones to operate on existing Public Carrier cellular services, and yet facilitate the radio-telephone's cost effective use when in range of an In-House private system.

This invention proposes to combine radio-wave communications circuitry for Public Carrier wide-area services, and optical-wave communications circuitry for local In-House services; into one communications device.

Several authors have proposed optical, radio, or mixed optical and radio systems or components that may be of interest, but fail to teach the art contained in this invention. Observe and consider the following:

Several methods for the transmission and reception of data messages exists. Many of these have application to offices, factories, and to buildings or complexes of buildings in general.

However, the use of radio frequencies generally requires licensing and coordination for their use. Given the overcrowded radio spectrum in some areas, said licensing may be nearly impossible. In addition, while radio facilitates the transmission of data, in general that data transmission is limited in bandwidth and therefore limited in the speed of transmission. Additionally, medium-to-high power radio energy is hard to confine, and therefore is not practical to limit data transmission to the confines of any one building or office within a building or office.

In contrast, low-power radio transmission of data has the benefit of no licensing requirement, higher available bandwidth, and ease of confinement. However, in the past, the cost of installation of an independent building-wide low-power radio-based transmission system was high. That is, each office and hallway within a building must be equipped with one or more low-power radio transmitters in order to provide coverage to the entire building. Each low-power radio transmitter requires lines for it's operating power and a data line for the data that is to be transmitted, thus requiring a supporting infrastructure that is both extensive and expensive.

SUMMARY OF INVENTION

This invention proposes to enclose low-power radio transmitters or optical transmitters into clip-on housings, or other similar ease of mounting housings. The output from these transmitters is modulated with control, location, and other data messages. The modulated light or radio signal is then received by various types and configurations of devices, and used for the determination of their location, to control their operational parameters, or to simply receive data messages.

The operational power for these transmitters will be derived from the output of solar cells or solar batteries. These light-to-electrical energy converting devices will receive their light energy from the lamp bulb their either clipped to, or otherwise mounted next to.

The use of fluorescent lamps and lighting has been widespread in the consumer and industrial market for many years. The vast majority of office buildings and high rises make use of florescent and other lighting by light fluorescent fixtures in a grid-like fashion throughout lobby areas, private office space, open planning areas, conference rooms, and hallways. Thus, many buildings have a zonal lighting X-Y grid system that if properly utilized represents an important infrastructural system already in place. I propose to utilize that existing Cartesian infrastructure for the creation of a zone-based data transmission system for use within an office or building, and for supplying the energy needed to power these transmitting devices.

In addition, I propose to utilize that existing infrastructure for the determination of the location of users location within an office or building through the automatic and transparent optical, medium-power radio or low-power radio reporting of which radio or optical transmitter is closest to a person or other target that is being sought. In this way, the position of a user or target can be determined with greater accuracy than that afforded by indoor radio triangulation or even GPS means (if indoor GPS were practical).

In addition to data transmission and determination of location, some, but not all, of the anticipated applications of the method of low-power radio zonal data transmission include their use in:

Private in-house cellular systems; and
Private in-house PCS systems; and
Private in-house paging systems; and
Office or building-wide wireless data transmission systems; and
PBX systems with automatic and transparent "follow-me" functions for forwarding phone calls and faxes; and
Zonal PBX or other Public Address or paging systems; and
Security and access level badge systems.

Objects and Advantages

Accordingly, several objects and advantages of the present invention are:

(a) The ability to utilize an existing infrastructure for the transmission of data messages.

(b) To facilitate the ability to track and locate a user or device within a facility, with greater accuracy and lower cost compared to existing technologies.

(c) To facilitate a rapidly and easily installed wireless transmission system, not requiring licensing.

(d) The reduction of radio frequency congestion by reducing or eliminating In-House radio transmissions.

(e) The reduction of radio frequency congestion by reducing or eliminating public carrier system paging, messaging, or control channel radio transmissions.

(f) To facilitate the command, control, and operation, of radio units in areas of high radio density, by utilizing optical means, thus resulting in greater efficiency and less interference and interruption.

(g) To facilitate delivery of messaging and paging services by optical means, whilst an otherwise radio device is transmitting or receiving radio traffic.

(h) To facilitate additional radio frequency re-use in a coordinated and controlled radio system.

(i) To facilitate the transceiving of user status information, messaging traffic, and other data, on a radio device that otherwise does not support such services.

(j) To facilitate greater top-security and privacy communications, through the utilization of the optical means as a physically more-limited distribution channel, for the delivery of changing encryption keys and other security data and signaling, in various secure communications schemes.

(k) To facilitate a more transparent operation of PBX systems and equipment.

(l) To facilitate the operation of Public Address and audible paging systems that minimize disturbance to others.

(m) To facilitate the operation of message paging and personnel/equipment locating systems on military vessels so as to not be detectable by enemy electronic surveillance measures.

(n) To facilitate the operation of message paging and personnel/equipment locating systems on metal-constructed vessels, without the interference, reflections, cancellations, echoes, or lapse in coverage, that a radio-based system would otherwise suffer from.

(o) The ability to utilize one communication device for the concurrent reception of two means of communication; such as the concurrent utilization of private In-House communications services and Public Carrier communications services.

(p) The reduction of radio frequency congestion by reducing or eliminating In-House system paging, messaging, or control channel radio transmissions.

(q) To facilitate the wireless and cordless remote control and operation of radio devices, or extended radio devices, such as radio consoles.

(s) To facilitate an In-House system the ability to track and locate a radio user within a facility, with greater accuracy and lower cost compared to existing technologies.

(t) To facilitate greater top-security and privacy communications, through the utilization of the optical means as a physically more-limited distribution channel, for the delivery of changing encryption keys and other security data and signaling, in various secure communications schemes.

(u) To facilitate the command, control, and operation, of radio units in areas of high radio density, by utilizing low-power radio or optical transmitting means, thus resulting in greater efficiency and less interference and interruption to other users.

(v) To facilitate delivery of messaging and paging services by low-power radio or optical means, whilst an otherwise medium-to-high power radio device is transmitting or receiving radio traffic.

(w) To facilitate greater top-security and privacy communications, through the utilization of the low-power radio or optical means as a physically more-limited distribution channel, for the delivery of changing encryption keys and other security data and signaling, in various secure communications schemes.

Further objects and advantages of my invention will become apparent from a consideration of the drawings and ensuing description.

DESCRIPTION OF DRAWINGS

FIG. 1 shows a typical cellular radio-telephone with the addition of an optically transparent window required for operation of the optical sensor.

FIG. 16A shows the front view of a possible configuration and change to the outside appearance of a typical basic two-way radio unit as suggested by the requirements of my invention.

FIG. 16B shows the top view of a possible configuration and change to the outside appearance of a typical basic two-way radio unit as suggested by the requirements of my invention.

LIST OF REFERENCED NUMERALS

Figure 1:
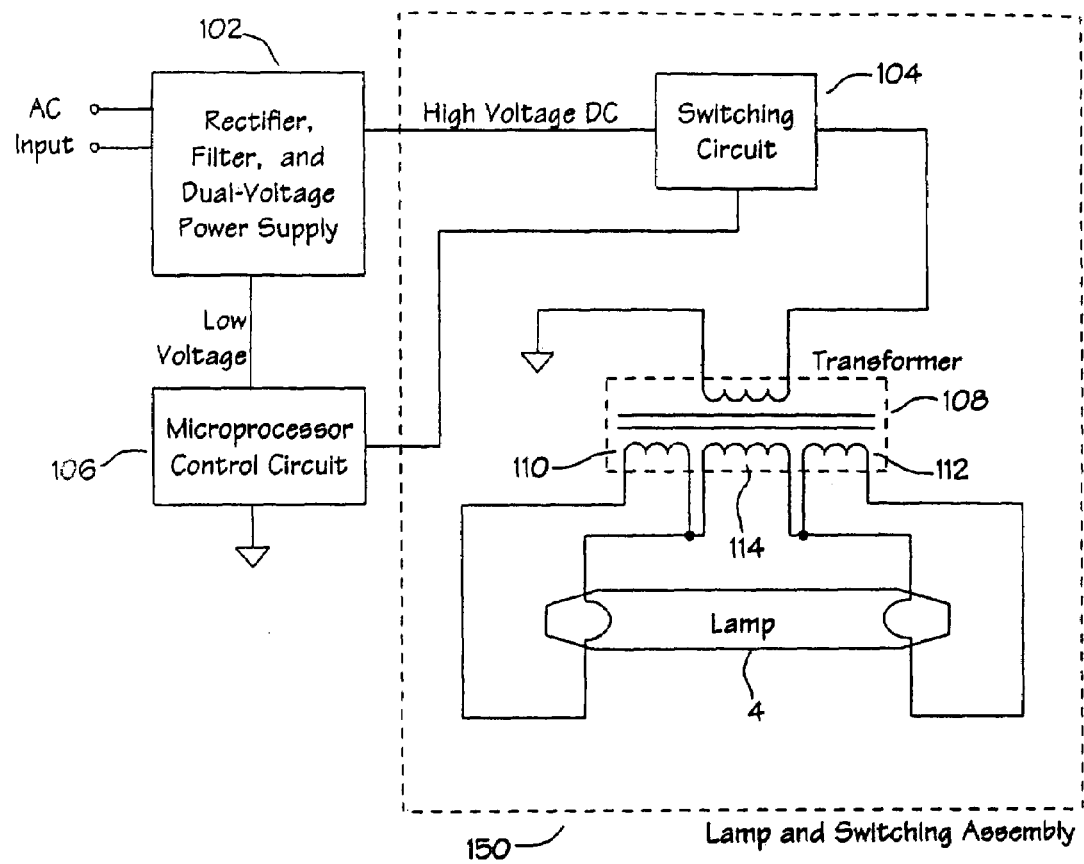
FIG. 1 is a block diagram of some possible circuitry for implementation of my invention.

4 Fluorescent Lamp
102 Rectifier, Filter, and Dual-Voltage Power Supply
104 Switching Circuit
106 Microprocessor Control Circuit
108 Transformer
110 Heater Winding 'A'
112 Heater Winding 'B'
114 Arc Winding
150 Lamp and Switching Assembly
202 Graph Line
252 Raw Binary Data
254 Binary Voltage Level
256 Lamp Output
258 Frequency Series
302 Power Line Carrier Transceiver
306 Radio Transceiver
402 Fluorescent Ballast Assembly 11
404 Fluorescent Ballast Assembly 12
502 Ceiling
504 Lamp Assembly 1
506 Lamp Assembly 2
508 Pager 'A'
510 Pager 'B'
512 Pager 'C'
602 Lamp and Switching Assembly 1
602 Lamp and Switching Assembly 2
20 Typical Pager and Housing
30 Typical Portable Two-Way Radio and Housing
32 Visual Display
34 Keypad
42 Alpha-Numeric Display
44 Icon Indicators
46 Typical Portable Cellular Radio-Telephone and Housing Assembly
48 Keypad
50 Light-Bulb icon Indicator
62 Paging Radio Signals
64 Antenna
66 Radio Receiver
68 Receiver Speaker
70 Microprocessing and Signal Processing Circuitry
72 Keypad
74 Display
90 Microprocessing, Signal Processing, Modem, and Controller Circuitry
92 Cellular Radio Signals
94 Antenna
96 Antenna Circuit
98 Radio Receiver
100 Radio Transmitter
116 Transmitter Microphone
118 Receiver Speaker
120 Alpha-Numeric Display
122 Keypad
151 Controlling Means
152 Radio Transmitter Means
154 Radio Receiver Means
156 Optical Transmitter Means
158 Optical Receiver Means
160 Additional Radio Transmitter(s) Means
162 Additional Radio Receiver(s) Means
164 Additional Optical Transmitter(s) Means
166 Additional Optical Receiver(s) Means
200 Optical Sensor Window
203 Optical Sensor Window
204 Optical Sensor Window
210 Optical Light-Rays
212 Optical Sensor Assembly
214 Optical Signal Decoder Circuitry
216 Optical Transmitter Buffer Circuitry
218 Optical Transmitter LED
220 Optical Energy
230 Optical Sensor Assembly
232 Optical Signal Decoder Circuitry
250 Infrared Optical Diode Detector
253 Frequency-Selective Filter
255 Amplifier
257 Limiter
259 Logic-Level Output Buffer Amplifier
260 Optical Lens
262 Optical Photocell
264 Dynamic Load
266 Adjustable Frequency-Selective Filter
268 Amplifier
270 Limiter
272 Logic-Level Output Amplifier
274 Optical Curcuits Microprocessor
276 Buffered Switch
278 Infrared Light Emitting Diodes
280 Transmitted Light-Wave Energy
300 Integrated Curcuit U1
301 Optical Diode Detector D1
303 Variable Inductor L1
305 Capacitor C1
308 Resistor R1
350 Optical Receiver-Decoder Circuitry Output
401 Logic Gate
403 Resistor
404 Resistor
406 Infrared LED
408 Infrared LED
410 Infrared LED
412 Darlington NPN Transistor.
516 Flowchart Initialize Block: "Start"
518 Flowchart Process Block: "Start Cellular Routines"
520 Flowchart Process Block: "Start Optical Routines"
522 Flowchart Decision Block: "Optical System Detected?"
524 Flowchart Process Block: "Process Optical Data Frames"
526 Flowchart Process Block: "Use Public Cellular System Only"

528 Flowchart Decision Block: "Cooperative Optical System?"

514 Flowchart Process Block: "Use Local System . . . "

SUMMARY OF INVENTION

This invention proposes to modulate the light generated by gas-discharge lamps, such as fluorescent lamps, mercury vapor lamps, and sodium vapor lamps, commonly found in and around offices and buildings, with control, location, and other data messages. The modulated light is then received by various types and configurations of devices, and used for the determination of their location, to control their operational parameters, or to simply receive data messages.

The use of fluorescent lamps and lighting has been widespread in the consumer and industrial market for many years. The vast majority of office buildings and high rises make use of florescent lighting by installing fluorescent fixtures in a grid-like fashion throughout lobby areas, private office space, open planning areas, conference rooms, and hallways. Thus, many buildings have a quasi-zonal light transmitting X-Y grid system that if properly utilized represents an important infrastructural system already in place. I propose to utilize that existing Cartesian infrastructure for the creation of a zone-based data transmission system for use within an office or building.

In addition, I propose to utilize that existing infrastructure for the determination of the location of users location within an office or building through the automatic and transparent radio or optical reporting of which fluorescent fixture is closest to a person or other target that is being sought. In this way, the position of a user or target can be determined with greater accuracy than that afforded by indoor radio triangulation or even GPS means (if indoor GPS were practical).

In addition to data transmission and determination of location, some, but not all, of the anticipated applications of the method of zonal data transmission by ballast and fluorescent or arc lamps include their use in:

Private in-house cellular systems; and

Private in-house PCS systems; and

Private in-house paging systems; and

Office or building-wide wireless data transmission systems; and

PBX systems with automatic and transparent "follow-me" functions for forwarding phone calls and faxes; and Zonal PBX or other Public Address or paging systems; and Security and access level badge systems; and On-board commercial and military vessels for use in a safe-and-secure (non-radiating) paging and locating system.

This invention makes strategic use of combining the strengths and differences between radio-wave and optical-wave behavior in application to radios and radio systems; facilitating their concurrent use in both private In-House radio systems and Public Carrier wide-area radio systems.

In this invention, radio-wave communication is used as the primary backbone for wide-area communications, while optical-wave communication is used as the primary backbone for In-House communications. Alternatively, in the case of sophisticated In-House communication applications, radio-wave communication can be used as the primary backbone for In-House bi-directional voice and data communication, while optical-wave communication can be used as the primary backbone for In-House system control communications; or vice versa.

DESCRIPTION OF INVENTION—MAIN EMBODIMENTS

Note that part names as used herein are descriptive only, and should not be taken as limiting their function or purpose. It is important to note that functional blocks in the figures are shown for purposes of discussion only, and nothing therein should be construed to imply their necessary configuration or even presence for my invention to work. In addition, similar embodiments based on infrared, visible, or ultra-violet optical communications, or a combination thereof, or a mix of one spectrum for transmission and a different spectrum for reception, are anticipated by this invention.

The main embodiment of the invention describes an fluorescent lamp lighting ballast that uses the output of the lamp or lamps under it's control to transmit data to one or more receivers. The configuration allows for the transmission of fixed data messages, such as a serial number, while allowing for the transmission of data messages that can be modified in the field. This embodiment, while not the most basic embodiment of my invention, is never-the-less one of the more useful and lesser expensive embodiments.

It is important to note that several wireline or wireless data exchange techniques exist and can be used with the invention. The data transfer techniques discussed and illustrated herein are for purposes of discussion only, and should not be construed to limit the scope of the invention.

FIG. 1 is a diagram showing the basic circuitry necessary to implement a basic embodiment of the invention. Rectifier, Filter, and Dual-Voltage Power Supply (102) typically contains a full-wave diode rectifier and filter that converts the incoming AC mains power from AC to DC power. The rectified and filtered voltage is passed out of the Rectifier, Filter, and Dual-Voltage Power Supply (102) as the high-voltage (150-350 Volt) supply. Also within Rectifier, Filter, and Dual-Voltage Power Supply (102) is a low-voltage circuit that taps some of the high-voltage, regulates it, and then passes it out as a low-voltage (typically around 5 volts DC) supply.

The high-voltage supply is passed to Switching Circuit (104). Switching Circuit (104) is under control of the Microprocessor Control Circuit (106). When Microprocessor Control Circuit (106) enables Switching Circuit (104), the high-voltage output from Rectifier, Filter, and Dual-Voltage Power Supply (102) is passed on to the primary windings of Transformer (108).

Switching Circuit (104) facilitates Microprocessor Control Circuit (106) controlling the switching rate and waveform of the voltage supplied to Transformer (108), and hence determines the output voltage and waveform from the secondary windings of Transformer (108); namely, Heater Winding 'A' (110), Heater Winding 'B' (112), and Arc Winding (114).

Heater Winding 'A' (110), and Heater Winding 'B' (112), are lower voltage windings used to supply the voltages necessary for the operation of filament heaters (cathodes) of Fluorescent Tube (4). The higher-voltage output of Arc Winding (114) is coupled to each of the filament windings so as to place a high-voltage potential between the cathodes of Fluorescent Tube (4).

Fluorescent Tube (4) is any fluorescent lamp tube or type, including straight or curved heated cathode fluorescent bulbs, compact fluorescent bulbs (CFL), or cold cathode fluorescent bulbs (CCFL). In the actual laboratory demonstration circuits, the Fluorescent Tube (4) first used was a F4T5, and later the circuitry was modified to accommodate two Philips brand F8T5/CW lamps.

Microprocessor Control Circuit (106) consists of a core microprocessor circuit, memory circuitry, timing or frequency source and circuitry, and other auxiliary circuitry. The timing source and circuitry is used to clock the microprocessor, and potentially through other circuits, provide the frequencies that will be used for toggle rates of Switching Circuit (104), and therefore the toggle rates of the lamp and associated light output.

Microprocessor Control Circuit (106) is powered by the low-voltage output of Rectifier, Filter, and Dual-Voltage Power Supply (102), and also holds the data to be transmitted within the memory circuitry. The memory circuitry can consist of Random Access Memory (RAM) and/or Read-Only Memory (ROM). Both the RAM and ROM can be of any configuration and of any type. The memory is programmed at the factory and/or from one or more sources in the field.

Lamp and Switching Assembly (150) represents the switching, transformer, and lamp function blocks as defined herein. That is, Switching Circuit (104), Transformer (108), and Fluorescent Tube (4), are within Lamp and Switching Assembly (150). The Lamp and Switching Assembly (150) function block serves to simplify some of the remaining discussion by not having to repeat the descriptions of repeating common function blocks.

Figure 2A:
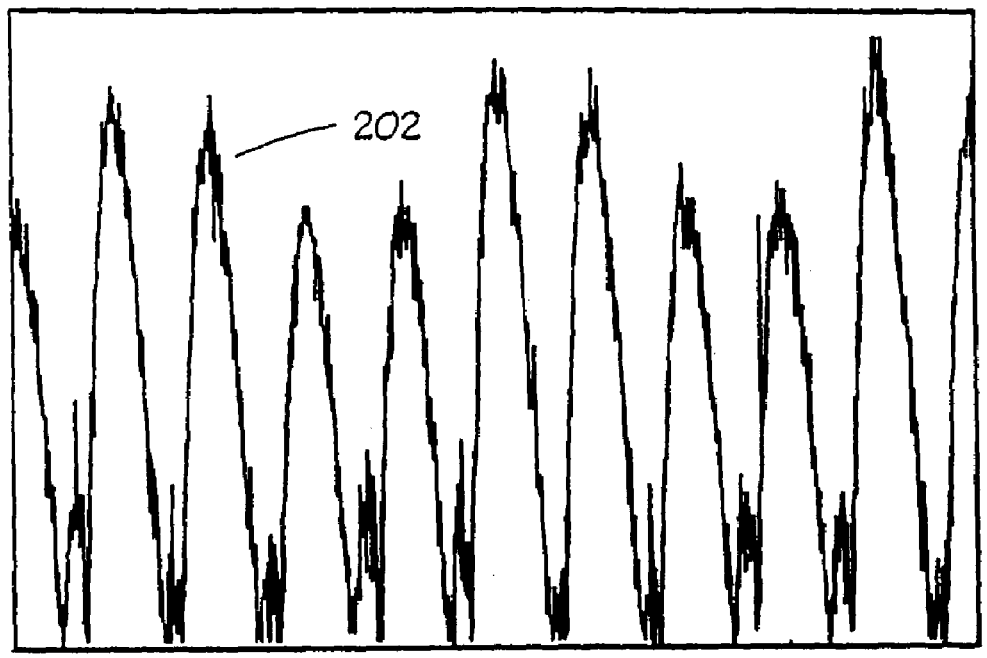
FIG. 2A is a graphic representation of the output from a typical fluorescent tube operated by a circuit similar to that represented in FIG. 1.

FIG. 2A is a graph of the output from a typical fluorescent tube operated on a circuit similar to that diagrammed in FIG. 1. The diagram shows the output from a Philips F8T5/CW fluorescent tube, operated at a 40 kHz flash rate. Graph Line (202) shows that while some noise and harmonic frequencies are present, the basic flash-rate signal is never-the-less evident, and easily recoverable by filtering and limiting.

Figure 2B:
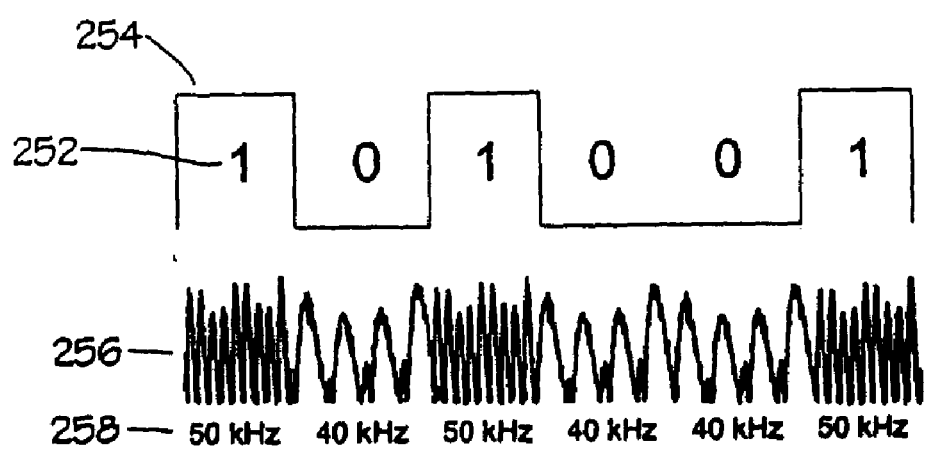
FIG. 2B illustrates one method of data encoding anticipated by my invention: Frequency Shift Keying (FSK).

FIG. 2B illustrates one method of data encoding: Frequency Shift Keying (FSK). FSK is chosen here for ease of application and data recovery, but any modulation method is applicable. The use of FSK herein should not be taken as to in any way limit the modulation method anticipated by the invention.

For the purposes of this discussion, we will presume that the microprocessor controls an external timing or frequency circuit [outside of the microprocessor, but within the Microprocessor Control Circuit (106) of FIG. 1], that in-turn generates the toggle frequencies for application to Switching Circuit (104) of FIG. 1. However, it should also be noted that the invention also anticipates the microprocessor directly generating the toggle frequencies without the need for an external timing or frequency circuit.

The Raw Binary Data (252) to be transmitted is shown to be "101001". This binary data is typically translated to a logic-level voltage shown therein as Binary Voltage Level (254) generated by the microprocessor. The Binary Voltage Level (254) is then applied to an timing circuit whereby one of two toggle frequencies are generated. The two frequencies are arbitrarily chosen to represent binary 1's and 0's. For our discussion, we will use a toggle frequency of 50 kHz to represent a binary data "1", and a 40 kHz frequency to represent a binary data "0".

The output of the timing circuit, whether 40 kHz or 50 kHz is applied to Switching Circuit (104) of FIG. 1. The required Frequency Series (258) for the representation of binary data "101001" is shown. These series of frequencies are applied to Switching Circuit (104) of FIG. 1, which in-turn controls the output of the fluorescent lamp. The output of the fluorescent lamp is represented as Lamp Output (256).

Figure 3:
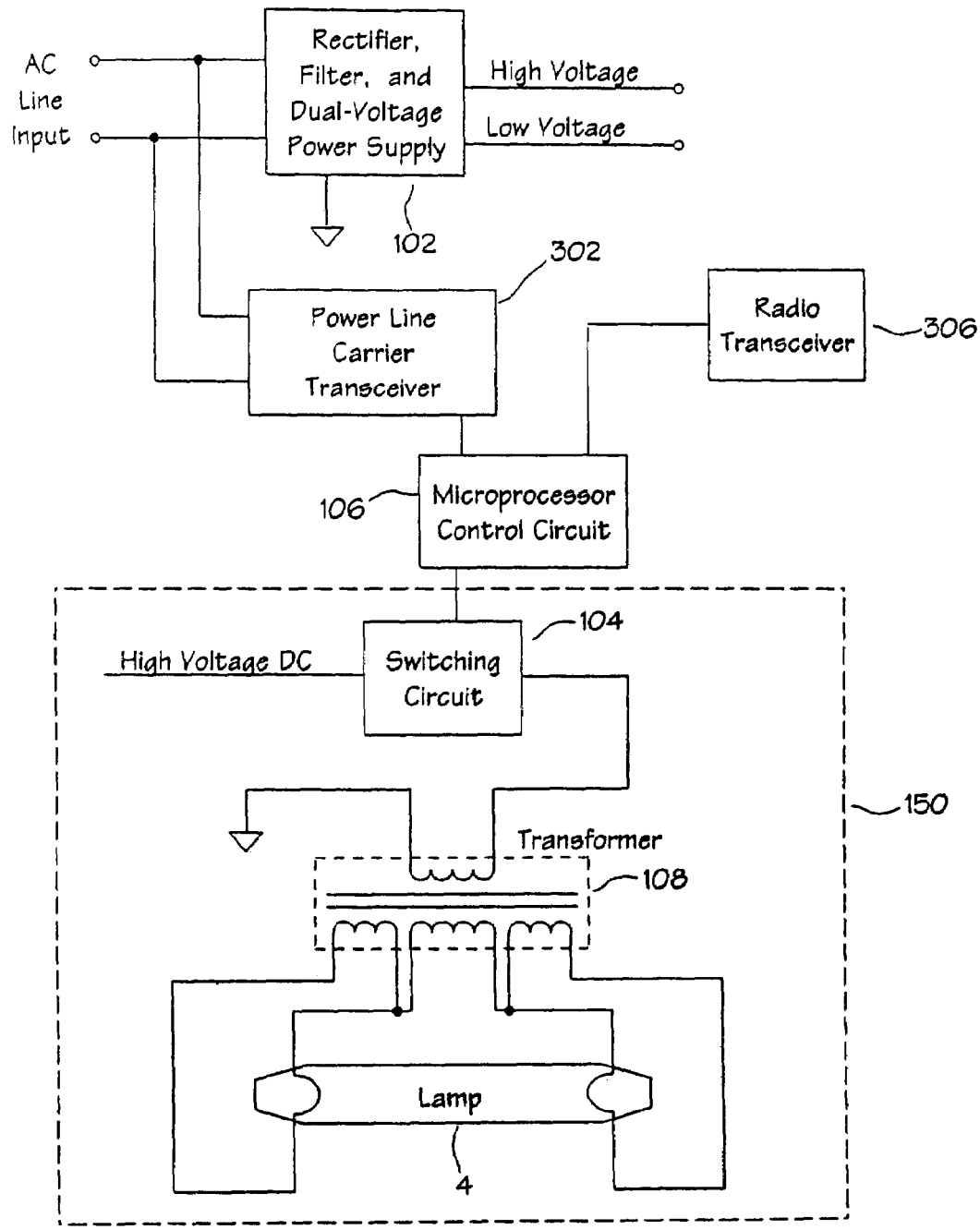
FIG. 3 is a block diagram of the main embodiment of my invention.

FIG. 3 is a block diagram of the main embodiment of my invention. Rectifier, Filter, and Dual-Voltage Power Supply (102) performs the same power supply functions as before. Although not shown, the low voltage output of the Rectifier, Filter, and Dual-Voltage Power Supply (102) is distributed to the Power Line Carrier Transceiver (302) circuitry, the Microprocessor Control Circuit (106) circuitry, and the Radio Transceiver (306) circuitry.

Power Line Carrier Transceiver (302) is circuitry that receives and transmits either data or audio (or both data and audio) signals by way of a modulated carrier wave superimposed on the power line connections. The use of any carrier frequency with any modulation scheme in the invention is possible, although certain combinations may have limitations that are not acceptable.

As a non-limiting example, an Echelon® PLT-10A Power Line Transceiver (manufacturer's model number 50080-02) is a possible choice for use in the Power Line Carrier Transceiver (302) circuitry, and is compatible with a standard that exists in the marketplace. The PLT-10A facilitates a 10 kilobits per second network rate using direct sequence spread-spectrum in the 100 kHz to 450 kHz spectrum. For the purposes of this discussion, the use of an Echelon® PLT-10A Power Line Transceiver would also facilitate operation of the ballast unit on a LonWorks® compatible network which is also a present standard in the marketplace. [Echelon® and LonWorks® are Registered Trademarks of the Echelon Corporation.]

Other circuits and variations are possible, including employing discrete parts to produce FM, PCM, or AM modulation of a carrier. The bottom-line significance of the Power Line Carrier Transceiver (302) is that it is a circuit that facilitates communication via the power line wiring, thus allowing communications to and from the ballast invention, without requiring separate communications wiring to be installed to each ballast.

As before, Microprocessor Control Circuit (106) is powered by the low-voltage output of Rectifier, Filter, and Dual-Voltage Power Supply (102), and also holds the data to be transmitted within the memory circuitry. The memory circuitry can consist of Random Access Memory (RAM) and/or Read-Only Memory (ROM). Both the RAM and ROM can be of any configuration and of any type. Microprocessor Control Circuit (106) now also receives and transmits data via Power Line Carrier Transceiver (302).

Radio Transceiver (306) can receive data or signals from any radio source, and said data or signals are then sent to Microprocessor Control Circuit (106). The data can be used to either program the operation or function of Microprocessor Control Circuit (106), or enter data that is to be stored and later transmitted by Microprocessor Control Circuit (106) via the lighting circuitry, or be transmitted via Power Line Carrier Transceiver (302), or any other use of the data can be made of by Microprocessor Control Circuit (106).

Radio Transceiver (306) can also transmit data or signals to any radio receiver that is in range. The transmission of said radio transmitted data or signals is under the control of Microprocessor Control Circuit (106). The radio transmitted data can be used to control or send data to remote devices that may or may not have compatible optical receivers.

That is, taken together, FIG. 3 defines a ballast assembly that can transmit and/or receive zonal data by radio means, and not necessarily rely on optical transmission means or pathways.

Lamp and Switching Assembly (150) again represents the switching, transformer, and lamp function blocks as defined before in FIG. 1. That is, Switching Circuit (104), Transformer (108), and Fluorescent Tube (4), all of FIG. 1, are within Lamp and Switching Assembly (150).

Thus FIG. 3 diagrams a ballast assembly that contains microprocessor and memory circuitry, that can receive data either by radio or power line carrier, and can transmit data either by power line carrier, radio carrier, or by arc lamp output.

Note that while the primary spectrum anticipated for application under this invention is optical (visible, infrared, and ultraviolet); the use of the radio and/or electromagnetic spectrum emissions of fluorescent and other arc lamps is also anticipated as a possible carrier of data for use in the invention. That is, the emissions in the radio spectrum often classified as noise or Radio Frequency Interference (RFI), and the radiation of other electromagnetic spectrum signals often classified as noise or Electro-Magnetic Interference (EFI); are in fact in this invention anticipated as being useful for some applications, and therefore are not necessarily considered to be noise.

Figure 4:
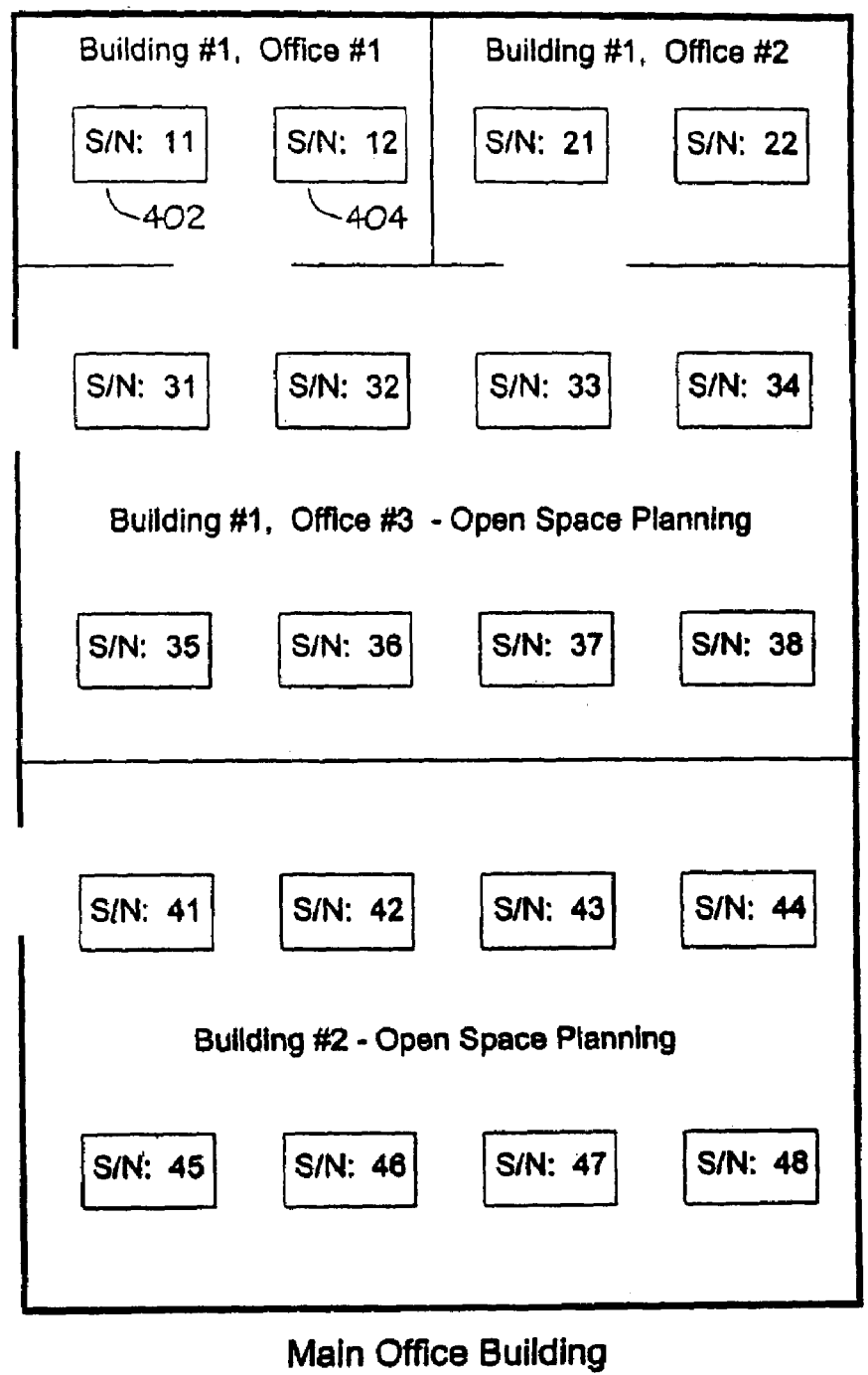
FIG. 4 diagrams a building floor plan showing a possible arrangement of lighting luminaries incorporating the invention.

FIG. 4 diagrams a building floor plan showing a possible arrangement of lighting ballasts incorporating the invention. Fluorescent Ballast Assembly 11 (402) and Fluorescent Ballast Assembly 12 (404) each represents one of the ballast assemblies of the invention. Among the data messages being transmitted by light are their serial numbers as "11" for Fluorescent Ballast Assembly 11 (402), and "12" for Fluorescent Ballast Assembly 12 (404).

Figure 5:
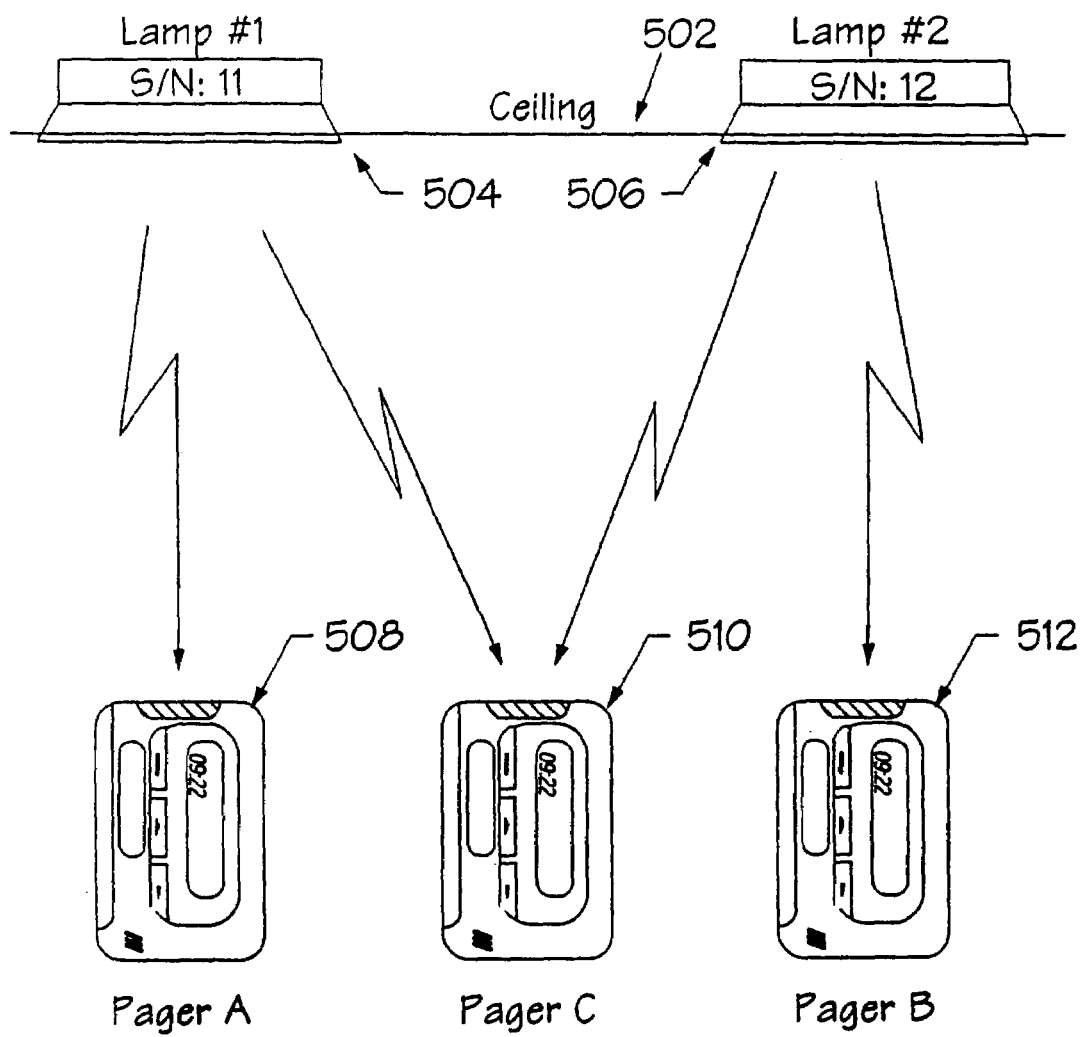
FIG. 5 illustrates one of many applications of the invention: application to pagers.

FIG. 5 illustrates one of many applications of the invention. Ceiling (502) represents the ceiling of a typical office. Lamp Assembly 1 (504) corresponds to Fluorescent Ballast Assembly 11 (402) of FIG. 4, and Lamp Assembly 2 (506) corresponds to Fluorescent Ballast Assembly 12 (404) of FIG. 4.

Each of Lamp Assembly 1 (504) and Lamp Assembly 2 (506) are assemblies which house the ballasts and fluorescent lamps as described herein. The ballast of Lamp Assembly 1 (504) is modulating it's fluorescent lamps to output a serial number of "11". The ballast of Lamp Assembly 2 (506) is modulating it's fluorescent lamps to output a serial number of "12".

Pager A (508), Pager B (510), and Pager C (512), are pagers that are capable of receiving and decoding the optical output of a ballast of the invention.

Note that part names as used herein are descriptive only, and should not be taken as limiting their function or purpose.

Figure 7:
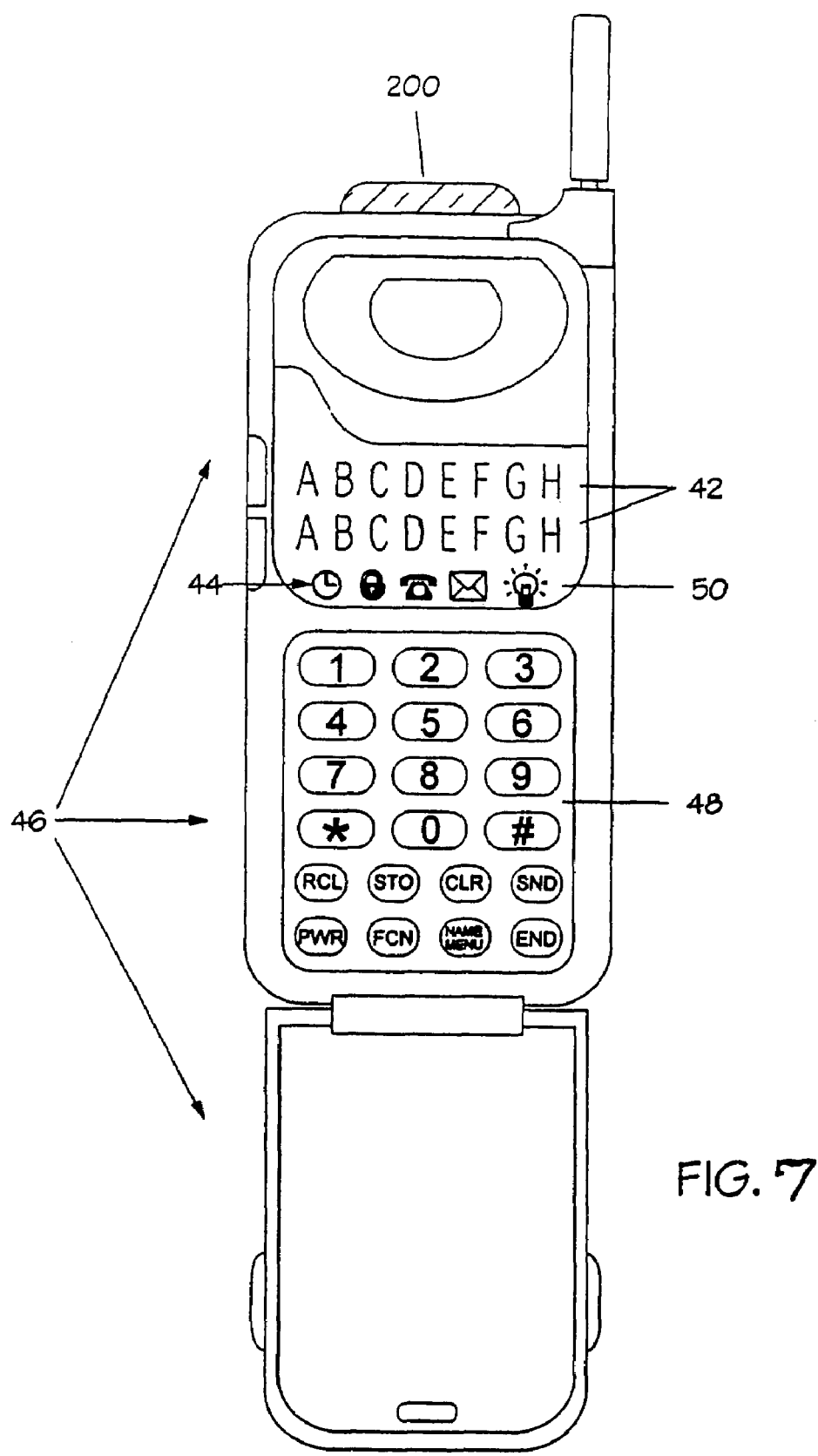
FIG. 7 shows a possible configuration and change to the outside appearance of a typical cellular radio-telephone unit as suggested by the requirements of my invention; that is.

FIG. 7 shows a possible placement for the required Optical Sensor Window (200) on a Typical Cellular Radio-Telephone (46) as suggested by the requirements of my invention. This represents the main embodiment of my invention.

The Optical Sensor Window (200) is necessary to let light pass through the otherwise light-blocking plastic or metal housing typical of most cellular-based radio-telephones. The Optical Sensor Window (200) may or may not embody a lens or other light focusing or directing assembly, whether as an integral part or as a separate sub-assembly.

In addition, the Optical Sensor Window (200) may also include the function of a light filter, filtering out all but the desired optical spectrum (the infrared spectrum in this example). Note that such a filter may be an integral part of the material used for the Optical Sensor Window (200) or may be a separate sub-assembly to it.

Icon Indicators (44) are representative graphic symbols that are typically illuminated or darkened to indicate the radio-telephone's status. Here a Light-Bulb Icon Indicator (50) has been added in order to illustrate a possible way to indicate the status of the optical mode of the radio-telephone. That is, the Light-Bulb Icon Indicator (50) is illuminated in the detected presence of a usable In-House optical system, and darkened when no usable In-House optical system is detected.

The rest of FIG. 7 should be taken as typical of most existing cellular-based radio-telephone devices on the market. The references include a Typical Portable Cellular Radio-Telephone and Housing Assembly (46), an Alpha-Numeric Display (42), and a Keypad (48). The Alpha-Numeric Display (42) is used to display useful information such as dialed or stored telephone numbers, as well as to display the status and modes of operation of the radio-telephone. The Keypad (48) is used for both dialing and controlling the radio-telephone.

Figure 8:
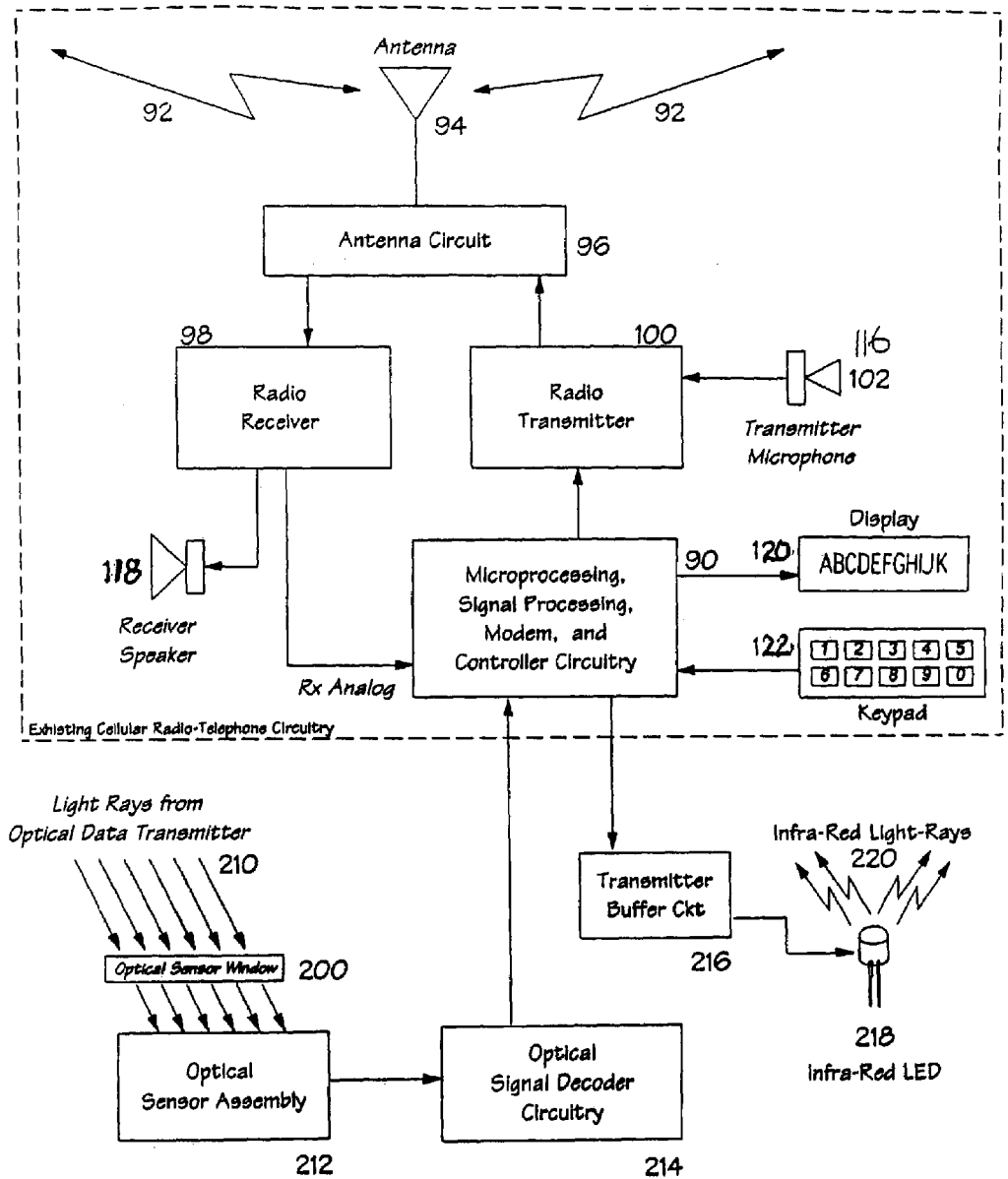
FIG. 8 is a block diagram of some possible circuitry for the implementation of my invention in a typical cellular radio-telephone.

FIG. 8 is a block diagram of one of the possible configurations of circuitry in the main embodiment of my invention. Optical Light-rays (210), traveling through the Optical Sensor Window (200), strikes the Optical Sensor Assembly (212), where it is converted to electrical signals which are then applied to the Optical Signal Decoder Circuitry (214).

The demodulated logic-level output is then passed out of the Optical Signal Decoder Circuitry (214) to an input port of the existing radio Microprocessing, Signal Processing, Modem, and Controller Circuitry (90). The Microprocessing, Signal Processing, Modem, and Controller Circuitry (90) decodes the received logic-level voltages and recovers the encoded data.

Data to be transmitted is sent from an output port of the radio's Microprocessing, Signal Processing, Modem, and Controller Circuitry (90) and fed to the Optical Transmitter Buffer Circuitry (216) where the logic-level input controls output to the Optical Transmitter LED (218). The output is applied to one or more Optical Transmitter LED's (218) whereby the electrical power is converted to Optical Energy (220) which is transmitted to one or more remote optical receivers.

The Optical Transmitter LED (218) can be located behind the Optical Sensor Window (200) or can be located on the radio housing. If multiple Optical Transmitter LED's (218) are used, they can be arranged in a group, or they can be distributed about the housing oriented in different directions of transmission.

With the exception of references 200 through 220 in FIG. 2, all other references should be taken as typical of existing cellular radio-telephone functional blocks, and their functions are described briefly here as follows:

Cellular Radio Signals (92) are received at the Antenna (94) and are routed to Antenna Circuit (96) where filters are used to separate transmitter generated energy from interfering with the received radio signals.

The received radio signals are applied to Radio Receiver (98), wherein they are demodulated, and both audio-band signals and data-level signals are outputted. The audio-band signals are gated and amplified and then passed-on to the Receiver Speaker (118). The decoded data-level signals are passed-on to the Microprocessing, Signal Processing, Modem, and Controller Circuitry (90).

Data originated and converted in the Microprocessing, Signal Processing, Modem, and Controller Circuitry (90) that is to be transmitted is sent to the Radio Transmitter (100). In addition, when appropriate, audio to be transmitted is converted by the Transmitter Microphone (116) into electrical signals, which are then passed on to the Radio Transmitter (100).

The radio frequency energy output of the Radio Transmitter (100) is sent to the Antenna Circuit (96), wherein it is kept separated from the received radio signals. The output of the Antenna Circuit (96) is sent to be radiated by the Antenna (94), whereby the radio frequency energy is radiated as Cellular Radio Signals (92).

Keypad (122) is used to dial the telephone numbers and to control the phone. It is envisioned that in the case of this invention, Keypad (122) would also be used for the purpose of entering status codes and information about the user. In this way, a user can notify others that he or she is in a meeting and should not be interrupted, or that the user is at lunch, etc.

The Alpha-Numeric Display (120) is used to display present phone statistics, confirmation of dialed telephone numbers, displaying last number dialed, and displaying other information typical of existing cellular radio-telephones. It is envisioned that Alpha-Numeric Display (120) would also be utilized for such functions as displaying information about present location, present status, received messages, etc.

The Receiver Speaker (118) is used to reproduce received audio signals as well as to produce tones or other signals used for acknowledgment of user keypad entries, to indicate to the user that a phone call is incoming, or to otherwise attract the attention of the user.

Although typical of existing cellular radio-telephones, FIG. 8 does not show the volume control function which is used to adjust the Receiver Speaker (118) to a comfortable level, nor does it show the on-off control function which is used to turn the unit on and off.

Figure 9:
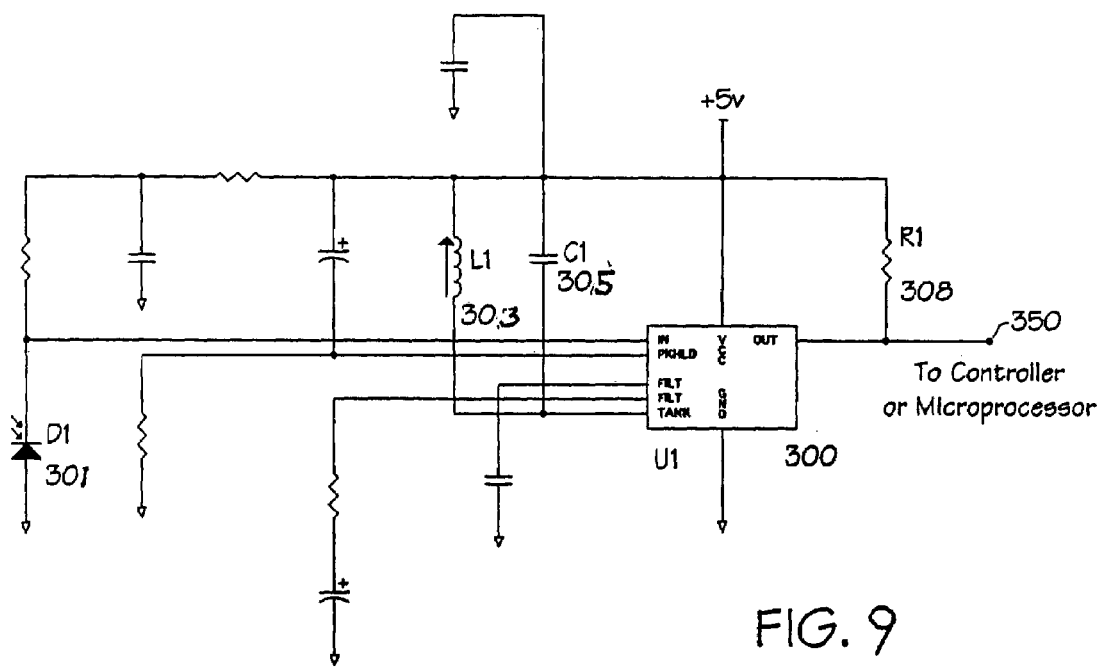
FIG. 9 shows one of a possible many schematic configurations of optical receiving circuitry necessary to be added to the existing circuitry of a typical radio unit as suggested by the requirements of my invention.

FIG. 9 is demonstrable of one of several possible schematic circuits that can be used to add an optical receive function to existing radio-telephone circuitry. FIG. 9 is representative of a simple infrared detector and decoder circuitry, and should not be taken to limit the functionality of any proposed optical receiver circuit. Indeed, more sophisticated optical schemes are possible, and some representations of them follow in other FIG's. In addition, FIG. 9 is an optical receiver only, which should not be taken to limit or give preference to the optical circuits as being receive only. Optical transmission circuitry is demonstrated in FIG. 10.

The circuitry in FIG. 9 decodes infrared data modulated carrier-wave transmissions. So long as the carrier frequency is compatible with the acceptance bandwidth of the circuit design, and the optical frequency is passed by the light filter, the transmitted data is decoded. If a light filter is used, it is located anterior to the Optical Diode Detector D1 (301). In this way, the design of FIG. 9 minimizes interference caused by spurious optical noise sources such as fluorescent lamps and other gas-discharge based lighting.

The Integrated Circuit U1 (300) is a Motorola Semiconductor part number MC3373 or equivalent integrated circuit. U1 serves as an analog wide-band high-gain pre-amplifier with detector and automatic bias leveling circuit. The optical carrier frequency is centered about the tuned parallel resonant L-C tank circuit composed of both the Variable Inductor L1 (303) and the Capacitor C1 (305). In addition, the Variable Inductor L1 (303) primarily sets the acceptance band-width which varies indirectly as the Q of Variable Inductor L1 (303).

The Optical Diode Detector D1 (301) is a Motorola Semiconductor part number MRD821 or equivalent. The diode has a Dark Current of typically 3 nA with a Wavelength of Maximum Sensitivity at 940 nm, and a Spectral Range of about 170 nm, with −3 dB points at approximately 875 nm and 1045 nm. The Acceptance Half-Angle from center is approximately ±70°.

The output of the Integrated Circuit U1 (300) is of open-collector design, and therefore Resistor R1 (308) performs the function of logic-level pull-up. All other components are used to either adjust bias or perform decoupling or filtering support functions.

Figure 10:
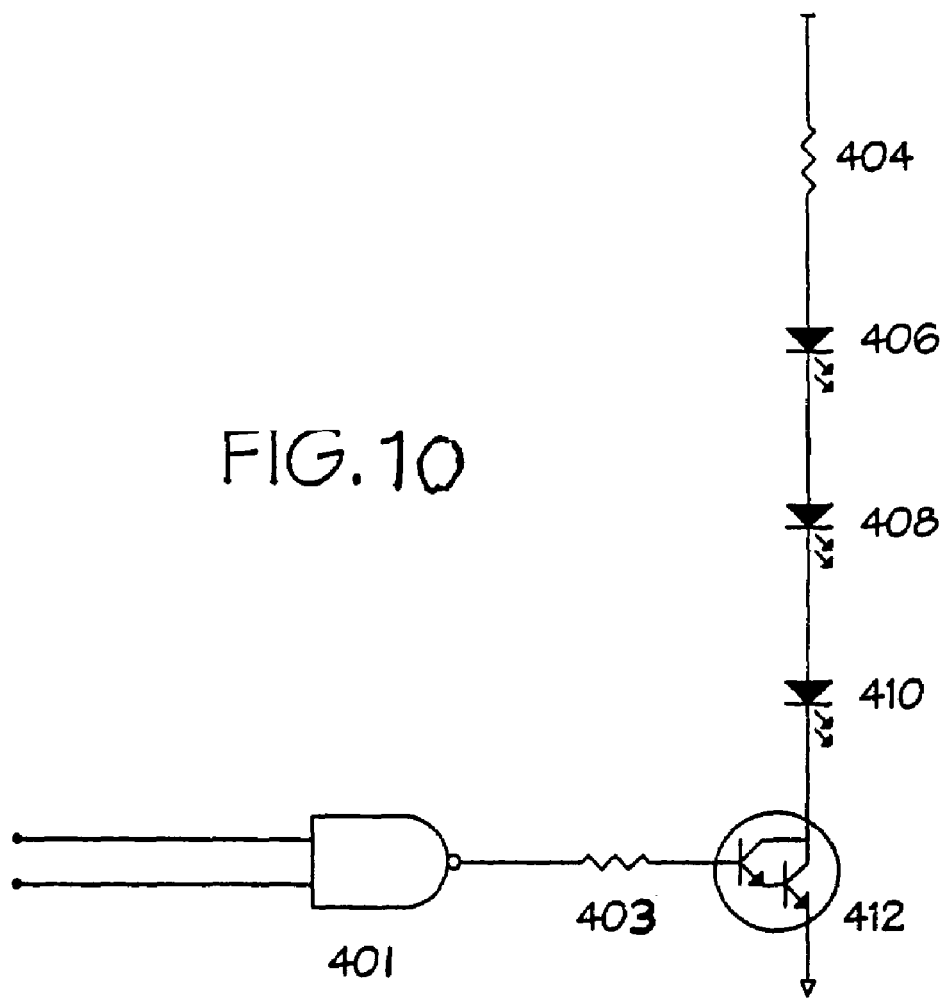
FIG. 10 shows one of a possible many schematic configurations of optical transmitting circuitry necessary to be added to the existing circuitry of a typical radio unit as suggested by the requirements of my invention.

FIG. 10 is a schematic representation of a possible simple optical transmission circuit. In no case should FIG. 10 serve to imply limitation as to the level of complexity of the optical transmission circuitry possible to implement optical transmission in this invention. Neither should FIGS. 9 and 10, taken together, be used to imply that optical transmission and reception circuits could not share common circuitry.

FIG. 4 demonstrates that optical transmission is inherently more simple to accomplish than optical reception, and can be as simple as one or more infrared LED's connected to a logic gate through a transistor, with said logic gate under control of a microprocessor or other control circuitry.

Logic Gate (401) is a dual-input NAND logic gate similar to a Motorola Semiconductor MC14011 CMOS logic gate or equivalent. The inputs to Logic Gate (401) can be tied together and then connected directly to an unused output pin on a microprocessor or any other logic-level driving source. Alternatively, one input to Logic Gate (401) can be connected to an unused output pin on a microprocessor or any other logic-level driving source supplying data signaling, while the other input is tied to a carrier clocking-source.

The output of Logic Gate (401) is passed through a current limiting Resistor (403) and is applied to the base input of a Darlington NPN-Transistor (412) similar to a Motorola Semiconductor MPS-A13. The emitter of the Darlington NPN-Transistor (412) is grounded. The incoming light emitting diode (LED) power source is current limited by a series Resistor (404) and is passed on to three series wired Infrared LED's (406, 408, and 410).

Each of the three Infrared LED's (406, 408, and 410) are Motorola Semiconductor part number MLED-81 or equivalent. An MLED-81 Infrared LED (406, 408, or 410) has a typical-to-maximum Forward Voltage of 1.35 to 1.7 volts at 100 mA Forward Current, and an Ambient Temperature range of −30° C. to +70° C. The Peak Wavelength is at 940 nm at a Forward Current of 100 mA, with a Total Power Output of 16 mW and a Half-Power Angle of ±30°.

The particular use of an MLED-81 Infrared LED (406, 408, or 410) is chosen as it is complimentary to the Infrared photo Optical Diode Detector D1 (301) used in the schematic of FIG. 9.

Figure 11:
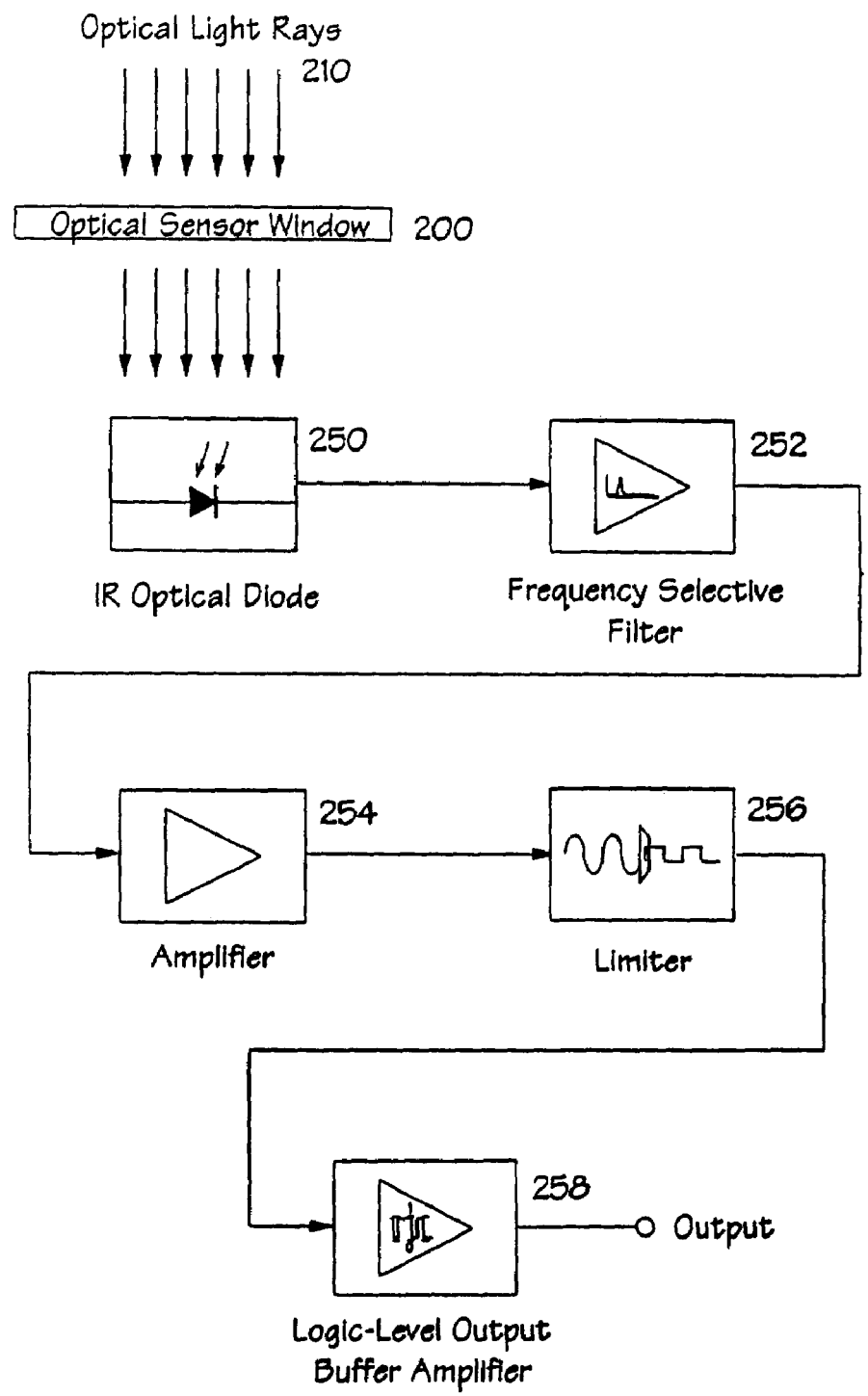
FIG. 11 shows a block diagram representation of a possible configuration of components needed to be added to an existing cellular radio-telephone to implement my invention, and is demonstrative of an infrared optics configuration.

FIG. 11 is a block diagram which is demonstrative of a suggested alternative design for the optical circuitry of FIG. 8. References to Optical Light-rays (210) and Optical Sensor Window (200) are the same as in FIG. 8. The Infrared Optical Diode Detector (250) in FIG. 11 is part of the Optical Sensor Assembly (212) of FIG. 8.

The Frequency-Selective Filter (253) is representative of a filter circuit that blocks any voltage component generated by the Optical Light-rays (210) striking the Infrared Optical Diode Detector (250) that are not within specification. Only those light energies with carrier frequencies that fit within the passband of Frequency-Selective Filter (253) are allowed to pass through and on to the Amplifier (255).

The Amplifier (255) is used to amplify the amplitude of the low-level analog, mostly sine-wave signals from the Frequency-Selective Filter (253), to levels that are compatible with Limiter (257) that follows.

The amplified signal received into Limiter (257) is amplitude-limited in such a way so as to convert the entering sine-wave signal with varying amplitude, into a square-wave signal with constant amplitude.

The output of Limiter (257) is fed to a Logic-Level Output Buffer Amplifier (259). The Logic-Level Output Buffer Amplifier (259) is used to amplify the lower-level but limited amplitude of the received signal to a voltage amplitude that is compatible with the radio microprocessor (0 to 5 volts nominally). The output of the Logic-Level Output Buffer Amplifier (259) is fed to an otherwise unused port of the radio's microprocessor, where the data contained within said signal is decoded using software algorithms.

It should be noted that references 253, 255, 257, and 259 in FIG. 11, taken together, are contained within the functional reference block 214 in FIG. 8.

Figure 12:
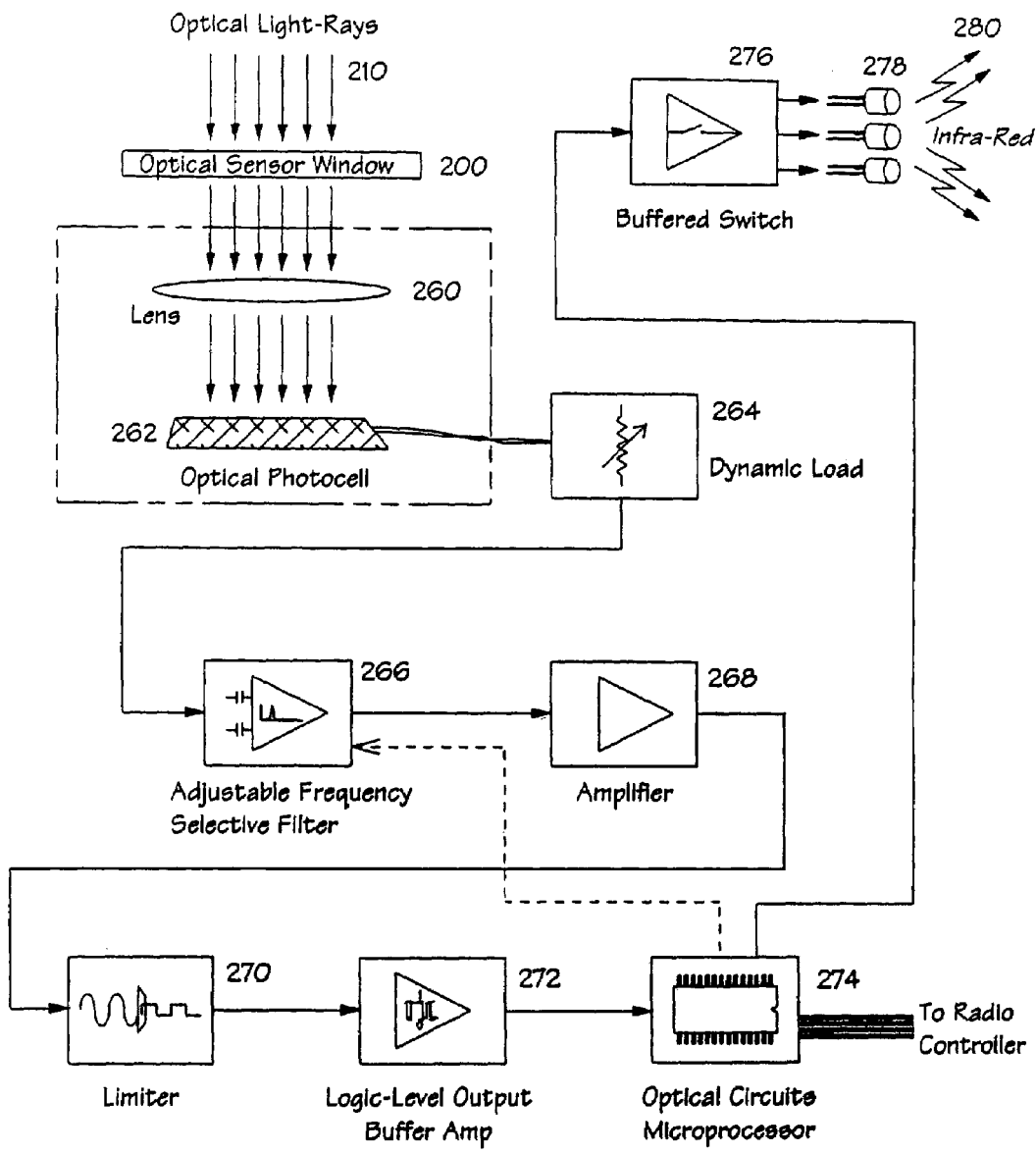
FIG. 12 shows a block diagram representation of a possible configuration of components needed to be added to an existing cellular radio-telephone to implement my invention and is demonstrative of a visual-frequency optical implementation of my invention, as opposed to an infrared implementation.

FIG. 12 like FIG. 11 is a block diagram which is demonstrative of a suggested alternative design for the optical circuitry of FIG. 8. The references of Optical Light (210) and Optical Sensor Window (200) are the same as in FIG. 8. However, FIG. 12 is demonstrative of optical circuitry designed to utilize the visible spectrum and not the infrared as in the earlier FIG's. In addition, FIG. 12 demonstrates some optional, more sophisticated functions that can be contained within the Optical Signal Decoder Circuitry (214) of FIG. 8.

As previously mentioned, the Optical Light-Rays (210) and the Optical Sensor Window (200) are the same as in FIG. 8, however the Optical Sensor Window (200) would not make use of an infrared filtering option. Furthermore, the Optical Sensor Assembly (212) of FIG. 8 now consists of an added Optical Lens (260) besides the new Optical Photocell (262), replacing the Infrared Optical Diode Detector (250) in FIG. 11.

The optional Optical Lens (260) can be used to concentrate or focus the received Optical Light-rays (210) on to the Optical Photocell (262) in order to either increase the effective range that the invention can be used, or to give preference to the direction from which optical data is received.

The Optical Photocell (262) facilitates the reception of light-wave energy and the conversion of said light energy into electrical energy. The electrical energy contains the signaling transmitted within the Optical Light-rays (210).

The optional Dynamic Load (264) is used to prevent clipping of the received light signals that is possible under certain strong lighting conditions. The Dynamic Load (264) changes its impedance in response to overall received light levels so that the final output of the photocell is near the middle of its output range. It is important to note that even significantly clipped, and therefore, distorted optical signals can still be effectively decoded even without a dynamic load. The purpose of the Dynamic Load (264) shown here is to simply demonstrate one possible way to improve the signal-to-noise margins of such signals.

The output of the Dynamic Load (264) is fed to the Adjustable Frequency-Selective Filter (266). The Adjustable Frequency-Selective Filter (266) is representative of a filter circuit that first blocks any direct current (DC) voltage component generated by the Optical Light-rays (210) striking the Optical Photocell (262). All remaining signals consist of voltages that vary with time. Of the remaining time-varying voltages, only those that fit within the presently selected parameters of the frequency-selective filter circuitry contained within the Adjustable Frequency-Selective Filter (266) are allowed to pass through and on to the Amplifier (268).

Note that the parameters of the frequency selective circuitry in the Adjustable Frequency-Selective Filter (266), are under control of the local Optical Circuits Microprocessor (274). In this way, the local Optical Circuits Microprocessor (274) can selectively command the Adjustable Frequency-Selective Filter (266) to filter one of a number of possible optical carrier frequencies. This process is similar to that of selectively tuning a radio receiver to one of several channels.

The output of the Adjustable Frequency-Selective Filter (266) is passed on to the Amplifier (268). The Amplifier (268) is used to amplify the amplitude of the low-level analog, mostly sine-wave signals from the Adjustable Frequency-Selective Filter (266), to levels that are compatible with Limiter (270) that follows.

The amplified signal received into Limiter (270) is amplitude-limited in such a way so as to convert the entering sine-wave signal with varying amplitude into a square-wave signal with constant amplitude.

The output of Limiter (270) is fed to a Logic-Level Output Buffer Amplifier (272). The Logic-Level Output Buffer Amplifier (272) is used to amplify the lower-level but limited amplitude of the received signal to an amplitude of voltage that is compatible with the Optical Circuits Microprocessor (274).

The output of the Logic-Level Output Buffer Amplifier (272) is fed to the Optical Circuits Microprocessor (274) where the data contained within said signal is decoded using software algorithms. The Optical Circuits Microprocessor (274) selectively stores or forwards the decoded data to the cellular radio-telephone microprocessing circuitry for use when and as needed. In this way, the Optical Circuits Microprocessor (274) relieves the cellular radio-telephone microprocessing circuitry from having to otherwise constantly monitor and decode the received optical signals.

Data to be transmitted is fed from an output port of the Optical Circuits Microprocessor (274) to the input of the optical transmitter Buffered Switch (276). The Buffered Switch (276) circuitry could be schematically similar to the circuitry contained in FIG. 4. That is, it should contain a buffer circuit that allows the Optical Circuits Microprocessor (274) to control the power to the Infrared Light Emitting Diodes (278), while being protected from the full operating current load.

The optical transmitter's Buffered Switch (276) powers the three Infrared Light Emitting Diodes (278). Note that this example uses three Infrared LED's, but any number of LED's can be used.

The Infrared Light Emitting Diodes (278) emit Transmitted Light-Wave Energy (280) which is directed towards In-House or other optical receivers. The Infrared Light Emitting Diodes (278) can be arranged in a group, or they can be distributed about the housing oriented in different directions of transmission.

It is important to note that all functional blocks of FIGS. 8, 11, and 12, are shown for purposes of discussion only, and nothing therein should be construed to imply their necessary configuration or even presence for my invention to work. Indeed several other optical schemes, operating at different wave-lengths, are possible. Similar embodiments based on infrared, visible, or ultra-violet optical communications, or a combination thereof, or a mix of one spectrum for transmission and a different spectrum for reception, are anticipated by this invention.

Figure 13:
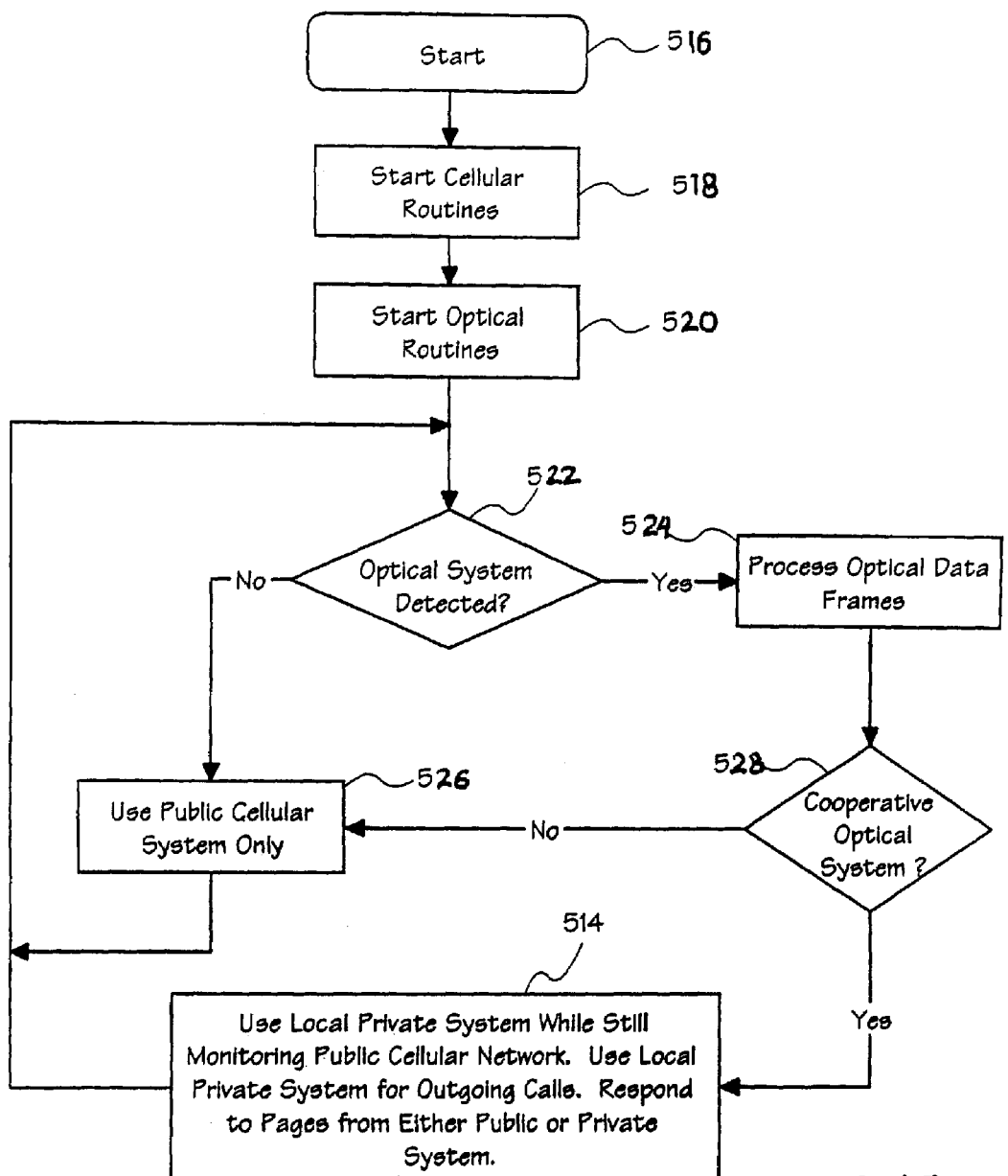
FIG. 13 shows a basic flow-chart diagram that software for implementation of my invention in the preferred embodiment could follow.

FIG. 13 is a flow chart that is representative of an over-all-view that a possible implementation of software for the operation of the main embodiment might follow. The flowchart consists of 7 blocks.

In FIG. 13, block 516 is an initialization block and is marked "Start". The software routine starts here.

Block 518 represents the start of the cellular radio initialization routines. It is here where the cellular radio, signal processing, and digital circuits, work together to determine how many and which cellular Public Carrier radio systems are within range of the unit. It is also here where the system identifications are checked to determine if the unit is within range of the home system assigned to the unit. For the purposes of this flowchart, it will be presumed that the cellular radio-telephone is within range of the assigned home system.

Block 520 represents the start of the software routine whereby the microprocessor starts to determine if it is receiving compatible optical transmissions. For the purposes of this flowchart, it will be presumed that the microprocessor used to decode and control the optical circuits is the same microprocessor that controls the device's radio circuits. However, this need not be the case as the use of multiple microprocessors is also possible.

To clarify the function of block 520 further, the optical sensor is always receiving light signals. Even if there are no compatible optical transmitters in the area, the optical sensor will still receive light signals from sources such as the sun and light bulbs. If however, the received light signals are modulated at the correct carrier frequency, then the signals must have been transmitted by a frequency-compatible optical transmitter.

Block 522 represents the function of the microprocessing routine making a determination as to whether an optical system is present and to branch accordingly. The microprocessor routine determines the existence of an optical system by detecting the reception of a carrier-frequency-compatible optical signal that is formatted properly. That is, in this flowchart example, it is presumed that the optical signals will be transmitted with data signal preambles and end with sum-checks that will allow the microprocessor to synchronize to the data stream, and confirm the presence of a format that is system-compatible with the device.

Block 524 represents the processing of received optical data frames. That is, this flowchart example presumes that optical data is transmitted in the form of data frames. A data frame can hold such information as System ID, channel information, paging messages, and voice channel assignments, etc. In this example, an optical data frame is presumed to consist of sync bits, followed by a formatted data string, followed by a checksum.

Block 524 also represents the gathering and storage of decoded data frame data into device memory. As each data frame is received and decoded, the category of data frame is used to determine where to store the data. For example, if the data frame is a System ID frame, then the System ID data is stored in the device's memory for future use.

Block 528 is a decision block wherein the microprocessor compares the received Optical System ID to a previously stored list of optical system ID's of where the device is granted permission to operate (a "Cooperative System"). If the device's software determines that it is in range of a Cooperative System, then the software routine branches to block 514; otherwise, it branches to block 526.

Block 514 represents optimal operating conditions of a device conforming to this embodiment. That is, the device has access to both a wide-area Public Carrier radio cellular system, and a private In-House system.

The device's software will use the In-House system for all outgoing paging responses and outgoing status messages; and unless manually overridden by the user, all outgoing phone calls. Both radio and optical control channel's will be monitored for incoming phone calls, and the software will respond accordingly. Additionally, the optical control channel will be monitored for any incoming paging or messaging.

To be clear, in this particular example of optical system operation, the device uses radio channels for all voice communication. The optical channel(s) is (are) used only for system control, limited messaging and status functions, and other house keeping functions.

Once the device's software has entered the operating mode as indicated in block 514, the software then returns to block 522 to determine if conditions have changed.

Back at block 522, should the device's software not detect the presence of an optical system, then the software will branch to block 526. Block 526 indicates that the software will enter a mode whereby the Public Carrier radio cellular system will be used for all radio-telephone functions. In-House paging and status functions will not be available.

Back at block 528, should the device's software not detect the optical presence of a Cooperative System, then the software will branch to block 526. Block 526 indicates that the software will enter a mode whereby the Public Carrier radio cellular system will be used for all radio-telephone functions. In-House paging and status functions will not be available.

After entering the functional mode indicated by block 526, the software will return to block 522 in an attempt to establish the presence of an optical system.

As in other examples herein, nothing in the flowchart should, nor should the flowchart itself, be in any way interpreted as limiting what software routines are possible, or in what format data is transmitted or received. FIG. 13 serves as only one of several possible examples of software routines.

FIGS. 18A through 19D utilize block diagram symbols that represent common circuitry functions. FIGS. 18A through 19D serve to demonstrate the wide span of combinations of radio and optical circuitry that are feasible and anticipated as useful in this invention. Each of these block diagram symbols are described as follows:

The Optical Transmitter Means (156) and the Additional Optical Transmitter(s) Means (164) Symbols The Optical Transmitter Means (156) is a symbol representing circuitry that can transmit optical energy through free-space or atmosphere, and can operate anywhere on or near the infrared, visible, or ultraviolet spectrums or regions of optical frequencies. The light emitting element or elements of the Optical Transmitter Means (156) is/are presumed to have unobstructed access to the free-space or the atmosphere through the housing of any apparatus that it serves. An apparatus or device may make the use of none, one, or more, optical transmitters.

Note that the Optical Transmitter Means (156) may have more than one light emitting element and/or assembly; and if so, not all light emitting elements and/or assemblies must be oriented in the same direction; nor must they utilize the same optical frequency. Indeed, it is recognized that a useful gain in reliability and ease of operation will be realized should multiple light emitting elements and/or assemblies be distributed about any hand-held apparatus or device. In this way, objects that obstruct or attenuate the emitted light of one emitting element or assembly, would not so likely obstruct or attenuate the emitted light of a second; and so forth.

Even though the Optical Transmitter Means (156) may have more than one light emitting element or assembly, it and all the light emitting elements and/or assemblies, and any and all focusing or diffusing elements, are never-the-less represented by the one symbol.

Focusing elements include such items as convex or compounded lenses used to focus the light to a narrower beam than the light emitting element otherwise emits. Diffusing elements include such items as concave or compounded lenses that spread the emitted light beam. Diffusing elements also include certain materials such as translucent plastics, and materials comprised of optical diffraction grating, which also causes the beam of the light emitting element to spread or change direction.

Optical Transmitter Means (156) represents the first optical transmitter in any device. The Additional Optical Transmitter(s) Means (164), represents one or more additional optical transmitters in any apparatus or device. Said additional optical transmitters tend to operate at different optical frequencies from the first Optical Transmitter Means (156), but such operation at different optical frequencies is not necessary.

The Optical Receiver Means (158) and the Additional Optical Receiver(s) Means (166) Symbols The Optical Receiver Means (158) is a symbol representing circuitry that can receive optical energy that was sent through free-space or atmosphere, and can operate anywhere on or near the infrared, visible, or ultraviolet spectrums or regions of optical frequencies. The light detector or detectors of the Optical Receiver Means (158) is/are presumed to have unobstructed access to the free-space or atmosphere through the housing of any apparatus that it serves. An apparatus or device may make the use of none, one, or more, optical receivers.

Note that in a similar fashion to the Optical Transmitter Means (156), the Optical Receiver Means (158) may have more than one light sensing element and/or assembly, and if so, not all light sensing elements and/or assemblies must be oriented in the same direction; nor must they be sensitive to the same optical frequency. Indeed, it is again recognized that a useful gain in reliability and ease of operation will be realized should multiple light sensing elements and/or assemblies be distributed about any hand-held apparatus or device. In this way, objects that obstruct or attenuate the incoming light of one sensing element or assembly, would not so likely obstruct or attenuate the incoming light of a second; and so forth.

Even though the Optical Receiver Means (158) may have more than one light sensing element or assembly; it, and all the light sensing elements and/or assemblies, and any and all focusing or diffusing elements, are never-the-less represented by the one symbol.

Focusing elements include such items as convex or compounded lenses used to focus the incoming light on to the sensing element. Diffusing elements include such items as concave or compounded lenses that collect incoming light-rays from wide angles, and focus said light-rays onto the light sensing element.

Optical Receiver Means (158) represents the first optical receiver in any apparatus or device. The Additional Optical Receiver(s) Means (166), represents one or more additional optical receivers in any apparatus or device. Said additional optical receivers tend to operate at different optical frequencies from the first Optical Receiver Means (158), but such operation at different optical frequencies is not necessary.

Optical Transceivers

Communication devices can utilize both an Optical Transmitter Means (156) and an Optical Receiver Means (158). Both the Optical Transmitter Means (156) and the Optical Receiver Means (158) can independently operate anywhere on or near the infrared, visible, or ultraviolet spectrums or regions of optical frequencies. The Optical Transmitter Means (156) and the Optical Receiver Means (158) can operate in different optical spectrums from each other, or in the same spectrums but utilizing different optical frequencies, or in the same spectrums and same optical frequencies but utilizing different carrier frequencies.

Note that the combination of both Optical Transmitter Means (156) and Optical Receiver Means (158) into one assembly or one housing, with or without support or controlling or other circuitry, is known herein as an Optical Transceiver (an "Optical Transceiver").

The Radio Transmitter Means (152) and the Additional Radio Transmifter(s) Means (160) Symbols The Radio Transmitter Means (152) is a symbol representing circuitry that can transmit radio energy through free-space or atmosphere, and can operate at any radio frequency, and use any form of modulation. These devices can be operated on either privately-owned radio systems, or on systems owned and operated by an RCC (Radio Common Carrier) or CCC (Communications Common Carrier).

The radio transmitter can make the use of Public Carrier systems and technology such as traditional two-way radio, SMR (Specialized Mobile Radio), "trunked" two-way radios, Cellular, and/or PCS radio, etc.

An apparatus or device may make the use of none, one, or more, radio transmitters. Radio Transmitter Means (152) represents the first radio transmitter in any apparatus or device. The Additional Radio Transmitter(s) (160), represents the one or more additional radio transmitters in any apparatus or device. Said additional radio transmitters are operated at different radio frequencies from the first.

The Radio Receiver Means (154) and the Additional Radio Receiver(s) Means (162) Symbols The Radio Receiver Means (154) is a symbol representing circuitry that can receive radio energy sent through free-space or atmosphere, operating anywhere on any radio frequency, modulated by any method. Like the Radio Transmitter Means (152), the Radio Receiver Means (154) can be operated on either privately-owned radio systems, or on systems owned and operated by an RCC (Radio Common Carrier) or CCC (Communications Common Carrier).

The Radio Receiver Means (154) can make the use of private or Public Carrier systems and technology such as one or two-way radio paging, traditional two-way radio, SMR (Specialized Mobile Radio), "trunked" two-way radios, Cellular, and/or PCS radio, etc.

An apparatus or device may make the use of none, one, or more, optical receivers.

Radio Receiver Means (154) symbol represents the first radio receiver in any device. The Additional Radio Receiver(s) (162) symbol, represents the one or more additional radio receivers in any apparatus or device. Said additional radio receivers operate at different radio frequencies from the first Radio Receiver Means (154).

Radio Transceivers

Communications apparatus and devices can utilize both a Radio Transmitter Means (152) and a Radio Receiver Means (154). Both the Radio Transmitter Means (152) and the Radio Receiver Means (154) can independently operate anywhere in the radio spectrum and utilize any form of modulation. The Radio Transmitter Means (152) and the Radio Receiver Means (154) can operate on different carrier frequencies, and may be duplexed.

Note that the combination of both Radio Transmitter Means (152) and Radio Receiver Means (154) into one assembly or one housing, with or without support or controlling or other circuitry, is known herein as a Radio Transceiver (a "Radio Transceiver").

The Controlling Means (151) Symbol

The Controlling Means Symbol (151) represents the support and controlling circuitry necessary to operate the optical and radio circuitry as represented by the attached block symbols.

By way of illustration only, the Controlling Means Symbol (151) includes, but is not limited to: external and internal power supplies, charging circuits, batteries, general support circuitry, microprocessor circuitry, logic circuitry, control circuitry, control software, control firmware, audio switching and coupling circuitry, audio filtering circuitry, external radio antenna duplexors, external radio antenna combiners, external radio antenna bandpass and/or notch and/or reject filters, external antenna switching circuitry, external radio antenna multi-couplers, external radio ferrite isolators, external antennas, switches, keypads, push-buttons, controls, microphones, speakers, lamps, lights, light emitting diodes, displays, enunciators, vibrators, mechanical hardware, knobs, radio and analog connectors, charging contacts, escutcheons, labels, insignias, graphic symbols, and housings.

Figure 18A:
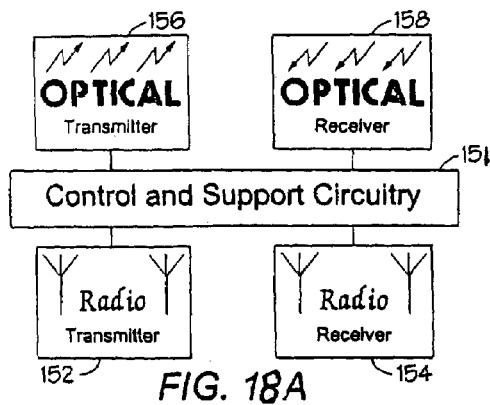
FIGS. 18A-18F show block diagrams of possible configurations of both radio transmitters and receivers and optical transmitters and receivers.

FIG. 18A shows that the communications device can utilize both an Optical Transmitter Means (156) and an Optical Receiver Means (158). FIG. 18A further shows that the communications device can utilize both a Radio Transmitter Means (152) and a Radio Receiver Means (154). That is, the communications device can utilize both an optical transceiver and an radio transceiver. The Controlling Means (151) represents the required support and controlling circuitry.

Figure 18B:
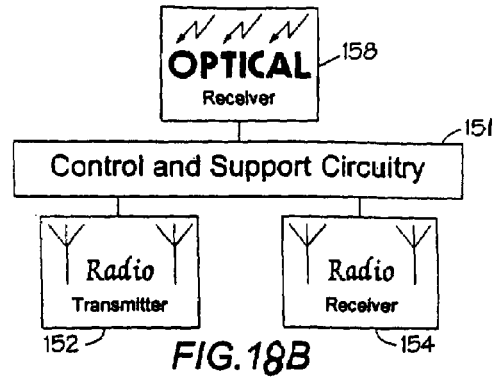

FIG. 18B shows that the communications device can utilize an Optical Receiver Means (158) only, and a Radio Transmitter Means (152) and a Radio Receiver Means (154). The Controlling Means (151) represents the required support and controlling circuitry.

Figure 18C:
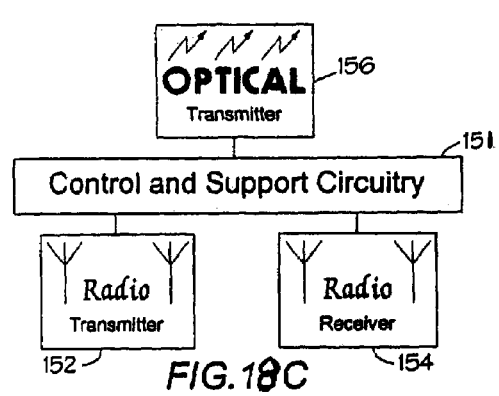

FIG. 18C shows that the communications device can utilize an Optical Transmitter Means (156) only, and a Radio Transmitter Means (152) and a Radio Receiver Means (154) [a radio transceiver]. The Controlling Means (151) represents the required support and controlling circuitry.

Figure 18D:
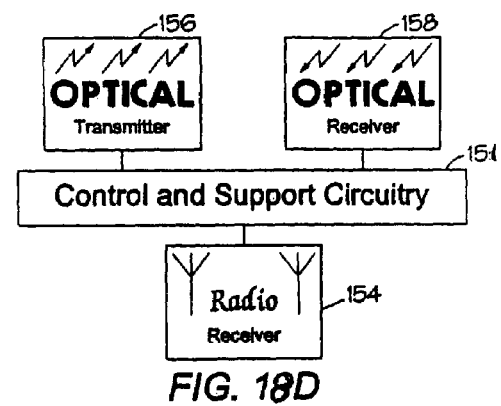

FIG. 18D shows that the communications device can utilize both an Optical Transmitter Means (156) and an Optical Receiver Means (158) [an optical transceiver]; and a Radio Receiver Means (154) only. The Controlling Means (151) represents the required support and controlling circuitry.

Figure 18E:
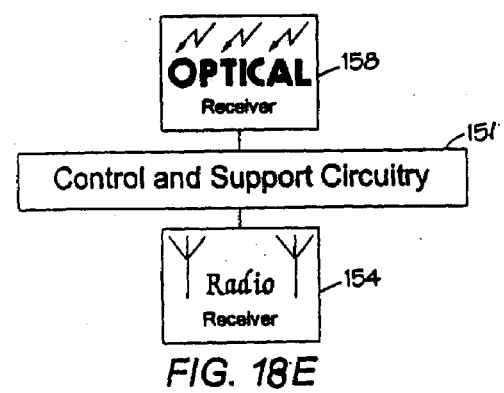

FIG. 18E shows that the communications device can utilize an Optical Receiver Means (158) only, and a Radio Receiver Means (154) only. The Controlling Means (151) represents the required support and controlling circuitry.

Figure 18F:
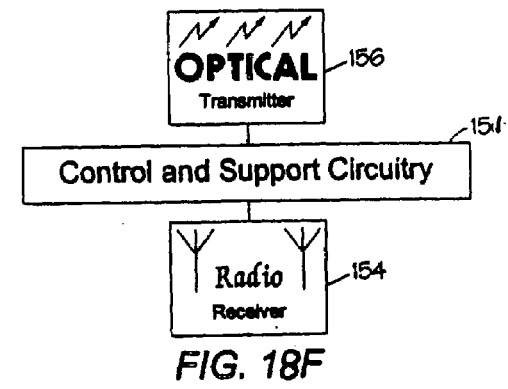

FIG. 18F shows that the communications device can utilize an Optical Transmitter Means (156) only, and a Radio Receiver Means (154) only. The Controlling Means (151) represents the required support and controlling circuitry.

Figure 19A:
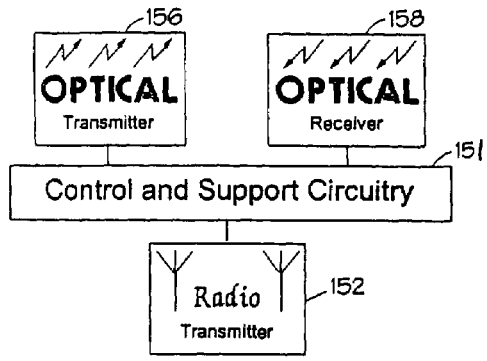
FIGS. 19A-19D show additional block diagrams of possible configurations of both radio transmitters and receivers and optical transmitters and receivers.

FIG. 19A shows that the communications device can utilize both an Optical Transmitter Means (156) and an Optical Receiver Means (158) [an optical transceiver]; and a Radio Transmitter Means (152) only. The Controlling Means (151) represents the required support and controlling circuitry.

Figure 19B:
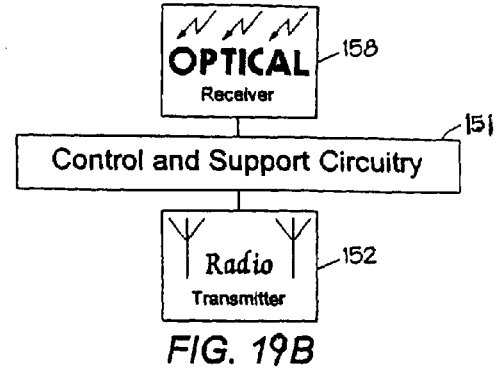

FIG. 19B shows that the communications device can utilize an Optical Receiver Means (158) only, and a Radio Transmitter Means (152) only. The Controlling Means (151) represents the required support and controlling circuitry.

Figure 19C:
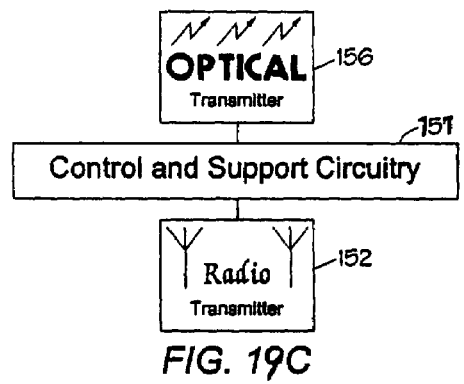

FIG. 19C shows that the communications device can utilize an Optical Transmitter Means (156) only, and a Radio Transmitter Means (152) only. The Controlling Means (151) represents the required support and controlling circuitry.

Figure 19D:
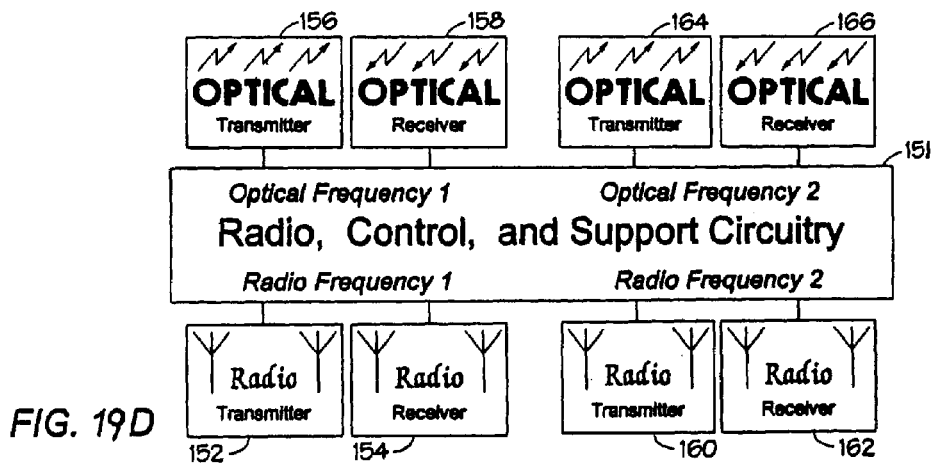

FIG. 19D shows that the communications device can utilize an Optical Transmitter Means (156) and additional Alternative Optical Transmitter(s) Means (164), each tuned to the same or different optical or carrier frequencies.

FIG. 19D also shows that the communications device can utilize an Optical Receiver Means (158) and additional Alternative Optical Receiver(s) (166), each tuned to the same or different optical or carrier frequencies.

Likewise, FIG. 19D also shows that the communications device can utilize a Radio Transmitter Means (152) and additional Alternative Radio Transmitter(s) Means (160), each tuned to different carrier frequencies. Furthermore, FIG. 13D also shows that the communications device can utilize a Radio Receiver Means (154) and additional Alternative Radio Receiver(s) Means (162), each tuned to the same or different carrier frequencies as the transmitters.

The use of multiple radio transceivers and optical transceivers allows for wider band-widths (or speed) of communication. The use of multiple radio receivers (or transceivers) also facilitates the concurrent reception of data or signals generated from multiple independent transmission points. The use of multiple transmitters (or transceivers) allows for the transmission of data to a multiple of independent radio systems.

Note that part names as used herein are descriptive only, and should not be taken as limiting their function or purpose. It is important to note that functional blocks in the figures are shown for purposes of discussion only, and nothing therein should be construed to imply their necessary configuration or even presence for my invention to work. In addition, similar embodiments based on ultra-sound, very-low-frequency radio, high-frequency radio, or microwave radio frequency communications, or a combination thereof, or a mix of radio or optical spectrum for transmission and the other spectrum for reception; are anticipated by this invention.

The use of the word "device" herein, in general, refers to the entire apparatus and/or method of the invention.

The main embodiment of the invention describes a low-power radio transmitter, enclosed in a clip-on housing, designed to clip-on to a fluorescent lamp tube. The configuration allows for the transmission of fixed data messages, such as a serial number, while allowing for the transmission of other data messages that can be modified in the field. This embodiment, while not the most basic embodiment of my invention, is never-the-less one of the more useful and lesser expensive embodiments.

It is important to note that several wireline or wireless data exchange techniques exist and can be used with the invention. The data transfer techniques discussed and illustrated herein are for purposes of discussion only, and should not be construed to limit the scope of the invention.

Figure 20:
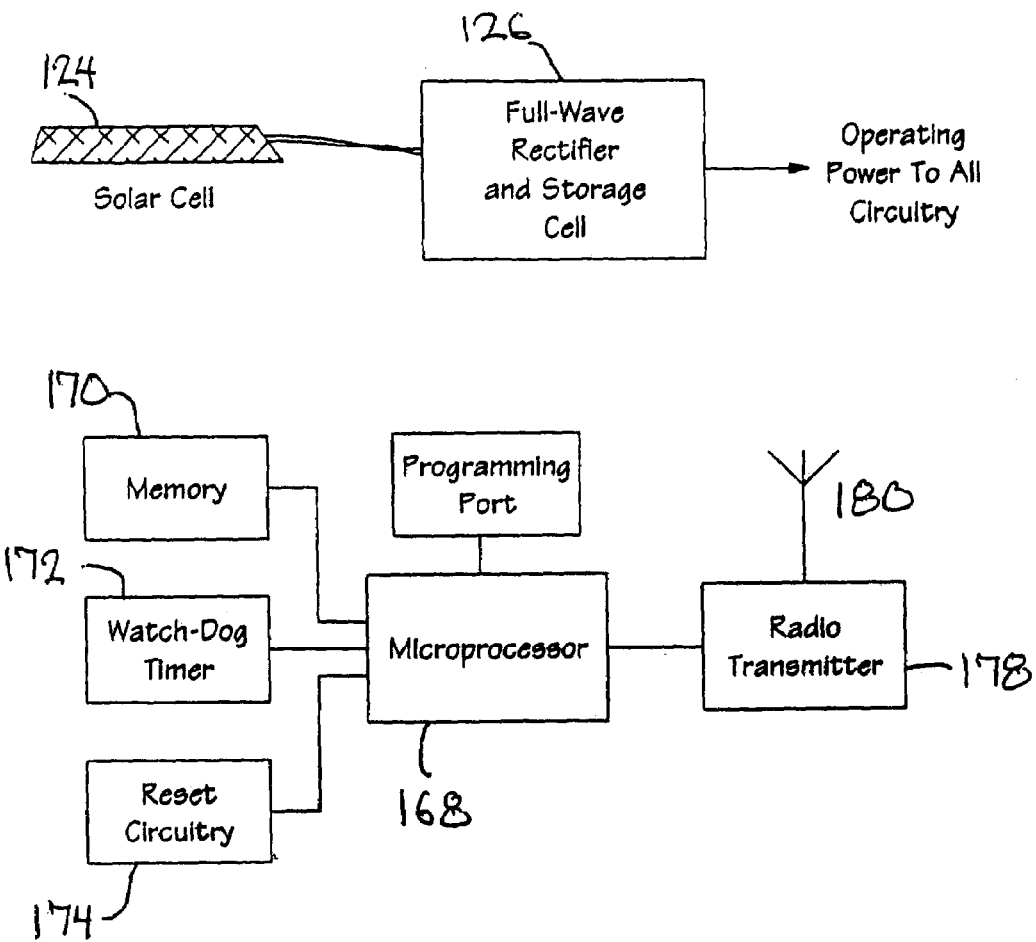
FIG. 20 is a block diagram of the main embodiment of my invention.

FIG. 20 is a diagram showing the basic circuitry necessary to implement a basic version of the main embodiment of the invention. The power supply section consists of Solar Cell (124) and Rectifier and Storage Cell (126). Solar Cell (124) takes in light energy that is lamp light or sunlight. The output of Solar Cell (124) is then coupled to Rectifier and Storage Cell (126) whereby it is conditioned and at least some of the energy is stored for later use. Rectifier and Storage Cell (126) may or may not include a voltage or current regulator or limiting circuit. The diagrams of Solar Cell (124) and Rectifier and Storage Cell (126) are common throughout the remaining alternat embodiments, but this should not be taken as to limit their embodiments as being identical to each other or without variation.

Note that Solar Cell (124) may in fact represent more than one solar cell, and said solar cells do not necessarily need to aimed in the same direction or towards the same source. Indeed, one anticipated application of the invention is that a housing and/or device could be designed to utilize power from a lamp or lighting source when it's available, while also attempting to use sunlight or another light energy source when it's available. For example, a descriptive location transmitting device installed on or near an outside light fixture at Disneyland could use sunlight for a power source during the day, and the light generated by a lamp that is part of the light fixture at night.

Microprocessor (168) is used as the controlling device in this embodiment. However, nothing herein should be construed as to limit the controlling section or circuitry to be limited only to being microprocessor based. It is anticipated that logic stepping circuitry, programmable logic devices, custom integrated circuits, and other circuitry could be used instead of a microprocessor.

Although not shown, Microprocessor (168) includes logic clock and timing circuits. The controller includes the optional function blocks of Memory (170), Watch-Dog Timer (172), Reset Circuitry (174), and Programming Port (176).

Memory (170) includes ROM, RAM, EPROM, EEPROM, and any other memory circuitry. Memory (170) is used to hold operating program(s) and/or data messages or strings.

Watch-Dog Timer (172) is used to monitor the proper operation of the microprocessor related circuitry.

Reset Circuitry (174) is also used to monitor the proper operation of the microprocessor related circuitry.

Programming Port (176) is used to enter or alter data messages or operating programs or parameters of the device. Programming Port (176) may or may not be physically present on the outside of the device housing, and may or may not be wire or contact based.

Radio Transmitter (178) is typically, but not limited to, a low-powered (100 mW or less) radio transmitter. This is the radio transmitting means that is used to transmit data or messages to compatible receivers that are within range. Among the data or messages being transmitted include information about the geographic location of the transmitter, the serial number of the transmitter, and/or information that varies by location, such as closest telephone extension number and/or in the case of the outdoors, types of vegetation or directions to the closest rest room, etc.

Radio Transmitter Antenna (180) may or may not be external to the device enclosure, and may or may not be directional, and may or may not have gain or loss compared to a unity isotropic antenna.

Figure 21:
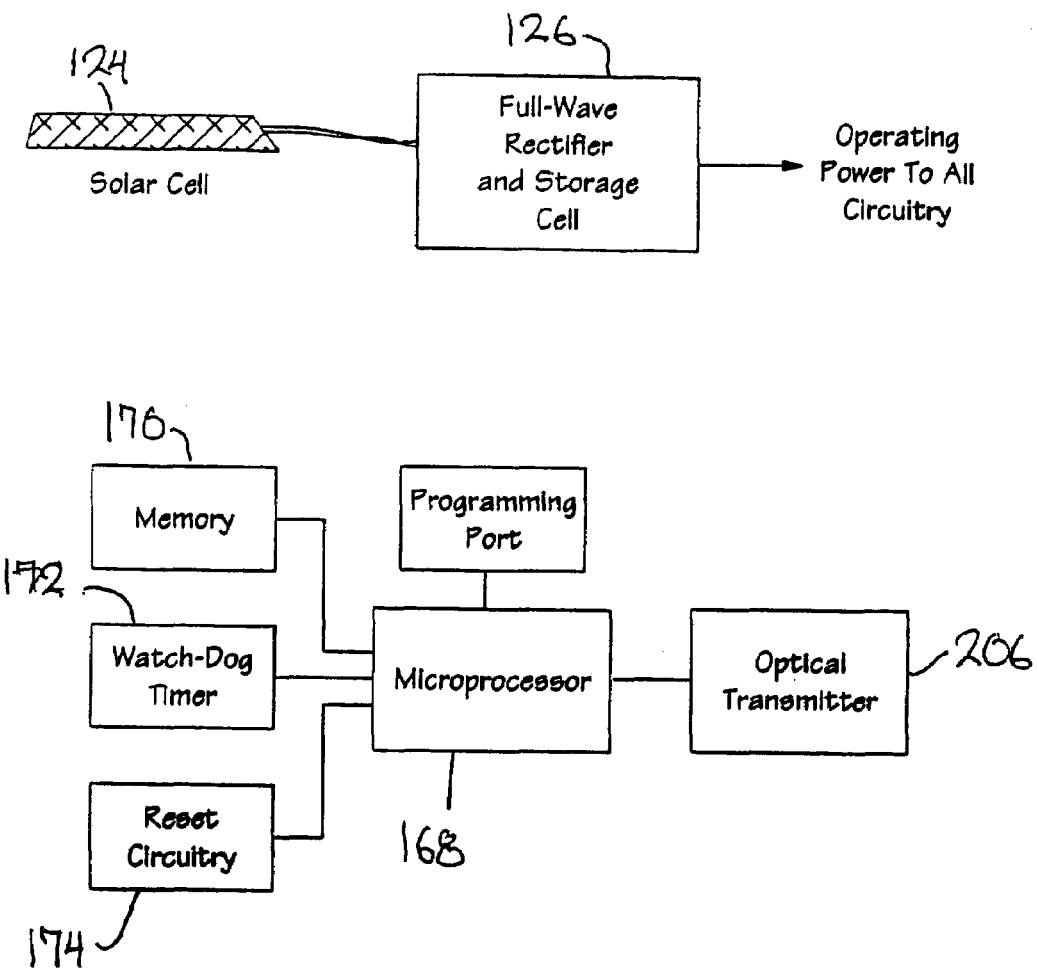
FIG. 21 is a block diagram of an alternat embodiment of my invention, using an optical transmitter.

FIG. 21 is a diagram showing the basic circuitry necessary to implement a basic version of an alternate embodiment of the invention.

As described before, the power supply section consists of Solar Cell (124) and Rectifier and Storage Cell (126). Solar Cell (124) takes in light energy that is lamp light or sunlight. The output of Solar Cell (124) is then coupled to Rectifier and Storage Cell (126) whereby it is conditioned and at least some of the energy is stored for later use. Rectifier and Storage Cell (126) may or may not include a voltage or current regulator or limiting circuit.

Note that Solar Cell (124) may in fact represent more than one solar cell, and said solar cells do not necessarily need to aimed in the same direction or towards the same source. Indeed, one anticipated application of the invention is that a housing and/or device could be designed to utilize power from a lamp or lighting source when it's available, while also attempting to use sunlight or another light energy source when it's available. For example, a descriptive location transmitting device installed on or near an outside light fixture at Disneyland could use sunlight for a power source during the day, and the light generated by a lamp that is part of the light fixture at night.

Also as described before, Microprocessor (168) is used as the controlling device in this embodiment. However, nothing herein should be construed as to limit the controlling section or circuitry to be limited only to being microprocessor based. It is anticipated that logic stepping circuitry, programmable logic devices, custom integrated circuits, and other circuitry could be used instead of a microprocessor.

Although not shown, Microprocessor (168) includes logic clock and timing circuits. As is true thought this discussion, not all of the possible ancillary, auxiliary, or support circuitry possible for inclusion with the control circuitry are shown. For example, clock-calender circuitry is certainly possible and anticipated, as is circuitry for determining and measuring the present weather conditions.

The controller includes the optional function blocks of Memory (170), Watch-Dog Timer (172), Reset Circuitry (174), and Programming Port (176).

Memory (170) includes ROM, RAM, EPROM, EEPROM, and/or any other memory circuitry. Memory (170) is used to hold operating program(s) and/or data messages or strings.

Watch-Dog Timer (172) is used to monitor the proper operation of the microprocessor related circuitry.

Reset Circuitry (174) is also used to monitor the proper operation of the microprocessor related circuitry.

Programming Port (176) is used to enter or alter data messages or operating programs or parameters of the device. Programming Port (176) may or may not be physically present on the outside of the device housing, and may or may not be wire or contact based.

Optical Transmitter (206) is typically, but not limited to, circuitry that includes one or more infrared Light Emitting Diode (LED) transmitters and associated driver circuitry. Optionally, Optical Transmitter (206) could be a fluorescent lamp or other optical source that is modulated to carry data or messages.

Optical Transmitter (206) represents the optical transmitting means that is used to transmit data or messages to compatible receivers that are within range. Among the data or messages being transmitted include information about the geographic location of the transmitter, the serial number of the transmitter, and/or information that varies by location, such as closest telephone extension number and/or in the case of the outdoors, types of vegetation or directions to the closest rest room, etc.

FIGS. 22A, 22B, 22C, and 22D, are diagrams of one of a possible many designs for the housings described and anticipated in the invention. Nothing therein or herein should be taken to limit the design of the housings, including facilities for mounting or attaching the housings. In addition, nothing herein nor therein should be taken so as to require the mounting or attaching of the invention next to or near a lighting fixture or lamp. It is anticipated by the invention that some or all of the devices may be powered directly or indirectly by sunlight.

FIG. 22A shows a end-view of a possible design of a housing that could be clipped-on to or over a T-8 sized fluorescent lamp. T8-Lamp Plastic Clip (314) is designed to be flexible and withstand the temperatures associated with fluorescent lamps and housings. Main Housing Body (312) holds Solar Cell (124) and the majority of the remaining electronic circuitry, with the possible exception of one or more elements of Optical Transmitter (206), and/or Radio Transmitter Antenna (180), and /or Radio Receiver Antenna (416), as appropriate to the configuration of the device.

Figure 22:
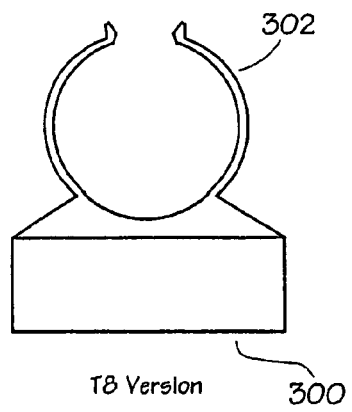
FIG. 22A is a end-view of a possible housing of the main embodiment of my invention.
FIG. 22B is a end-view of a possible housing of the main embodiment of my invention.
FIG. 22C is a top-view of a possible housing of the main embodiment of my invention.
FIG. 22D is a side-view of a possible housing of the main embodiment of my invention.
Figure 22C:
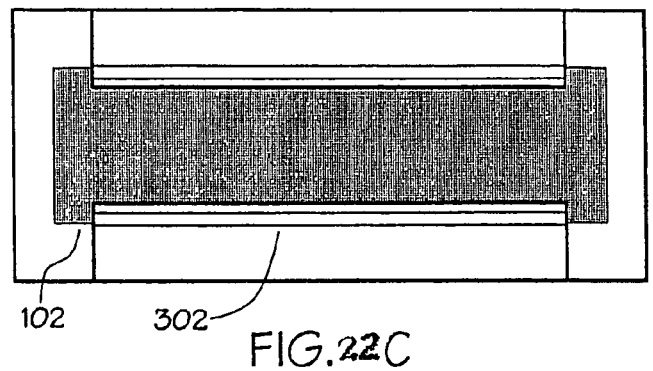
Figure 22B:
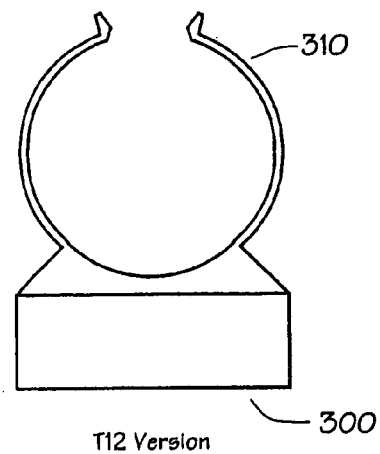

FIG. 22B likewise shows an end-view of a possible T12-Lamp Plastic Clip (310) is designed to be flexible and withstand the temperatures associated with fluorescent lamps and housings. Main Housing Body (312) holds Solar Cell (124) and the majority of the remaining electronic circuitry, with the possible exception of one or more elements of Optical Transmitter (206), and/or Radio Transmitter Antenna (180), and /or Radio Receiver Antenna (416), as appropriate to the configuration of the device.

FIG. 22C shows a top-view of a possible design of a housing that could be clipped-on to or over a fluorescent lamp. Solar Cell (124) is shown installed facing the direction of the phosphors of the fluorescent lamp. T8-Lamp Plastic Clip (314) [or in the case of a T-12 sized lamp, T12-Lamp Plastic Clip (310)] is again designed to be flexible and withstand the temperatures associated with fluorescent lamps and housings. Below Solar Cell (124), is shown but not labeled, part of Main Housing Body (312).

Figure 22D:
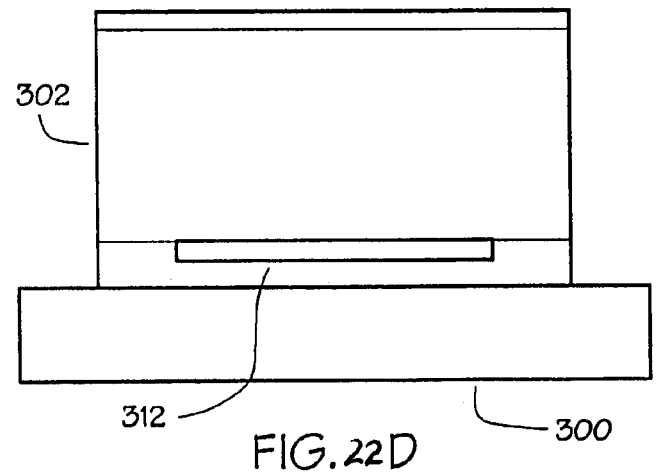

Note that FIG. 22C, nor any of FIG. 22A, 22B, or 22D, limit Solar Cell (124) as being aimed or focused only in the direction or towards the fluorescent lamp. As described above and below, one anticipated variation of the invention is that a housing and/or device could be designed to utilize power from a lamp or lighting source when it's available, while also attempting to use sunlight or another light energy source when it's available. Alternatively, the housing could be designed with a movable and adjustable solar cell assembly, thus accommodating a housing designed to be mounted to any surface, and to utilize any light source or sources.

FIG. 22D shows a side-view of a possible design of a housing that could be clipped-on to or over a fluorescent lamp. Like before, T8-Lamp Plastic Clip (314) [or in the case of a T-12 sized lamp, T12-Lamp Plastic Clip (310)] is again designed to be flexible and withstand the temperatures associated with fluorescent lamps and housings. Main Housing Body (312) is shown below T8-Lamp Plastic Clip (314).

Figure 23:
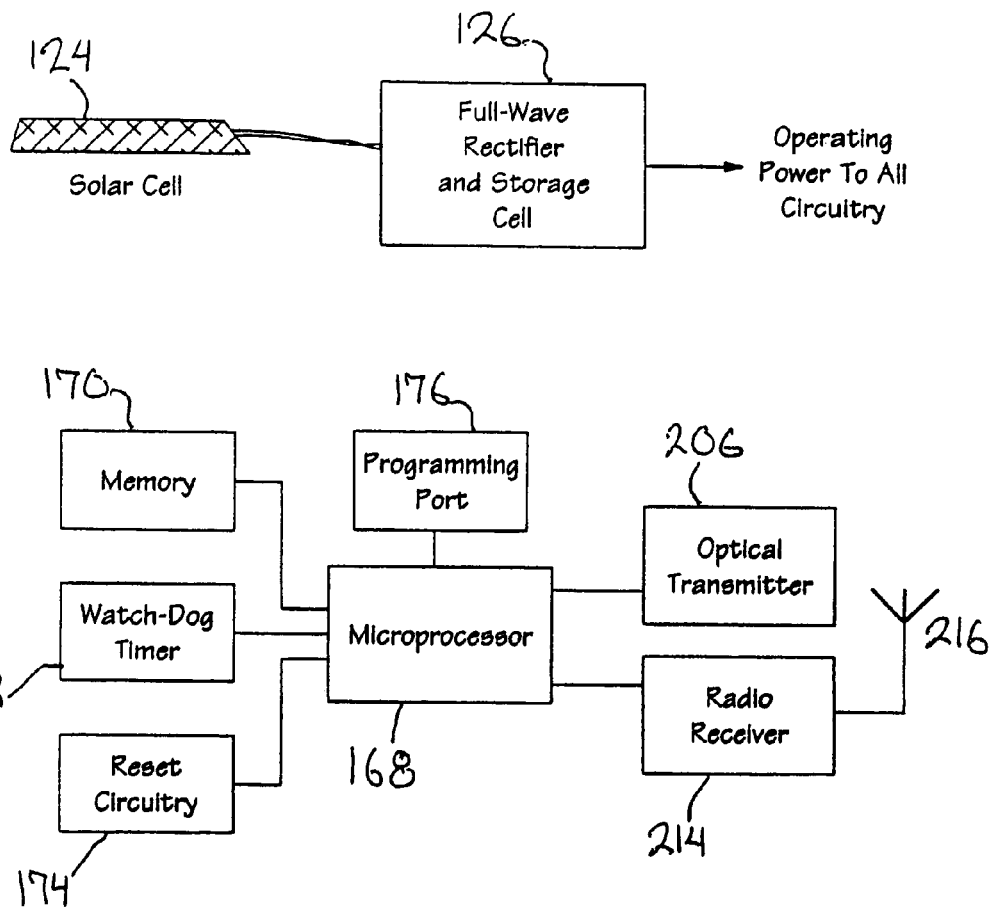
FIG. 23 is a block diagram of an alternat embodiment of my invention, using an optical transmitter and a radio receiver.

FIG. 23 is a diagram showing the basic circuitry necessary to implement a basic version of an alternate embodiment of the invention.

As described before, the power supply section consists of Solar Cell (124) and Rectifier and Storage Cell (126). Solar Cell (124) takes in light energy that is lamp light or sunlight. The output of Solar Cell (124) is then coupled to Rectifier and Storage Cell (126) whereby it is conditioned and at least some of the energy is stored for later use. Rectifier and Storage Cell (126) may or may not include a voltage or current regulator or limiting circuit.

Note that Solar Cell (124) may in fact represent more than one solar cell, and said solar cells do not necessarily need to aimed in the same direction or towards the same source. Indeed, one anticipated application of the invention is that a housing and/or device could be designed to utilize power from a lamp or lighting source when it's available, while also attempting to use sunlight or another light energy source when it's available. For example, a descriptive location transmitting device installed on or near an outside light fixture at Disneyland could use sunlight for a power source during the day, and the light generated by a lamp that is part of the light fixture at night.

Also as described before, Microprocessor (168) is used as the controlling device in this embodiment. However, nothing herein should be construed as to limit the controlling section or circuitry to be limited only to being microprocessor based. It is anticipated that logic stepping circuitry, programmable logic devices, custom integrated circuits, and other circuitry could be used instead of a microprocessor.

Although not shown, Microprocessor (168) includes logic clock and timing circuits. The controller includes the optional function blocks of Memory (170), Watch-Dog Timer (172), Reset Circuitry (174), and Programming Port (176).

Memory (170) includes ROM, RAM, EPROM, EEPROM, and/or any other memory circuitry. Memory (170) is used to hold operating program(s) and/or data messages or strings.

Watch-Dog Timer (172) is used to monitor the proper operation of the microprocessor related circuitry.

Reset Circuitry (174) is also used to monitor the proper operation of the microprocessor related circuitry.

Programming Port (176) is used to enter or alter data messages or operating programs or parameters of the device. Programming Port (176) may or may not be physically present on the outside of the device housing, and may or may not be wire or contact based.

Optical Transmitter (206) is typically, but not limited to, circuitry that includes one or more infrared Light Emitting Diode (LED) transmitters and associated driver circuitry. Optionally, Optical Transmitter (206) could be a fluorescent lamp or other optical source that is modulated to carry data or messages.

Optical Transmitter (206) represents the optical transmitting means that is used to transmit data or messages to compatible receivers that are within range. Among the data or messages being transmitted include information about the geographic location of the transmitter, the serial number of the transmitter, and/or information that varies by location, such as closest telephone extension number and/or in the case of the outdoors, types of vegetation or directions to the closest rest room, etc.

Radio Receiver (414) is a radio-based receiver that is used to receive data or messages that will be transmitted by the device, or otherwise control, program, or alter the behavior of, the device.

Radio Receiver Antenna (416) may or may not be external to the device enclosure, and may or may not be directional, and may or may not have gain or loss compared to a unity isotropic antenna.

Figure 24:
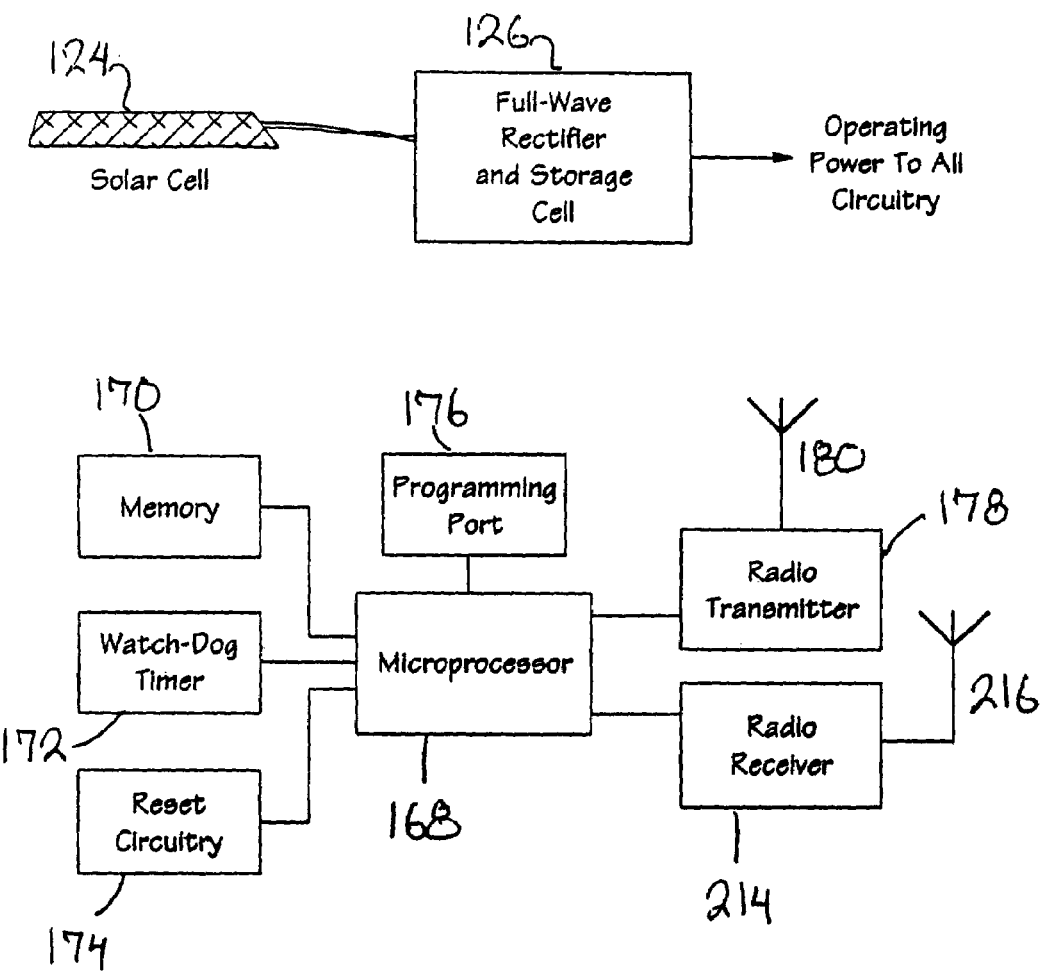
FIG. 24 is a block diagram of an alternat embodiment of my invention, using a radio transmitter and a radio receiver.

FIG. 24 is a diagram showing the basic circuitry necessary to implement a basic version of an alternate embodiment of the invention.

As described before, the power supply section consists of Solar Cell (124) and Rectifier and Storage Cell (126). Solar Cell (124) takes in light energy that is lamp light or sunlight. The output of Solar Cell (124) is then coupled to Rectifier and Storage Cell (126) whereby it is conditioned and at least some of the energy is stored for later use. Rectifier and Storage Cell (126) may or may not include a voltage or current regulator or limiting circuit.

Note that Solar Cell (124) may in fact represent more than one solar cell, and said solar cells do not necessarily need to aimed in the same direction or towards the same source. Indeed, one anticipated application of the invention is that a housing and/or device could be designed to utilize power from a lamp or lighting source when it's available, while also attempting to use sunlight or another light energy source when it's available. For example, a descriptive location transmitting device installed on or near an outside light fixture at Disneyland could use sunlight for a power source during the day, and the light generated by a lamp that is part of the light fixture at night.

Also as described before, Microprocessor (168) is used as the controlling device in this embodiment. However, nothing herein should be construed as to limit the controlling section or circuitry to be limited only to being microprocessor based. It is anticipated that logic stepping circuitry, programmable logic devices, custom integrated circuits, and other circuitry could be used instead of a microprocessor.

Although not shown, Microprocessor (168) includes logic clock and timing circuits. The controller includes the optional function blocks of Memory (170), Watch-Dog Timer (172), Reset Circuitry (174), and Programming Port (176).

Memory (170) includes ROM, RAM, EPROM, EEPROM, and/or any other memory circuitry. Memory (170) is used to hold operating program(s) and/or data messages or strings.

Watch-Dog Timer (172) is used to monitor the proper operation of the microprocessor related circuitry.

Reset Circuitry (174) is also used to monitor the proper operation of the microprocessor related circuitry.

Programming Port (176) is used to enter or alter data messages or operating programs or parameters of the device. Programming Port (176) may or may not be physically present on the outside of the device housing, and may or may not be wire or contact based.

Radio Transmitter (178) is typically, but not limited to, a low-powered (100 mW or less) radio transmitter. This is the radio transmitting means that is used to transmit data or messages to compatible receivers that are within range. Among the data or messages being transmitted include information about the geographic location of the transmitter, the serial number of the transmitter, and/or information that varies by location, such as closest telephone extension number and/or in the case of the outdoors, types of vegetation or directions to the closest rest room, etc.

Radio Transmitter Antenna (180) may or may not be external to the device enclosure, and may or may not be directional, and may or may not have gain or loss compared to a unity isotropic antenna.

Radio Receiver (414) is a radio-based receiver that is used to receive data or messages that will be transmitted by the device, or otherwise control, program, or alter the behavior of, the device.

Radio Receiver Antenna (416) may or may not be external to the device enclosure, and may or may not be directional, and may or may not have gain or loss compared to a unity isotropic antenna, and may or may not be separate from Radio Transmitter Antenna (180).

Figure 25:
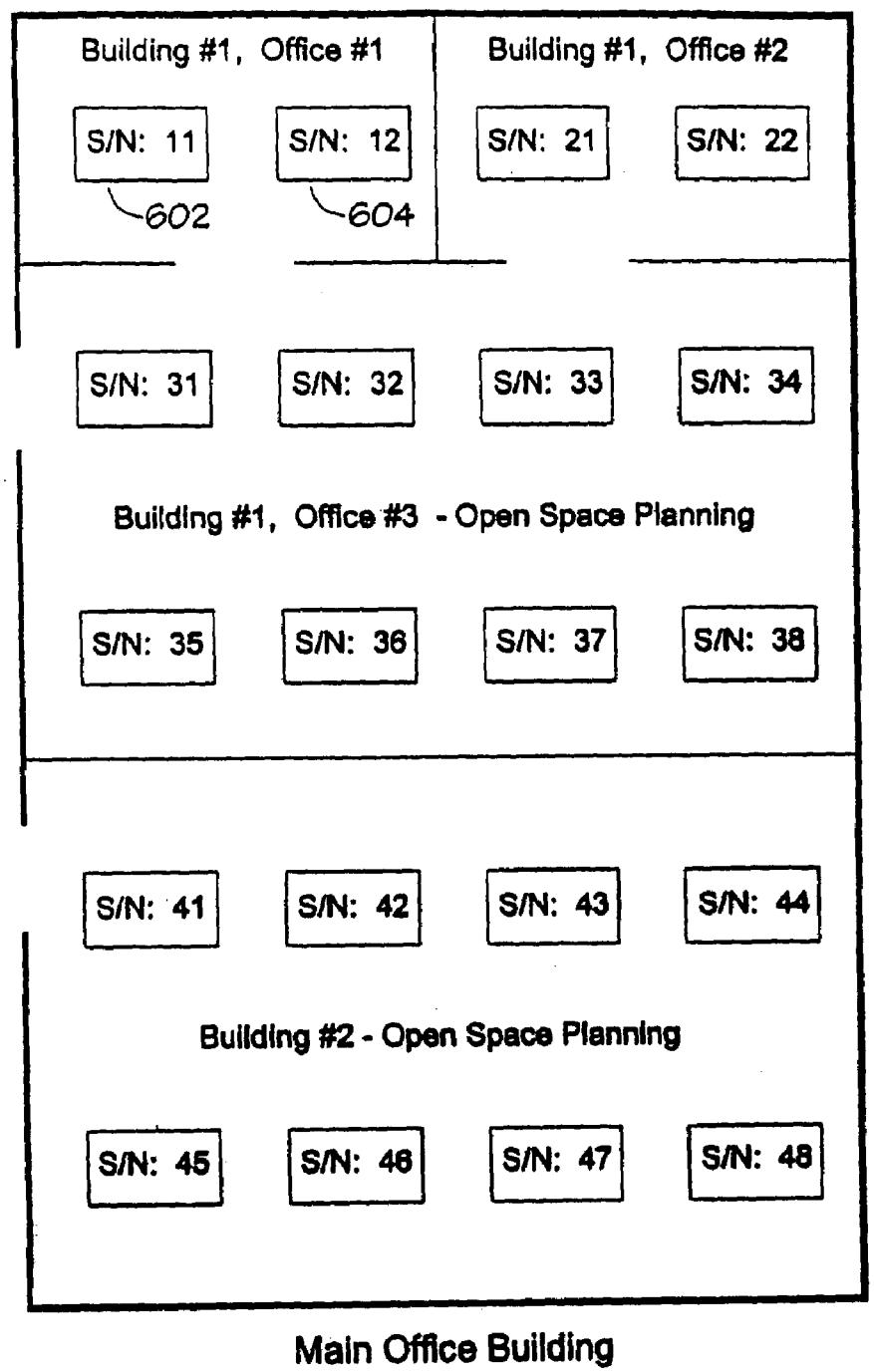
FIG. 25 is a diagram of a typical office showing fluorescent lighting locations.

FIG. 25 diagrams a building floor plan showing a possible arrangement of lighting assemblies generating the light energy anticipated to be used by the invention. Fluorescent Lamp Assembly 11 (600) and Fluorescent Lamp Assembly 12 (606) each represents one of the lighting fixture assemblies anticipated in the invention. Among the data messages being transmitted by the device installed next to, clipped-on to, the fluorescent lamp tubes, are the lighting fixture serial numbers as "11" for Fluorescent Lamp Assembly 11 (600), and "12" for Fluorescent Lamp Assembly 12 (606).

Figure 26:
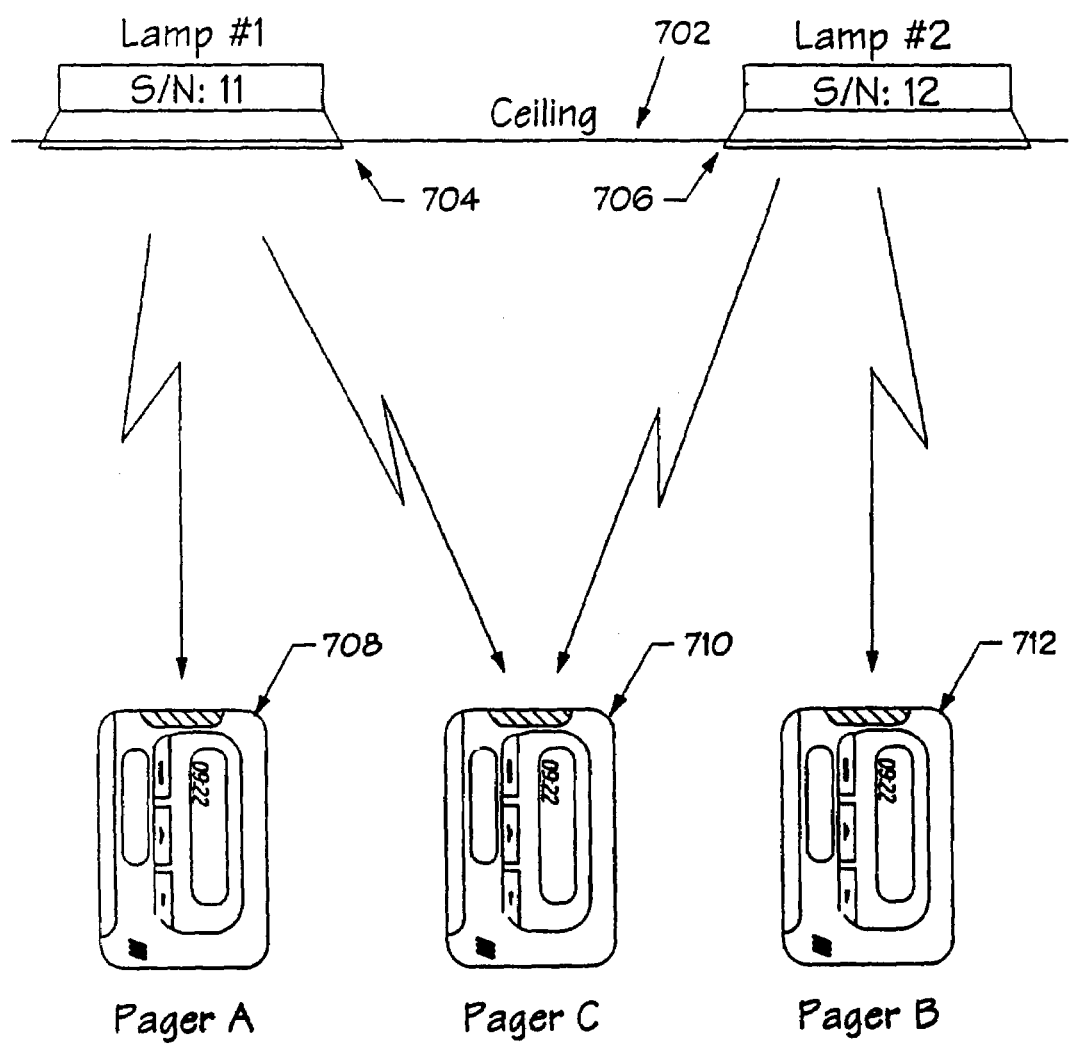
FIG. 26 is a diagram demonstrating a possible application of my invention.

FIG. 26 illustrates application of the invention. Ceiling (702) represents the ceiling of a typical office. Lamp Assembly 1 (704) corresponds to Fluorescent Lamp Assembly 11 (600) of FIG. 6, and Lamp Assembly 2 (706) corresponds to Fluorescent Lamp Assembly 12 (606) of FIG. 6.

Each of Lamp Assembly 1 (704) and Lamp Assembly 2 (706) are assemblies which house the fluorescent lamps, or other type of lamp or lamps, as described herein. The device installed in or next to Lamp Assembly 1 (704) is modulating it's transmitter output to transmit a serial number of "11". The device installed in or next to Lamp Assembly 2 (706) is modulating it's transmitter output to transmit a serial number of "12".

Pager A (708), Pager B (710), and Pager C (712), are pagers that are capable of receiving and decoding the low-power radio or optical output of the devices of the invention.

OPERATION OF INVENTION—ALTERNATIVE EMBODIMENTS

Refer to FIG. 1. The power from the AC mains of the building enters into the ballast assembly and is applied to Rectifier, Filter, and Dual-Voltage Power Supply (102) wherein it is rectified and filtered and outputted as two voltages: Low Voltage and High Voltage. The High Voltage is primarily used by the fluorescent lamp operating power supply circuitry to operate Fluorescent Tube (4).

Specifically, the High Voltage is switched by Switching Circuit (104) and applied to Transformer (108) where it is boosted and applied to the cathodes of Fluorescent Tube (4). The filaments of Fluorescent Tube (4) also derive their operating voltage from Transformer (108).

Specifically, the switched high voltage supply from Switching Circuit (104) is applied to the primary winding of Transformer (108). The higher voltage secondary winding Arc Winding (114), supplies the voltages necessary to form and maintain the arc through Fluorescent Tube (4). The output of Arc Winding (114) are coupled one each to the lower voltage secondary filament windings Heater Winding 'A' (110), and Heater Winding 'B' (112). Each of Heater Winding 'A' (110), and Heater Winding 'B' (112) generate the voltages necessary to cause the heater/filaments of Fluorescent Tube (4) to operate.

Note that the actual circuitry that is used to operate Fluorescent Tube (4) is not important to this invention in as much as any high voltage fluorescent tube circuitry can be used, so long as the switching rate can be modified under control of the controller or microprocessor circuit. Further note that the actual type of fluorescent or arc lamp that is used as Fluorescent Tube (4) is not important to this invention in as much as any arc lamp bulb will function in the invention, so long as the circuitry and specifications of the voltages and waveforms are so adjusted.

The Low Voltage is distributed to Microprocessor Control Circuit (106) and to other circuits and assemblies that are auxiliary to Microprocessor Control Circuit (106). Note that in FIG. 1 that while their are no auxiliary and/or support circuits shown, many are possible, and indeed some are discussed herein.

Microprocessor Control Circuit (106) consists of a microprocessor, clock, and other support circuitry, and also includes both operating program memory, and memory used to store data messages that are to be transmitted. The microprocessor in Microprocessor Control Circuit (106) generates signals that are used to control the switching rate of Switching Circuit (104) and thus cause the output of Switching Circuit (104) to frequency shift from one frequency to another. Therefore, the light output of Fluorescent Tube (4) frequency shifts from one frequency to another under the direct control of Microprocessor Control Circuit (106).

Note that it is not of importance to the claims of this invention as to how many optical flash rates or frequencies are generated or used, nor as to how those optical flash rates or frequencies are generated. Generation of the optical flash rates or frequencies used herein can be directly as an output of the microprocessor, or by a separate generation circuit under control of the microprocessor. The use of more than two optical flash rates or frequencies to represent more than two data symbols is anticipated by the invention.

FIG. 3 represents the main embodiment of the invention, and is an expansion of circuitry as compared to FIG. 1. In FIG. 3: Rectifier, Filter, and Dual-Voltage Power Supply (102); Switching Circuit (104); Microprocessor Control Circuit (106); Transformer (108); and Lamp and Switching Assembly (150); are as described above in the discussion of FIG. 1. Although not shown, the Rectifier, Filter, and Dual-Voltage Power Supply (102) outputs (High and Low Voltages) are distributed as appropriate and as needed to power the circuitry represented in this diagram.

As before, the actual circuitry and fluorescent or arc lamp type used within Lamp and Switching Assembly (150) is not of major significance to the invention, and many variations of such circuitry is anticipated.

Added here in FIG. 3 is Power Line Carrier Transceiver (302). Power Line Carrier Transceiver (302) is used both to receive data transmitted by a message generating device or controller that is sending message or controlling data over a carrier frequency superimposed on the AC mains, and to transmit back to said message generating device or controller data generated by Microprocessor Control Circuit (106) or data received by other means.

Also added here in FIG. 3 is Radio Transceiver (306). Radio Transceiver (306) is a radio transceiver used to monitor and receive radio signals from devices that are compatible with the invention. If so desired and configured, Radio Transceiver (306) can also transmit data or signals to any radio receiver that is in range.

The transmission of said radio transmitted data or signals is under the control of Microprocessor Control Circuit (106). The radio transmitted data can be used to control or send data to remote devices that may or may not have compatible optical receivers. Alternatively, Radio Transceiver (306) can be used to transceive zonal data to compatible devices that are within radio range, but not line-of-sight optical range. For example, a remote device that is within a brief case or purse.

FIG. 3 then, is a ballast assembly which in part generates microprocessor controlled FSK signals that are effectively amplified and applied to a fluorescent lamp, which in turn generates an optical output that contains at minimum a signature of the originating switching frequency that can be read by remote devices compatible with the invention (reference Graph Line (202) in FIG. 2A). Furthermore, the ballast assembly of FIG. 3 contains a power line carrier transceiver for sending and receiving data via the power line wiring of a building, and a radio transceiver that is capable of transceiving radio signals with remote devices.

In application, Microprocessor Control Circuit (106) contains in memory stored data which is to be routinely transmitted. As an example, and without limitation, such data may consist of a lamp assembly serial number, an alphanumeric string describing the location of the lamp assembly and therefore the location of the device receiving the lamp output, the closest telephone extension to that location, and which audible public address paging zone the user is presently in.

Data as described above is routinely transmitted under control of Microprocessor Control Circuit (106), and these data messages are repeated as often as practical.

Besides the routine data messages described above, the main embodiment is also capable of receiving other message strings ("Variable Messages") or command strings by either the receiver in Power Line Carrier Transceiver (302) or Radio Transceiver (306).

For example, it is anticipated that a remotely located controlling device ("Base Station") will generate a Variable Message that is to be broadcasted by one or more ballast assemblies. The Base Station will first format said message string, add the necessary addressing information, and then transmit said string via a power line carrier transmitter to one or more ballasts or power line fed devices that are embodiments of the invention. The addressing information contained in the formatted string is any data header or data type that facilitates the identification of which device or devices compatible with the invention are to transmit the string, how often said string is to be transmitted, which remote devices are to receive the data, as well as other control and/or formatting data that are necessary for operation of the system. Control messages are similarly formatted and processed.

In this case, if the embodiment is that of the main embodiment of FIG. 3, the formatted Variable Message is received by the receiver portion of Power Line Carrier Transceiver (302), and then passed to Microprocessor Control Circuit (106) for decoding, storing, and processing. Microprocessor Control Circuit (106) then controls Switching Circuit (104) whereby the voltages (waveforms) applied to Fluorescent Tube (4) cause it (or them, as Fluorescent Tube (4) can represent more than one fluorescent lamp tube) to discharge an optical signal that is frequency shifted (or otherwise modulated) to encode the desired message.

Once a remote device ("Target") receives the optical signal, and successfully decodes the message string, if so designed and commanded the Target will employ a low-power radio transmitter compatible with Radio Transceiver (306) of FIG. 3 to acknowledge the reception of the message, or transmit other data that is requested (such as what is the serial number of the lamp assembly it is presently near).

The transmitted radio signal from the Target is received by Radio Transceiver (306), and is decoded and passed to Microprocessor Control Circuit (106). If so designated, Microprocessor Control Circuit (106) causes the transmitter in Power Line Carrier Transceiver (302) to transmit to the appropriate Base Station.

In an all radio-wave alternative application, the formatted Variable Message generated by the Base Station is received by the receiver portion of Power Line Carrier Transceiver (302), and then passed to Microprocessor Control Circuit (106) for decoding, storing, and processing. Microprocessor Control Circuit (106) then controls Radio Transceiver (306) and transmits the appropriately formatted radio message.

Once a remote device ("Target") receives the radio signal, and successfully decodes the message string, if so designed and commanded the Target will employ a low-power radio transmitter compatible with Radio Transceiver (306) of FIG. 3 to acknowledge the reception of the message, or transmit other data that is requested (such as what is the serial number of the lamp assembly it is presently near).

The transmitted radio signal from the Target is received by Radio Transceiver (306), and is decoded and passed to Microprocessor Control Circuit (106). If so designated, Microprocessor Control Circuit (106) causes the transmitter in Power Line Carrier Transceiver (302) to transmit to the appropriate Base Station.

Therefore, in the overall view, the diagram of the main embodiment of FIG. 3 represents circuitry that can handshake and communicate with both Target devices and Base Station devices.

FIG. 4 shows a typical office floor plan where in fluorescent lamp assemblies form a quasi X-Y coordinate system. That is, while not precisely symmetrical, fluorescent lamp assemblies in offices and other facilities tend to be well distributed, so that if it is known to which assembly a person or Target is nearest, the location of said Target or person will be determined with reasonable accuracy for most applications.

In FIG. 4, Fluorescent Ballast Assembly 11 (402) and Fluorescent Ballast Assembly 12 (404) are both located in Office #1 of Building #1; while the other fluorescent ballast assemblies are not. Therefore, if Fluorescent Ballast Assembly 11 (402) is transmitting it's serial number as "11", and if a suitably designed Target device is decoding the serial number "11", then the Target device is next to or very near Fluorescent Ballast Assembly 11 (402), and most probably is within Office #1 of Building #1. Furthermore, the Target device is most probably located in the left or center of said office as viewed in the floor plan of FIG. 4.

That is, Fluorescent Ballast Assembly 11 (402) is optically transmitting that it's serial number is "11", while Fluorescent Ballast Assembly 12 (404) is optically transmitting that it's serial number is "12". Therefore, any device nearest Fluorescent Ballast Assembly 11 (402) is most probably receiving it's light signal at a higher amplitude than the output of any other lamp assembly, and therefore is decoding the serial number "11".

Note that both Fluorescent Ballast Assembly 11 (402) and Fluorescent Ballast Assembly 12 (404) in this discussion are most probably (but not necessarily) using a modulation method that facilitates a capture effect. That is, whichever light signal is received at the highest amplitude, will supply the optical data that is eventually decoded. Note however, that using timed transmissions with non-capture effect modulation is another method that would also be suitable for application to the invention, and in conjunction with received signal strength measurements could be used to further improve the accuracy of determination of location.

FIG. 5 is illustrative of one of the applications of the invention. Pager A (508) is closest to Lamp Assembly 1 (504) and therefore will decode a lamp assembly serial number of "11". If Pager A (508) is paged, it responds by transmitting an acknowledgment of the page which incorporates the decoded serial number. The transmitted acknowledgment is via an incorporated radio transmitter compatible with the Radio Transceiver (306) of FIG. 3. The ballast assembly then transmits the received pager acknowledgment to the appropriate base or controller station by way of the Power Line Carrier Transceiver (302), also of FIG. 3.

In this fashion, the appropriate base or controller station is made aware that Pager A (508), is near Lamp Assembly 1 (504), and therefore the in-building location of Pager A (508) is now known.

In similar fashion, Pager C (512) is closest to Lamp Assembly 2 (506). If Pager C (512) is paged, it responds by transmitting an acknowledgment of the page which incorporates the decoded serial number. The transmitted acknowledgment is by an incorporated radio transmitter compatible with the Radio Transceiver (306) of FIG. 3. The ballast assembly then transmits the received pager acknowledgment to the appropriate base or controller station by way of the Power Line Carrier Transceiver (302), also of FIG. 3.

In the case of Pager C (510) however, Pager C (510) may be decoding either the serial number of Lamp Assembly 1 (504) or Lamp Assembly 2 (506). Pager C (510) will decode the serial number of whichever lamp assembly the optical detector of Pager C (510) is receiving the strongest.

Alternatively, if Lamp Assembly 1 (504) and Lamp Assembly 2 (506) use an amplitude modulation scheme (or other appropriate modulation method), and their transmissions are appropriately staggered in timing windows, both of their serial numbers could be decoded and reported to the appropriate base or control station, along with received signal strengths if the pager is so equipped.

OPERATION OF INVENTION—ALTERNATIVE EMBODIMENT—MULTIPLEXED OPERATION

Figure 6:
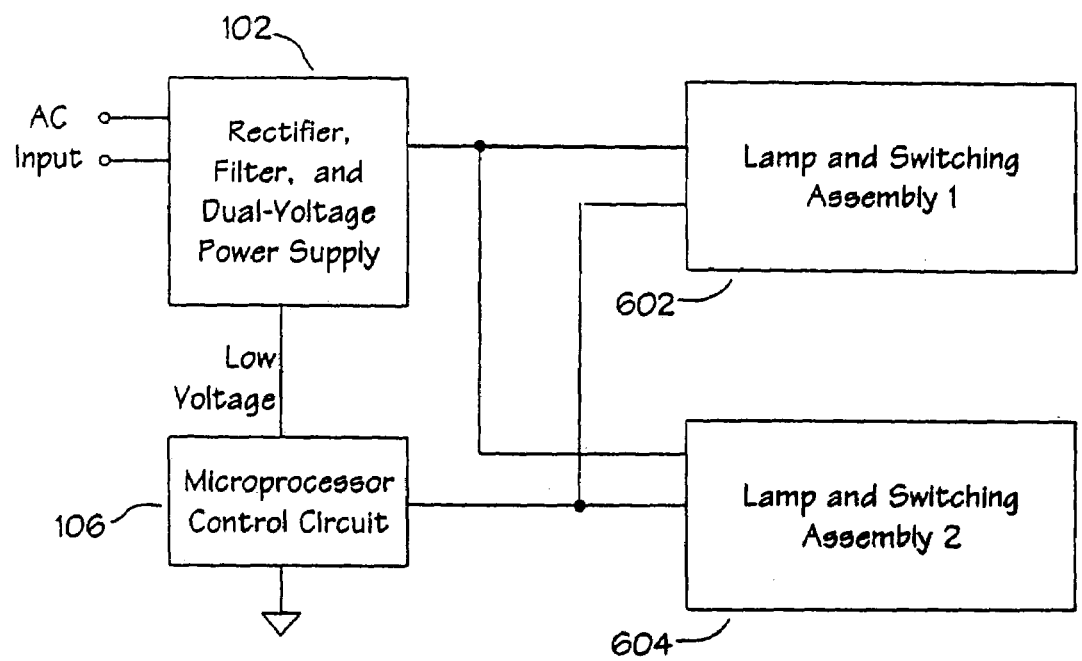
FIG. 6 is a block diagram of an alternate embodiment of the invention: frequency multiplexed optical transmission.

Refer to FIG. 6.

As discussed previously, the use of more than two optical flash rates or frequencies to simultaneously transmit or represent two or more data symbols is anticipated by the invention, and it is here in FIG. 6 that one such application is demonstrated.

As referred to before in the discussion of the main embodiment and in discussion of FIG. 1, the power from the AC mains of the building enters into the ballast assembly and is applied to Rectifier, Filter, and Dual-Voltage Power Supply (102) wherein it is rectified and filtered and outputted as two voltages: Low Voltage and High Voltage.

Also as before, the Low Voltage is distributed to Microprocessor Control Circuit (106) and to other circuits and assemblies that are auxiliary to Microprocessor Control Circuit (106). Note that while their are no auxiliary and/or support circuits shown, many are possible, and indeed, some have been discussed herein.

Microprocessor Control Circuit (106) consists of a microprocessor, clock, and other support circuitry, and also includes both operating program memory, and memory used to store data messages that are to be transmitted. The microprocessor in Microprocessor Control Circuit (106) generates signals that are used to control the switching rate of each of the Lamp and Switching Assembly (150)

Each of Lamp and Switching Assembly 1 (602) and Lamp and Switching Assembly 2 (604) represents the switching, transformer, and lamp function blocks as defined as Lamp and Switching Assembly (150) herein. That is, Switching Circuit (104), Transformer (108), and Fluorescent Tube (4), as discussed in the main embodiment, are within each of Lamp and Switching Assembly 1 (602) and Lamp and Switching Assembly 2 (604).

Each of the Lamp and Switching Assembly 1 (602) and Lamp and Switching Assembly 2 (604) are operated by Microprocessor Control Circuit (106) so as to use different optical flash rates or frequencies from each other, thus facilitating two independent means of data generation or transmission by optical energy.

For example, Lamp and Switching Assembly 1 (602) may operate at 40 kHz and 42 kHz for symbols 0 and 1 respectively, and Lamp and Switching Assembly 2 (604) may operate at 45 kHz and 47 kHz for symbols 0 and 1 respectively.

Note that it is not of importance to the claims of this invention as to how the optical flash rates or frequencies are generated or used. Generation of the optical flash rates or frequencies used herein can be directly as an output of the microprocessor, or by a separate generation circuit under control of the microprocessor.

It is important to note that the communications techniques and the devices discussed herein are not limited to voice-only or message-only communications devices. Indeed, several radio-based or optical-based data exchange systems would be greatly enhanced and improved, in both method and application, by both optical-wave means and radio-wave means used in combination. This includes general data network systems and peer-to-peer computer network systems; both local-area and wide-area; with and without servers or controllers.

A modified cellular radio-telephone, with optical modifications similar as those suggested in FIGS. 7 through 13, is used in the discussion of the operation of the main embodiment that follows.

Users of a cellular radio-telephone while outside of a private In-House system-equipped office building uses their radio-telephone in the traditional manner. The cellular radio-telephone operates, in simplified terms, in the same way that cellular radio-telephones operate and are used today. That is, while not in use, the cellular radio-telephone monitors and responds on a full-duplex radio control channel transmitted by a licensed cellular radio-telephone service provider.

The control channels bi-directionally carry information about the cellular system, data as to in-progress telephone calls, radio channel assignments, power levels, and other system operational parameters. These Public Carrier cellular systems transmit their control data from the local cell site (base station) to the cellular radio-telephone over the Forward Operational Control Channel (FOCC) as defined in EIA specification ANSI/EIA/TIA-553-1989 or later edition entitled "Mobile Station—Land Station Compatibility Specification". The radio-telephones respond and transmit their data messages to the local cell sites on the Reverse Operational Control Channel (ROCC) as also defined on the EIA Specification.

To receive a phone call, the cellular radio-telephone is paged over the radio FOCC (the frequency used for cell site-to-radio-telephone communications). The cellular radio-telephone then acknowledges receiving the page over the radio ROCC (the frequency used for radio-telephone-to-cell site communications), and then the radio-telephone notifies the user that a phone call is incoming by generating a ring signal. If the user answers the call, the cellular radio-telephone notifies the cellular system over the ROCC that the user wishes to answer the call and establish a voice link to the telephone caller.

The cellular system then uses the FOCC to assign the cellular radio-telephone an open and available full-duplex voice-channel, and then assigns the unit operational parameters such as transmitter power levels and which signals are to be used for identification purposes. Both the cell site and the radio-telephone then switch to the voice channel, and the telephone conversation then begins.

In a similar fashion, if the cellular radio-telephone user desires to place a call, the cellular radio-telephone transmits over the ROCC to the cellular system the radio-telephone's MIN (Mobile Identification Number), ESN (Electronic Serial Number), and the phone number that is desired to be called. The cellular system then uses the FOCC to assign the unit an open and available full-duplex voice-channel, unit operational parameters such as transmitter power levels, and which signals are to be used for identification purposes. The telephone system then dials the number and both the cell site and the radio-telephone switch to the assigned voice channel whereby the telephone conversation then begins.

With this invention, the operation of the cellular radio-telephone while the unit is within range of a Cooperative In-House optical system is different. The cellular radio-telephone still receives the Public Carrier cellular telephone provider's FOCC data through the radio channel, but is concurrently receiving the private In-House cellular telephone provider's FOCC data through the optical channel.

Effectively, the cellular radio-telephone now receives and responds to two Forward Operational Control Channels: one for the Public Carrier cellular system (the FOCC received by radio means); and one for the private In-House cellular system (the FOCC received by optical means).

Any optical data signal that passes through the cellular radio-telephone's Optical Sensor Window (reference 200 in FIGS. 7, 8, 11, and 12) that is within range and is within the qualifying optical carrier frequency parameters programmed into the modified cellular radio-telephone unit, is decoded and read.

If a qualifying optical signal is received, it is decoded and the data is stored in memory. The stored data is used by the cellular phone to determine if the system generating the optical data is that of the user's one or more Cooperative In-House systems. That is, the user's radio-telephone is within range of a privately operated cellular system where the user's radio-telephone has been granted access (that is, a Cooperative In-House system).

If it is determined that the system generating the optical data is not a Cooperative System, then the radio-telephone continues to decode the optical data frames in search of a system that is internally programmed as a Cooperative System.

If it is determined that the system generating the optical data is a Cooperative System, then the received and decoded optical data is used to determine what radio frequency and what transmitter power level is to be used by the cellular radio-telephone for the In-House ROCC. That is, what radio frequency should be used to acknowledge optical control signal calls and data, as well as to send status messages from the cellular phone to the private In-House system.

Alternatively, the In-House optical FOCC data may indicate to the radio-telephone that the unit's built-in optical transmitter (if so equipped) is to be used by the cellular radio-telephone for the ROCC. That is, that the acknowledging of optical control signal calls and data, as well as the sending of status and other messages from the cellular phone to the private system, is to be done optically.

All optical data received by the radio-telephone is decoded and stored. If the private In-House system desires to call the radio-telephone unit, then the unit's serial number is paged over the optical FOCC. The radio-telephone receives the page data which includes such information as radio voice-channel frequency assignments and transmitter power levels. The unit then produces an audible ring signal to the user, and switches to the assigned radio voice-channel and sends a page acknowledgment to the In-House system controller. Once the user answers the phone, an off-hook handshake is performed over the voice-channel and the In-House system connects the required audio paths and communication then begins.

In a similar fashion, if the user desires to place a call, the modified cellular radio-telephone transmits it's serial number on the radio or optical ROCC (as determined by the system). Following the transmission of it's serial number, the number the user desires to dial is transmitted.

The In-House system then responds over the optical FOCC with a page of the unit, including such information as voice-channel frequency assignments and transmitter power levels. The unit then switches to the assigned voice-channel and an off-hook handshake is performed on the voice-channel. The In-House system then completes the communications path, and the number is dialed.

Optionally, whenever the cellular radio-telephone unit is within range, the radio-telephone unit will receive In-House paging messages over the optical FOCC. The radio-telephone will act as a pager, and will notify the user of any pages addressed to the radio-telephone, and display the message on the unit's visual display.

Similarly, the In-House system can receive messages and status codes from the modified cellular radio-telephone over the optical or radio (as determined by the system) ROCC. In this way the user's status can be updated as often as desired, and received messages can be acknowledged.

In addition to the improvements and benefits the embodiments describe herein, the optical circuitry also facilitates the ability to locate any optically equipped radio unit's location to a more accurate degree, and with greater cost effectiveness, then existing technologies currently allow. Whenever a modified unit is in or near a Cooperative System, then locating that unit to the closest optical transmitter, receiver, or transceiver, is made practical.

If a specific In-House optical transmitter transmits one or more of a unique serial number, identification code, or location string, over the optical FOCC; then the reporting of the reception of this unique serial number, identification code, or location string, to the In-House system over the ROCC facilitates the locating of said radio-telephone to the service area of that specific optical transmitter.

The more In-House optical transmitters that are installed, the greater the accuracy of locating of the radio unit.

Furthermore, the use of the analyses of the received signal strengths from either the radio-telephone or In-House system optical transmitters will yield further accuracy to the location of the transmitting or receiving unit.

It is anticipated in this application that techniques herein of locating radio units and other system applications will be covered in subsequent patent applications.

DESCRIPTION OF INVENTION—ALTERNATE EMBODIMENTS—PAGERS

Figure 14:
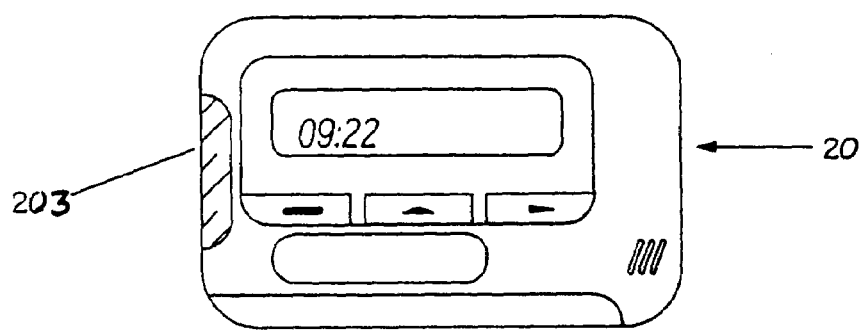
FIG. 14 shows a possible configuration and change to the outside appearance of a typical radio paging unit as suggested by the requirements of my invention.

FIG. 14 is demonstrative of an alternate embodiment of the invention. In the case of application to a pager, a Typical Pager and Housing (20) is modified to add optical circuitry to the already existing radio circuitry. The optical circuitry is interfaced to the existing microprocessor or other existing controller circuitry in such a way as to allow the reception and decoding of optical-wave messaging without interference to the ability to receive and decode radio-wave messaging.

This requires the addition of an optical sensor window to the designs of existing pager housings. FIG. 14 shows a possible placement for the required Optical Sensor Window (203) on a Typical Pager and Housing (20) as suggested by the requirements of my invention. The Optical Sensor Window (203) is placed so that when the Typical Pager and Housing (20) is carried and worn by the user, the Optical Sensor Window (203) is oriented upwards.

With the exception of the Optical Sensor Window (203), all should be taken as typical of existing one-way radio-paging products on the market today. Optical Sensor Window (203) is necessary to let light pass through the otherwise light-blocking plastic housing of the Typical Pager and Housing (20). It should be noted that in the case of a pager housing utilizing transparent plastic, as some pagers are presently offered, then no separate Optical Sensor Window (203) would be necessary. In addition, it should be noted that the Optical Sensor Window (203) may or may not embody a lens or other light focusing or directing elements, and may or may not filter the spectrum of incoming light, whether consisting of an integral assembly or a group of separate sub-assemblies.

The radio portion of the pager operates as normal, and receives the modulated radio signals transmitted on the radio channel. If the unit receives a radio page message that is addressed for the unit, the pager circuitry displays the decoded message on the pager's display and notifies the user of a message received.

As an option, an indication can be made to the user that the message originated from the radio system.

The optical portion of the pager receives modulated optical signals transmitted by one or a plurality of optical transmitters located inside or outside of an office, building, or other structure (that is, the In-House system). The pager optical circuitry decodes the received optical transmissions, and if the unit decodes a page message that is addressed for the unit, then the pager circuitry displays the decoded message on the pager's display and notifies the user of a message received.

As an option, an indication is made to the user that the message originated from the optical or In-House system.

Note that it is possible to receive both radio-wave and optical-wave transmissions at the same time without interference. Additionally note that In-House optical messaging and communications do not require licensing from the FCC or other appropriate governmental regulatory agency.

Further note that such paging services are not limited to one-way services. Indeed, the addition of either or both optical-wave transmission circuitry, and/or radio-wave transmission circuitry; to the pager device allows confirmation of message reception or even two-way message and status passing.

Figure 15:
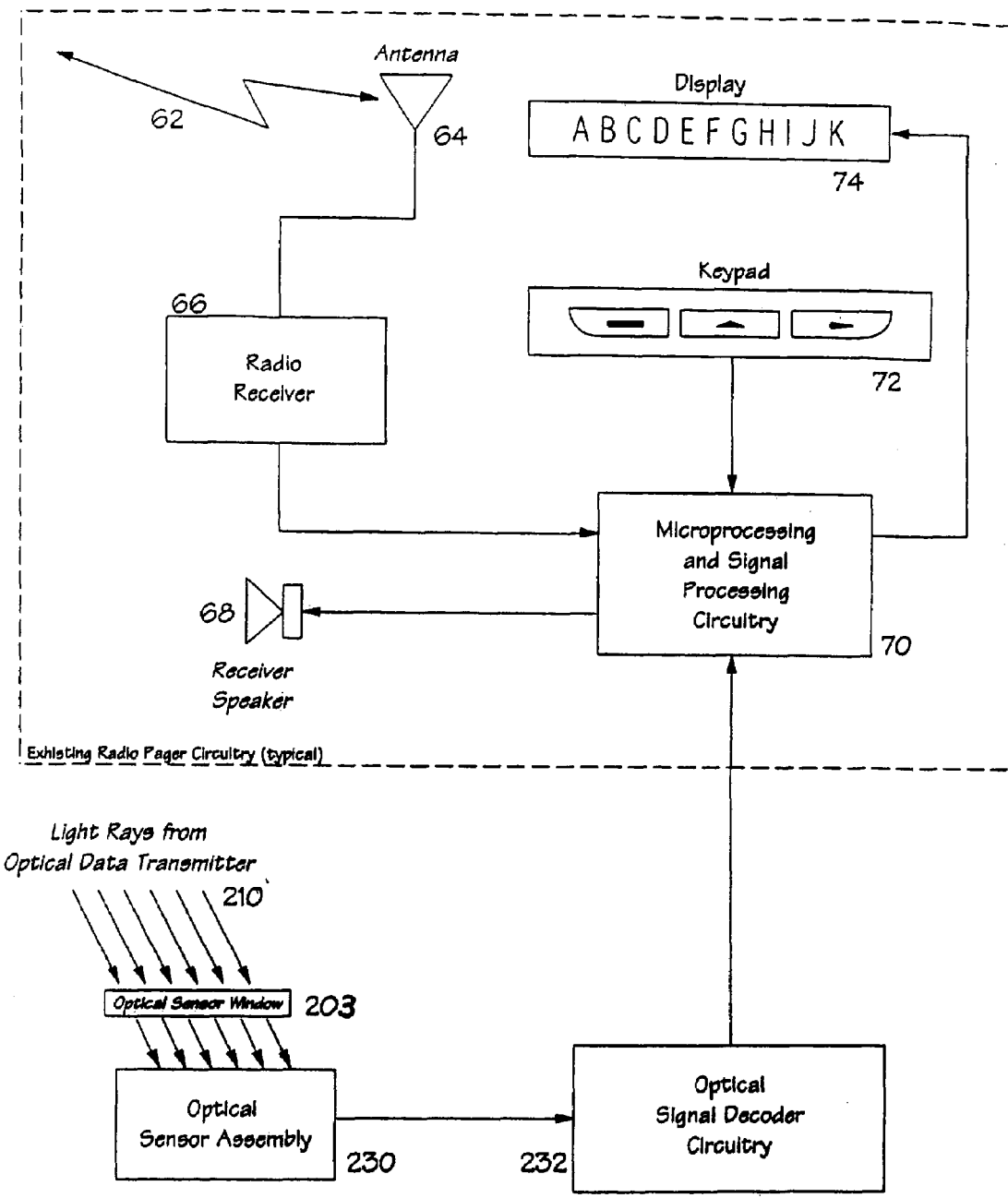
FIG. 15 is a block diagram of the circuitry suggested for the implementation of my invention in a typical one-way radio pager.

FIG. 15 is a block diagram of typical circuitry in this alternate embodiment of my invention. Optical Light Rays (210), traveling through the Optical Sensor Window (203) strikes the Optical Sensor Assembly (230), where it is converted to electrical signals which are then applied to the Optical Signal Decoder Circuitry (232).

The demodulated logic-level output is then passed out of the Optical Signal Decoder Circuitry (232) to an input port of the existing pager Microprocessing and Signal Processing Circuitry (70). The Microprocessing and Signal Processing Circuitry (70) decodes the received logic-level voltages and recovers the encoded data.

With the exception of references 203 through 232 in FIG. 15, all other references should be taken as typical of existing pager radio functional blocks, and their functions are described briefly here as follows:

Paging Radio Signals (62) are received at the Antenna (64) and are routed to the Radio Receiver (66), wherein they are demodulated and outputted. The signals are passed-on to the Microprocessing and Signal Processing Circuitry (70).

If the addressing of the decoded radio page is correct, then the Microprocessing and Signal Processing Circuitry (70) generates audio signals which are passed to the Receiver Speaker (68).

The Keypad (72) is used to control the pager. The Display (74) is used to display to the user the decoded message and indicate certain status' of the pager. It is envisioned that the Display (74) may also be utilized for such functions as displaying information about present location, present status, received messages, and other information generated or made possible by the optical system.

OPERATION OF INVENTION—ALTERNATE EMBODIMENTS—PAGERS

In the operation of the alternate embodiment of the pager, the following operational discussion is offered. A modified radio pager, with optical modifications similar as those suggested in FIGS. 9, 10, 14, and 15, is used in the discussion of the operation of alternate embodiment that follows.

A user wearing a modified pager whether in or out-of-range of a Cooperative In-House optical system will receive all paging transmissions sent by radio-wave means. That is, the wide-area service provider (most often a Public Carrier), utilizing radio communications for service to users, will provide said service to the user so long as the pager is within range of the radio system.

However, when the modified pager is within range of a Cooperative In-House optical system, the pager circuitry will decode all messages sent over the optical FOCC. Should a message be decoded that is addressed to the pager, the pager displays the message contents on the display, and the user is notified by audible tone or other method, that a paging message has been received.

As an option, if optical or radio transmitter equipped; the pager can acknowledge the reception of an optical message by either radio or optical transmission means. In addition, and in a similar fashion to the earlier cellular radio-telephone discussion, the pager could be equipped with the ability to transmit status codes and simple messages to the In-House system controller.

It is anticipated that means to indicate the source of the page (i.e. radio system or optical system), and status of optical system reception, may be provided to the user, perhaps by an icon in the display.

DESCRIPTION OF INVENTION—ALTERNATE EMBODIMENTS—TWO-WAY RADIOS

In a similar fashion to cellular radio-telephones and pagers, two-way portable radios can also be manufactured to utilize both radio-wave and optical-wave communication means. This includes any radio operating on any frequency and including Public Carrier system-operated radios (such as "Trunked" or "SMR" radios).

FIGS. 16A and 16B show a possible placement for a required Optical Sensor Window (204) on a Typical Portable Two-Way Radio and Housing (30) as suggested by the requirements of my invention. With the exception of the Optical Sensor Window (204), all should be taken as typical of existing two-way portable radio products on the market today. Optical Sensor Window (204) is necessary to let light pass through the otherwise light-blocking plastic or metal housings typical of portable radios.

In addition, it should be noted that the Optical Sensor Window (204) may or may not embody a lens or other light focusing or directing elements, and may or may not filter the spectrum of incoming light; whether consisting of an integral assembly or a group of separate sub-assemblies.

Figure 17:
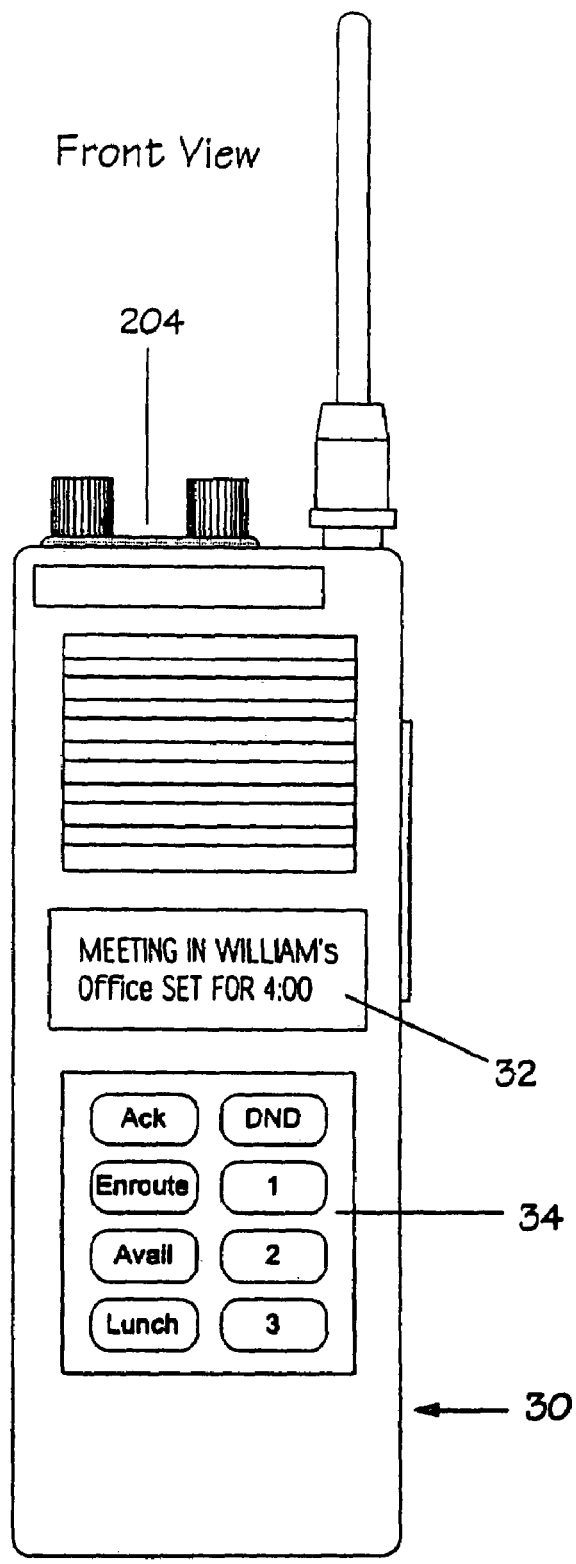
FIG. 17 shows a front view of some additional options possible and the configurations and changes to the outside appearance of a typical two-way radio unit as suggested by the requirements of my invention.

FIG. 17 also shows a possible placement for the required Optical Sensor Window (204) on a Typical Portable Two-Way Radio and Housing (30) as suggested by the requirements of my invention. In addition to the Optical Sensor Window (204), some optional modifications to the Typical Portable Two-Way Radio and Housing (30) as suggested by my invention are shown. The Optical Sensor Window (204) is necessary to let light pass through the otherwise light-blocking plastic or metal housing typical of most portable radios.

As noted above, the Optical Sensor Window (204) may or may not embody a lens or other light focusing or directing elements, and may or may not filter the spectrum of incoming light; whether consisting of an integral assembly or a group of separate sub-assemblies.

The optional Visual Display (32) is a numeric or alpha-numeric display used for presenting status or operational information about the radio or radio system, as well as for the displaying of received one-way messaging strings.

The Keypad (34) is useful for allowing the radio operator to enter personal conditions of status and availability, as well as for acknowledging received messages.

Note that both the Visual Display (32) and the Keypad (34) as shown here are elementary in representation, and should in no way be interpreted to be any limitation as to their design, operation, or configuration. The rest of FIG. 11 should be taken as typical of most existing two-way portable devices on the market today.

OPERATION OF INVENTION—ALTERNATE EMBODIMENTS—TWO WAY RADIOS

In the operation of the alternate embodiment of two-way radios, the following operational discussion is offered. A modified two-way radio, with optical modifications similar as those suggested in FIGS. 9, 10, 16A, 16B, and 17, is used in the discussion of the operation of alternate embodiment that follows.

In ways similar to the cellular and pager discussions above, a user of a modified two-way radio whether in or out-of-range of a Cooperative In-House optical system will receive all transmissions sent by radio-wave, and may transmit by radio whenever desired. That is, radio communications services will be provided to the user so long as the radio is within range of a radio system.

When in range of a Cooperative In-House optical system, the modified two-way radio could be operated in a modified trunking-radio scheme. That is, the radio could be assigned by means of the optical control channel: radio frequencies, power levels, and tone-coded or digital-coded squelch system parameters; to be used for communication with other selected radio units, or for telephone inter-connect services.

In the case of a two-way radio equipped with a visual display and a keypad, as in FIG. 17, which is within range of a Cooperative In-House optical system, the additional optical circuitry decodes all messages sent over the optical FOCC. Should a message be decoded that is addressed to the two-way radio, the radio displays the message contents on the display, and the user is notified by audible tone or other method that a paging message has been received.

As an option, the radio can acknowledge the reception of an optical message by either radio or optical (if so equipped) transmission means. In addition, and in a similar fashion to the earlier cellular radio-telephone discussion, the radio user can transmit status codes and simple messages to the In-House system controller.

It is anticipated that means to indicate the status of optical system reception may be provided to the user, perhaps by an icon in the display.

Refer to FIG. 20.

The circuitry described in FIG. 20 is installed into a housing, perhaps a clip-on housing as described and shown herein as FIG. 22.

The device is clipped-on to a fluorescent lamp. Alternatively, a lamp other than a fluorescent may be utilized, or the device may be positioned to receive sunlight. If a housing other than a clip-on housing is used, then the device can be mounted using screws or double-sided tape, or Velcro®, or any other mounting means; and then be mounted near or next to a lamp assembly, or simply positioned in such a way so as to receive sunlight.

A light source is utilized by Solar Cell (124), which in turn generates electric power.

Power from Solar Cell (124) is applied to Rectifier and Storage Cell (126) wherein it is rectified and filtered and outputted as a voltage to the remaining circuitry.

The voltage is distributed to Microprocessor (168) and to other circuits and assemblies that are auxiliary to Microprocessor (168). Note that not all of the possible ancillary, auxiliary, or support circuitry possible for inclusion with the control circuitry are shown. For example, clock-calender circuitry is certainly possible and anticipated, as is circuitry for determining and measuring the present weather conditions.

One of the functions of Microprocessor (168) is to control or generate the carrier frequency, or the modulation of the carrier frequency, or generate the modulated carrier for use by the optical or radio transmitter.

Note that it is not of importance to the claims of this invention as to how the carrier frequencies are generated, or how the modulation is accomplished, or how many data symbols or frequencies are generated or used. Generation of the frequencies used herein can be directly as an output of the microprocessor, or by a separate generation circuit under control of the microprocessor. The use of more than two logic symbols or states or frequencies is anticipated by the invention.

Typically, Memory (170) holds the data that is to be transmitted, the calibration and operating parameters for the device, and finally, the operating program for the device. Watch-Dog Timer (172) and Reset Circuitry (174) guard the device from entering a state whereby the device locks-up, enters an illegal or unanticipated program loop, or otherwise fails to function properly.

Programming Port (176) is a wire or wireless port used to program the device at the factory or in the field. Programming can include the operating program, calibration data, serial number or numbers, and other data which as an example, and without limitation, may consist of a lamp assembly serial number, an alpha-numeric string describing the location of the lamp assembly and therefore the location of the device receiving the lamp output, the closest telephone extension to that location, the floor number the user is on, which control channel of the local cellular system is to be used, and which audible public address paging zone the user is presently in.

Radio Transmitter (178) and Radio Transmitter Antenna (180) is used to transmit the data and messages to a remote device or object equipped with a compatible receiver. The remote receiver can then utilize the data or messages as appropriate, perhaps to make the area geographic location known to a user, or to provide to a user usable or interesting facts related to the user's location. It is also anticipated by the invention that some or all of this received data or messages could also be reported by the remote device or object to another remote location or device by means of higher-power radio or other communication means.

Radio Transmitter (178) may use FM, PM, or AM, or any combination thereof. Radio Transmitter (178) may be spread-spectrum based, PCS or Cellular based, SMR based, High or low powered, or be any other type or configuration of a radio transmitter.

OPERATION OF INVENTION—ALTERNATIVE EMBODIMENT

As before in the main embodiment described above, the alternative embodiments all make use of Solar Cell (124), Rectifier and Storage Cell (126), Microprocessor (168), Memory (170), Watch-Dog Timer (172), Reset Circuitry (174), and Programming Port (176).

Also as described before, these descriptions should not be used to limit the scope or application of the invention.

The difference between the alternate embodiments and the main embodiment are the use of differing means for transmission of the data or messages, and in some cases, the addition of a radio-based receiving means.

In the case of an added receiving means such as Radio Receiver (414) and Radio Receiver Antenna (416), said Radio Receiver (414) may be a spread-spectrum radio receiver, a paging radio receiver, a PCS or Cellular radio receiver, or an other radio receiving circuit or device.

A possible application of such a device that utilizes a Radio Receiver (414) and Radio Receiver Antenna (416), is in the case of an application where new or updated message strings are desired to be sent to the devices of the invention, or alternative, to turn the devices on or off, or perform some other controlling function. For example, if in the case of the use of the invention on a large campus or high-rise, suppose it is desired to transmit to all compatible receiving devices anticipated by the invention that there is presently a fire alarm condition. An alarm panel linked to a pager system radio base station could generate a pager message that is compatible with the invention. Radio Receiver (414) by way of Radio Receiver Antenna (416) could then receive and decode such a message, and then insert the message into the messages that are transmitted by either Radio Transmitter (178) or Optical Transmitter (206), as appropriate to the version of embodiment.

FIG. 25 shows a typical office floor plan wherein fluorescent lamp assemblies form a quasi X-Y coordinate system. That is, while not precisely symmetrical, fluorescent lamp assemblies in offices and other facilities tend to be well distributed, so that if it is known to which assembly a person or object is nearest, the location of said person or object will be determined with reasonable accuracy for most applications.

In FIG. 25, Fluorescent Lamp Assembly 11 (600) and Fluorescent Lamp Assembly 12 (606) are both located in Office #1 of Building #1; while the other fluorescent lamp assemblies are not. Therefore, if the device clipped-on to, or mounted next to, Fluorescent Lamp Assembly 11 (600) is transmitting it's serial number as "11", and if a suitably designed receiving device is decoding the serial number "11", then the person or object using the receiver is next to or very near Fluorescent Lamp Assembly 11 (600), and most probably is within Office #1 of Building #1. Furthermore, the person or object is most probably located in the left or center of said office as viewed in the floor plan of FIG. 25.

That is, Fluorescent Lamp Assembly 11 (600) has next to or in it a device of the invention that is transmitting it's serial number as "11", while Fluorescent Lamp Assembly 12 (606) has next to or in it a device of the invention that is transmitting it's serial number as "12". Therefore, any compatible radio or optical receiver nearest Fluorescent Lamp Assembly 11 (600) is most probably receiving it's signal at a higher amplitude than the output of any other transmitting device of the invention, and therefore is decoding the serial number "11".

Note that the devices of the invention mounted in or near both Fluorescent Lamp Assembly 11 (600) and Fluorescent Lamp Assembly 12 (606) in this discussion are most probably (but not necessarily) using a modulation method that facilitates a capture effect. That is, whichever transmitted signal is received at the highest amplitude, will supply the data that is eventually decoded by the compatible receiver. Note however, that using timed transmissions with non-capture effect modulation is another method that would also be suitable for application to the invention, and in conjunction with received signal strength measurements could be used to further improve the accuracy of determination of location.

FIG. 26 is illustrative of one of the applications of the invention. Pager A (708) is closest to Lamp Assembly 1 (704) and therefore will decode a serial number of "11". If Pager A (708) is paged, it responds by transmitting an acknowledgment of the page which incorporates the decoded serial number. The transmitted acknowledgment is via an incorporated radio transmitter compatible with the paging system. That is, the pager assembly transmits the decoded serial number and an acknowledgment back to the appropriate base or controller station.

In this fashion, the appropriate base or controller station is made aware that Pager A (708), is near Lamp Assembly 1 (704), and therefore the in-building location of Pager A (708) is now known.

In similar fashion, Pager C (712) is closest to Lamp Assembly 2 (706). If Pager C (712) is paged, it responds by transmitting an acknowledgment of the page which incorporates the decoded serial number.

In the case of Pager C (710) however, the receiver compatible with the signal transmitted by the device of the invention may be decoding either the serial number associated with Lamp Assembly 1 (704) or Lamp Assembly 2 (706). Pager C (710) will decode the serial number of whichever lamp assembly (actually the serial number of the device of the invention or whichever data or message string is designated) that the compatible receiver detector of Pager C (710) is receiving the strongest, or alternatively the last successfully decoded serial number.

Alternatively, if the devices of the invention in or near Lamp Assembly 1 (704) and Lamp Assembly 2 (706) use an amplitude modulation scheme (or other appropriate modulation method), and their transmissions are appropriately staggered in timing windows, both of their serial numbers could be decoded and reported to the appropriate base or control station, along with received signal strengths if the pager is so equipped.

CONCLUSIONS, RAMIFICATIONS, AND SCOPE OF INVENTION

Accordingly, the reader will see that the incorporation of data transmission by optical-wave means in devices used for the lighting of both working and living areas, facilitates:

The ability to utilize an existing infrastructure for the transmission of data messages.

The ability to track and locate a user or device within a facility, with greater accuracy and lower cost compared to existing technologies.

A rapidly and easily installed wireless transmission system, not requiring licensing.

The reduction of radio frequency congestion by reducing or eliminating In-House radio transmissions.

The reduction of radio frequency congestion by reducing or eliminating public carrier system paging, messaging, or control channel radio transmissions.

The command, control, and operation, of radio units in areas of high radio density, by utilizing optical means, thus resulting in greater efficiency and less interference and interruption.

The delivery of messaging and paging services by optical means, whilst an otherwise radio device is transmitting or receiving radio traffic.

Additional radio frequency re-use in a coordinated and controlled radio system.

The transceiving of user status information, messaging traffic, and other data, to a radio device using optical means.

Greater top-security and privacy communications, through the utilization of the optical means as a physically more-limited distribution channel, for the delivery of changing encryption keys and other security data and signaling, in various secure communications schemes.

A more transparent operation of PBX systems and equipment.

The operation of Public Address and audible paging systems that minimize disturbance to others.

The operation of message paging and personnel/equipment locating systems on military vessels so as to not be detectable by enemy electronic surveillance measures.

The operation of message paging and personnel/equipment locating systems on metal-constructed vessels, without the interference, reflections, cancellations, echoes, or lapse in coverage, that a radio-based system would otherwise suffer from.

Accordingly, the reader will see that the combining of optical-wave means of communications with radio-wave means of communications results in a device that:

Is not much more expensive to manufacture than a radio-wave only device.

Facilitates a private In-House communications system wherein otherwise Public Carrier system-registered devices can be used.

Allows a user to utilize one communication device for two systems of communication. For example, a user can operate their portable cellular telephone on a private In-House (e.g. an office-run) communications system, while still being accessible on a Public Carrier (e.g. a telephone company-run) communications system.

When used in a private system, facilitates the inexpensive and therefore routine use of wireless communication devices as management tools; encouraging managers to leave their office more often to roam about their facility and become more involved in day-to-day operations.

When used in a private system, facilitates rapid notification of incoming pages, messages, waiting phone calls, and equipment or production status.

Facilitates the command, control, and operation, of radio units in areas of high radio density with less interference and interruption.

Facilitates utilizing optical control means verses radio control means for the locating of radio units within a building or other structure or facility; with an accuracy better than that of other techniques already existing, and at a lower cost than the other less-accurate techniques.

Facilitates In-House messaging and communications that do not require licensing from the FCC or other appropriate governmental agency, and do not require the sharing of radio frequency resources with other near-by system providers.

Facilitates greater privacy of secure communications, when encryption techniques utilize both optical and radio means in the encoding of communications.

Facilitates the wireless and cordless remote control and operation of radio devices, or extended radio devices such as radio consoles. In this way, a user can utilize an infrared remote control device with his or her radio or console and be free to roam about without being limited to the length of a cord.

Facilitates the ability of a paging device to acknowledge reception of paging messages, and to report status and other messages back to a central control system.

Facilitates delivery of messaging and paging services by optical means, whilst an otherwise radio device is transmitting or receiving radio traffic.

Although the descriptions above and herein contain many specificities, these should not be construed as limiting the scope of the invention but as merely providing illustrations of some of the offered embodiments of the invention.

For example, the optical communications medium could be in the visible spectrum or the infrared spectrum, or even the ultra-violet spectrum, etc.; any apparatus that makes use of the invention, may incorporate a filter or filters, or other means, so as to limit the outputted light spectrum to one or more of the visible spectrum, the infrared spectrum, or the ultra-violet spectrum; or any apparatus that makes use of the invention, may utilize an arc or discharge lamp that by design limits the outputted light spectrum to one or more of the visible spectrum, the infrared spectrum, or the ultra-violet spectrum. The described optical windows can be of any shape or color, etc.; and the optical communications pathway can be bi-directional, or from portable-unit to base-stations, or from portable-unit to portable-unit (peer-to-peer communications), etc.

The parameters sent or controlled over the optical means can include (but should not be limited to,): system identification (SID), mobile identification (MIN), transmitter power level, transmit channel assignment, receiver channel assignment, signaling tone assignment, SAT assignment, multiplex slot assignment, caller ID codes, radio programming, system programming, encryption keys, individual identification code, group identification code, encryption key, frequency or channel selection, volume, squelch, push-to-talk, site or repeater selection, continuously tone-coded squelch system (CTCSS) tone selection, digitally-coded squelch (DCS) code selection, transmitter selection, receiver selection, and mute control.

The radio circuits utilized in the invention can be any radio circuit, including but not limited to radio circuits used in: standard one-way or two-way radio service, low-power (Part 15) service, Point-to-Point Radio Services, International Cellular, Domestic Public Cellular Radio Telecommunications Service, Personal Communications Services, Specialized Mobile Radio, Trunked Mobile Radio, Commercial Mobile Radio Service, Public Land Mobile Service, Air-to-Ground Radio-Telephone Service, or any radio or service presently, or in the past, or in the future, covered or defined in FCC regulations or, in the case of other governments, its equivalent; or any international system or service such as Pan-European Digital Cellular Network (GSM) and European PCS; or any radio used for digital transmission or reception, or any radio used for ISDN services.

Furthermore, the radio circuits can utilize any modulation scheme or schemes such as frequency modulation (FM), amplitude modulation (AM), phase modulation (PM), pulse-coded modulation (PCM), spread-spectrum, digital (TDMA, CDMA, etc.), analog, and so forth.

For the purposes of further understanding the broadness of the entire concept and embodiments or application of the invention or inventions anticipated by the filing of this Provisional Patent Application, I enclose examples of the devices, systems and methods I consider my invention.

A. An apparatus and method comprising:
  controlling means; and
  a radio transceiver; and
  one or a plurality of optical transceivers;
  said optical transceiver or optical transceivers operating in one or more of: the infrared spectrum, the visible spectrum, and/or the ultraviolet spectrum; and
  said optical transceiver or optical transceivers, facilitating the free-space and/or atmospheric transceiving of analog signals, including audio signals, to and/or from one or a plurality of remotely located optical transceivers; and/or
  said optical transceiver or optical transceivers, facilitating the free-space and/or atmospheric transceiving of optical data to and/or from one or a plurality of remotely located optical transceivers.

B. The apparatus and method of A, wherein said radio transceiver is a radio receiver only.

C. The apparatus and method of A, wherein said radio transceiver is a radio transmitter only.

D. The apparatus and method of A, wherein said radio transceiver is a radio-telephone.

E. The apparatus and method of A, wherein said radio transceiver uses cellular radio-telephone technology and/or pcs radio-telephone technology.

F. The apparatus and method of A, wherein one or a plurality of the operational parameters of said radio transceiver is controlled and/or modified by data received by radio means; and/or
  in any way, the character and/or the behavior of said radio transceiver is controlled and/or modified by data received by radio means.

G. The apparatus and method of A, further including the method of transmitting or re-transmitting, in whole or in part, said optical data by said radio transceiver.

H. The apparatus and method of A, wherein said radio transceiver uses cellular radio-telephone technology and/or pcs radio-telephone technology; and
further including the method of transmitting or re-transmitting, in whole or in part, said optical data by said radio transceiver.

I. The apparatus and method of A, further incorporating one or a plurality of display devices and/or one or a plurality of switch and/or keyboard devices.

J. An apparatus and method comprising:
controlling means; and
a radio transceiver; and
one or a plurality of optical transceivers;
said optical transceiver or optical transceivers operating in one or more of: the infrared spectrum, the visible spectrum, and/or the ultraviolet spectrum; and
said optical transceiver or optical transceivers facilitating the free-space and/or atmospheric transceiving of analog signals, including audio signals, to and/or from one or a plurality of remotely located optical transceivers; and/or
said optical transceiver or optical transceivers facilitating the free-space and/or atmospheric transceiving of optical data to and/or from one or a plurality of remotely located optical transceivers;
said optical data controlling and/or modifying one or a plurality of the operational parameters of, and/or the programming of, said controlling means, and/or said radio transceiver, and/or said apparatus; and/or
said optical data in any way modifying the character and/or behavior of said controlling means, and/or said radio transceiver, and/or said apparatus.

K. The apparatus and method of J, wherein said radio transceiver is a radio receiver only.

L. The apparatus and method of J, wherein said radio transceiver is a radio transmitter only.

M. The apparatus and method of J, wherein said radio transceiver is a radio-telephone.

N. The apparatus and method of J, wherein said radio transceiver uses cellular radio-telephone technology and/or pcs radio-telephone technology.

O. The apparatus and method of J, wherein one or a plurality of the operational parameters of said radio transceiver is controlled and/or modified by data received by radio means; and/or
in any way, the character and/or the behavior of said radio transceiver is controlled and/or modified by data received by radio means.

P. The apparatus and method of J, further including the method of transmitting or re-transmitting, in whole or in part, said optical data by said radio transceiver.

Q. The apparatus and method of J, wherein said radio transceiver uses cellular radio-telephone technology and/or pcs radio-telephone technology; and
further including the method of transmitting or re-transmitting, in whole or in part, said optical data by said radio transceiver.

R. The apparatus and method of J, further incorporating one or a plurality of display devices and/or one or a plurality of switch and/or keyboard devices.

S. An apparatus and method comprising:
controlling means; and
a radio transceiver; and
one or a plurality of optical receivers;
said optical receiver or optical receivers operating in one or more of: the infrared spectrum, the visible spectrum, and/or the ultraviolet spectrum; and
said optical receiver or optical receivers facilitating the free-space and/or atmospheric receiving of analog signals, including audio signals, from one or a plurality of remotely located optical transmitters and/or optical transceivers; and/or
said optical receiver or optical receivers facilitating the free-space and/or atmospheric receiving of optical data from one or a plurality of remotely located optical transmitters and/or optical transceivers;
said optical data controlling and/or modifying one or a plurality of the operational parameters of, and/or the programming of, said controlling means, and/or said radio transceiver, and/or said apparatus; and/or
said optical data in any way modifying the character and/or the behavior of said controlling means, and/or said radio transceiver, and/or said apparatus.

T. The apparatus and method of S, wherein said radio transceiver is a radio receiver only.

U. The apparatus and method of S, wherein said radio transceiver is a radio transmitter only.

V. The apparatus and method of S, wherein said radio transceiver is a radio-telephone.

W. The apparatus and method of S, wherein said radio transceiver uses cellular radio-telephone technology and/or pcs radio-telephone technology.

X. The apparatus and method of S, wherein one or a plurality of the operational parameters of said radio transceiver is controlled and/or modified by data received by radio means; and/or
in any way, the character and/or the behavior of said radio transceiver is controlled and/or modified by data received by radio means.

Y. The apparatus and method of S, further including the method of transmitting or re-transmitting, in whole or in part, said optical data by said radio transceiver.

Z. The apparatus and method of S, wherein said radio transceiver uses cellular radio-telephone technology and/or pcs radio-telephone technology; and
further including the method of transmitting or re-transmitting, in whole or in part, said optical data by said radio transceiver.

AA. The apparatus and method of S, further incorporating one or a plurality of display devices and/or one or a plurality of switch and/or keyboard devices BB. An apparatus and method comprising:
controlling means; and
a radio receiver; and
one or a plurality of optical receivers;
said optical receiver or optical receivers operating in one or more of: the infrared spectrum, the visible spectrum, and/or the ultraviolet spectrum;
said optical receiver or optical receivers facilitating the free-space and/or atmospheric receiving of analog signals, including audio signals, transmitted from one or a plurality of remotely located optical transmitters or optical transceivers; and/or
said optical receiver or optical receivers facilitating the free-space and/or atmospheric receiving of optical data transmitted from one or a plurality of remotely located optical transmitters or optical transceivers;
said optical data controlling and/or modifying the internal programming of, said controlling means and/or said radio receiver and/or said apparatus.

CC. An apparatus and method comprising:
controlling means; and
a radio transceiver; and
one or a plurality of optical transmitters;

said optical transmitter or optical transmitters operating in one or more of: the infrared spectrum, the visible spectrum, and/or the ultraviolet spectrum;

said optical transmitter or optical transmitters facilitating the free-space and/or atmospheric transmission of data and/or analog signals to one or a plurality of remotely located optical receivers or optical transceivers.

DD. The apparatus and method of CC wherein said radio transceiver is a radio receiver only.

EE. The apparatus and method of CC wherein said radio transceiver is a radio transmitter only.

FF. The apparatus and method of CC wherein said radio transceiver is a radio-telephone.

GG. The apparatus and method of CC wherein said radio transceiver uses cellular radio-telephone technology and/or pcs radio-telephone technology.

HH. The apparatus and method of CC wherein one or a plurality of the operational parameters of said radio transceiver is controlled and/or modified by data received by radio means; and/or in any way, the character and/or the behavior of said radio transceiver is controlled and/or modified by data received by radio means.

II. The apparatus and method of CC, further incorporating one or a plurality of display devices and/or one or a plurality of switch and/or keyboard devices.

JJ. Any apparatus and any method comprising:
controlling means; and
one or a plurality of radio transceivers; and
one or a plurality of optical transceivers;
said optical transceiver or optical transceivers facilitating the free-space and/or atmospheric transceiving of data and/or analog signals to and/or from a remotely located optically equipped device or optical transceiver, or to a plurality of optically equipped devices and/or optical transceivers.

KK. The apparatus and method of JJ, wherein one or a plurality of said radio transceivers is a radio receiver.

LL. The apparatus and method of JJ, wherein one or a plurality of said radio transceivers is a radio transmitter.

MM. The apparatus and method of JJ, wherein one or a plurality of said radio transceivers is a radio-telephone.

NN. The apparatus and method of JJ, wherein one or a plurality of said radio transceivers uses cellular radio-telephone technology and/or pcs radio-telephone technology.

OO. The apparatus and method of JJ, wherein one or a plurality of the operational parameters of one or a plurality of said radio transceivers is controlled and/or modified by data received by radio means; and/or in any way, the character and/or the behavior of one or a plurality of said radio transceivers is controlled and/or modified by data received by radio means.

PP. The apparatus and method of JJ, further including the method of transmitting or re-transmitting, in whole or in part, said optical data by one or a plurality of said radio transceivers.

QQ. The apparatus and method of JJ, wherein one or a plurality of said radio transceivers uses cellular radio-telephone technology and/or pcs radio-telephone technology; and further including the method of transmitting or re-transmitting, in whole or in part, said optical data by one or a plurality of said radio transceivers.

RR. The apparatus and method of JJ, further incorporating one or a plurality of display devices and/or one or a plurality of switch and/or keyboard devices.

SS. Any apparatus comprising:
controlling means; and
one or a plurality of radio transceivers; and
one or a plurality of free-space and/or atmospheric optical transceivers.

TT. The apparatus of SS, wherein one or a plurality of said radio transceivers is a radio receiver.

UU. The apparatus of SS, wherein one or a plurality of said radio transceivers is a radio transmitter.

VV. The apparatus of SS, wherein one or a plurality of said radio transceivers is a radio-telephone.

WW. The apparatus of SS, wherein one or a plurality of said radio transceivers uses cellular radio-telephone technology and/or pcs radio-telephone technology.

XX. The apparatus of SS, wherein one or a plurality of the operational parameters of one or a plurality of said radio transceivers is controlled and/or modified by data received by radio means; and/or in any way, the character and/or the behavior of one or a plurality of said radio transceivers is controlled and/or modified by data received by radio means.

YY. The apparatus of SS, further incorporating one or a plurality of display devices and/or one or a plurality of switch and/or keyboard devices.

ZZ. A remote controlled apparatus comprising:
controlling means; and
one or a plurality of radio transceivers, and/or one or a plurality of remote control units controlling one or a plurality of radio transceivers; and
one or a plurality of optical transceivers;
said optical transceiver or optical transceivers facilitating the free-space and/or atmospheric transceiving of analog signals, including audio signals, to and/or from a remotely located optically equipped device or optical transceiver, or to a plurality of optically equipped devices and/or optical transceivers; and/or
said optical transceiver or optical transceivers facilitating the free-space and/or atmospheric transceiving of optical data to and/or from a remotely located optically equipped device or optical transceiver, or to a plurality of optically equipped devices and/or optical transceivers;
said optical data controlling one or a plurality of operational parameters of said radio transceiver or radio transceivers, and/or said remote control unit or remote control units;
said operational parameters comprising an operational parameter chosen from the group of parameters: individual identification code, group identification code, encryption key, frequency or channel selection, volume, squelch, push-to-talk, site or repeater selection, continuously tone-coded squelch system tone selection, digitally-coded squelch code selection, transmitter selection, receiver selection, and mute control.

AAA Any apparatus or method comprising:
a controlling means; and
solar cell powered power supply; and
radio or optical means transmitter; and
housing;
said housing so designed as to be clipped-on to, or over a fluorescent or other lamp, or otherwise to be mounted in the near proximity of a fluorescent or other lamp, or otherwise mounted on a wall or other surface; and
said apparatus designed to be powered by light energy received from a fluorescent or other lamp bulb installed in a lighting fixture, and/or light from the sun; and said power supply having means for storage of operating energy; and said optical or radio transmitting means facilitating the transmission of digital or analog signaling or data, by means of modulating the frequency and/or phase and/or amplitude of the output of the said transmitting means.

BBB. The apparatus or method of AAA, wherein said data transmitted is or includes one or more of serial number, location data or messages, communications or computer or digital device control data or messages, communications or computer or digital device messaging data, local radio communications system data or control messages or other operating data or messaging, public carrier generated radio communications system data or control messages or other operating data or messaging, local or wide-area generated paging information, positioning or location correction factors, messages compatible with the data format or output of or operations of existing satellite positioning systems or other positioning systems or services, any distributed control system or service data, or any internally or externally generated or derived data.

CCC. The apparatus or method of AAA, wherein said modulation is one or more of, or a variation of one or more of, frequency modulation, phase modulation, amplitude modulation, frequency-shift keying modulation, phase-shift keying modulation, differential phase-shift keying modulation, quadrature phase-shift keying modulation, m-ary phase-shift keying modulation, amplitude shift keying, quadrature amplitude modulation, pulse coded modulation, differential pulse code modulation, delta modulation, single-sideband modulation, double-sideband suppressed-carrier modulation, quadrature-carrier modulation, vestigial sideband modulation, minimum-shift modulation; or any other modulating method.

DDD. Any apparatus comprising:
a controlling means; and
solar cell powered power supply; and
radio or optical means transmitter; and
housing;
said housing so designed as to be clipped-on to, or over a fluorescent or other lamp, or otherwise to be mounted in the near proximity of a fluorescent or other lamp, or otherwise mounted on a wall or other surface; and
said controlling means further comprising a data input means or method for programming or otherwise communicating with said controlling means, or altering the behavior of said controlling means, or for storing data messages too be utilized by the controlling means; and
said apparatus designed to be powered by light energy received from a fluorescent or other lamp bulb installed in a lighting fixture, and/or light from the sun; and
said power supply having means for storage of operating energy; and
said optical or radio transmitting means facilitating the transmission of digital or analog signaling or data, by means of modulating the frequency and/or phase and/or amplitude of the output of the said transmitting means.

EEE. The apparatus or method of DDD, wherein said data transmitted is or includes one or more of serial number, location data or messages, communications or computer or digital device control data or messages, communications or computer or digital device messaging data, local radio communications system data or control messages or other operating data or messaging, public carrier generated radio communications system data or control messages or other operating data or messaging, local or wide-area generated paging information, positioning or location correction factors, messages compatible with the data format or output of or operations of existing satellite positioning systems or other positioning systems or services, any distributed control system or service data, or any other internally or externally generated or derived data.

FFF. The apparatus or method of DDD, wherein said modulation is one or more of, or a variation of one or more of, frequency modulation, phase modulation, amplitude modulation, frequency-shift keying modulation, phase-shift keying modulation, differential phase-shift keying modulation, quadrature phase-shift keying modulation, m-ary phase-shift keying modulation, amplitude shift keying, quadrature amplitude modulation, pulse coded modulation, differential pulse code modulation, delta modulation, single-sideband modulation, double-sideband suppressed-carrier modulation, quadrature-carrier modulation, vestigial sideband modulation, minimum-shift modulation; or any other modulating method.

GGG. The apparatus or method of DDD, wherein said means of data input means or method includes one or more of serial data port, parallel data port, network interface data port, twisted-pair wireline data port, coaxial data port, radio receiver, radio transceiver, common carrier radio receiver or transceiver, power-line carrier receiver, power-line carrier transceiver, encoded power-line signaling, multiplexed data port, fiber optic port, optical data port, or infrared data port.

HHH. The apparatus or method of DDD, wherein said data input means or method includes modulating the light from the light source used to power the apparatus.

III. Any apparatus comprising:
a controlling means; and
solar cell powered power supply; and
optical or radio transmitting means; and
radio receiving means; and
housing;
said housing so designed as to be clipped-on to, or over a fluorescent or other lamp, or otherwise to be mounted in the near proximity of a fluorescent or other lamp, or otherwise mounted on a wall or other surface; and
said apparatus designed to be powered by light energy received from a fluorescent or other lamp bulb installed in a lighting fixture, and/or from light from the sun; and
said power supply having means for storage of operating energy; and
said optical or radio transmitting means facilitating the transmission of digital or analog signaling or data, by means of modulating the frequency and/or phase and/or amplitude of the output of the said transmitting means; and
said radio receiving means facilitating the reception of digital or analog signaling or data, by means of demodulating the frequency and/or phase and/or amplitude of the input of the said receiving means.

JJJ. The apparatus or method of III, wherein said data transmitted is or includes one or more of serial number, location data or messages, communications or computer or digital device control data or messages, communications or computer or digital device messaging data, local radio communications system data or control messages or other operating data or messaging, public carrier generated radio communications system data or control messages or other operating data or messaging, local or wide-area generated paging information, positioning or location correction factors, messages compatible with the data format or output of or operations of existing satellite positioning systems or other positioning systems or services, any distributed control system or service data, or any internally or externally generated or derived data.

KKK. The apparatus or method of Ii, wherein said modulation and/or demodulation is one or more of, or a variation of one or more of, frequency modulation, phase modulation, amplitude modulation, frequency-shift keying modulation, phase-shift keying modulation, differential phase-shift keying modulation, quadrature phase-shift keying modulation, m-ary phase-shift keying modulation, amplitude shift keying, quadrature amplitude modulation, pulse coded modulation, differential pulse code modulation, delta modulation, single-sideband modulation, double-sideband suppressed-carrier modulation, quadrature-carrier modulation, vestigial sideband modulation, minimum-shift modulation; or any other modulating method.

LLL. Any apparatus comprising:
  a controlling means; and
  solar cell powered power supply; and
  radio transmitter; and
  radio receiver; and
  housing;
  said housing so designed as to be clipped-on to, or over a fluorescent or other lamp, or otherwise to be mounted in the near proximity of a fluorescent or other lamp, or otherwise mounted on a wall or other surface; and
  said controlling means further comprising a data input means or method for programming or otherwise communicating with said controlling means, or altering the behavior of said controlling means, or for storing data messages too be utilized by the controlling means; and
  said apparatus designed to be powered by light energy received from a fluorescent or other lamp bulb installed in a lighting fixture, and/or light from the sun; and
  said power supply having means for storage of operating energy; and
  said optical or radio transmitting means facilitating the transmission of digital or analog signaling or data, by means of modulating the frequency and/or phase and/or amplitude of the output of the said transmitting means; and
  said optical or radio receiving means facilitating the reception of digital or analog signaling or data, by means of demodulating the frequency and/or phase and/or amplitude of the input of the said receiving means.

MMM. The apparatus or method of LLL, wherein said data transmitted is or includes one or more of serial number, location data or messages, communications or computer or digital device control data or messages, communications or computer or digital device messaging data, local radio communications system data or control messages or other operating data or messaging, public carrier generated radio communications system data or control messages or other operating data or messaging, local or wide-area generated paging information, positioning or location correction factors, messages compatible with the data format or output of or operations of existing satellite positioning systems or other positioning systems or services, any distributed control system or service data, or any other internally or externally generated or derived data.

NNN. The apparatus or method of LLL, wherein said modulation is one or more of, or a variation of one or more of, frequency modulation, phase modulation, amplitude modulation, frequency-shift keying modulation, phase-shift keying modulation, differential phase-shift keying modulation, quadrature phase-shift keying modulation, m-ary phase-shift keying modulation, amplitude shift keying, quadrature amplitude modulation, pulse coded modulation, differential pulse code modulation, delta modulation, single-sideband modulation, double-sideband suppressed-carrier modulation, quadrature-carrier modulation, vestigial sideband modulation, minimum-shift modulation; or any other modulating method.

OOO. The apparatus or method of LLL, wherein said means of data input means or method includes one or more of serial data port, parallel data port, network interface data port, twisted-pair wireline data port, coaxial data port, radio receiver, radio transceiver, common carrier radio receiver or transceiver, power-line carrier receiver, power-line carrier transceiver, encoded power-line signaling, multiplexed data port, fiber optic port, optical data port, or infrared data port.

PPP. The apparatus or method of LLL, wherein said data input means or method includes modulating the light from the light source used to power the apparatus.

QQQ. The apparatus or method of LLL, further including controlling means for transmitting or re-transmitting received data.

RRR. Any location determining system, or data transmission system, comprising:
  A multiplicity of devices;
  said devices comprising:
  a controller; and
  an optical-based transmitter;
  said devices powered directly or indirectly by solar cell.

SSS. Any location determining system, or data transmission system, comprising:
  A multiplicity of devices;
  said devices comprising:
  a controller; and
  a radio-based transmitter;
  said devices powered directly or indirectly by solar cell.

TTT. Any location determining system, or data transceiving system, comprising:
  A multiplicity of devices;
  said devices comprising:
  a controller; and
  an optical-based transmitter; and
  a radio-based receiver;
  said devices powered directly or indirectly by solar cell.

UUU. Any location determining system, or data transceiving system, comprising:
  A multiplicity of devices;
  said devices comprising:
  a controller; and
  a radio-based transmitter; and
  a radio-based receiver;
  said devices powered directly or indirectly by solar cell.

VVV. Any apparatus or method comprising:
  a controlling means; and
  one or more solar cells; and
  an optical or radio transmitter means; and
  a housing so designed as to be clipped-on, or over, or otherwise be mounted near or next to, a fluorescent lamp or other lighting source, or to otherwise be mounted in direct or indirect sunlight;
  said controlling means further comprising a data input means or method for programming or otherwise communicating with said controlling means, or altering the behavior of said controlling means, or for storing data messages too be utilized by the controlling means; and said apparatus designed to be powered by light energy received from a fluorescent, or other lamp bulb, or light from the sun; and said power supply having means for storage of operating energy; and said optical or radio transmitting means facilitating the transmission of digital or analog signaling or data, by means of modulating the frequency and/or phase and/or amplitude of the output of the said transmitting means; and said optical or radio transmitting means facilitating the limited area transmission of data or messages intended to be used for the purposes of determining the geographic location of a person or object by means of a compatible receiver, or for transmitting data or information to a person or object by means of a compatible receiver, said data or information including data or information that is otherwise variant by geographic area or location of the transmitter.

The application of the invention anticipates transmitting data such as:

lamp or location serial number
location data or messages
control data or messages for computing or radio devices
local radio communications system data or control messages
the re-transmission of public carrier generated radio communications system data or control messages or other operating data or messaging
local or wide-area generated paging information
positioning or location correction factors
messages compatible with the data format or output of or operations of existing satellite positioning systems or other positioning systems or services
any distributed control system or service data
any other internally or externally generated or derived data.

The application of the invention anticipates transmitting data by one or more of several optical modulation schemes, including but not limited to, frequency modulation- based schemes, phase modulation- based schemes, or amplitude modulation-based schemes.

The application of the invention further anticipates the receiving of data to be transmitted or used for programming the apparatus, or for controlling the apparatus by both hardwired means such as a serial data port, parallel data port, power-line carrier receiver, power-line carrier transceiver, encoded power-line signaling, or a wired network interface data port; or by wireless means such as a radio receiver, radio transceiver, common carrier radio receiver or transceiver, fiber optic port, optical data port, or infrared data port.

The application of the invention further anticipates its use in all types of lighting and lighting fixtures intended for use in living areas, working areas, inside of buildings, outside of buildings, in factories or plants, in single story as well as high-rise buildings, and even in parks and on streets and highways.

Further note, that the operation of the invention does not in any way depend upon modulation scheme or carrier frequency, and so application is anticipated to any and all data circuits and optical circuits without restriction. Also note that any combination of the number and type of optical receivers can be utilized with the invention.

Finally, note that within the specifications, the word "or" is used both exclusively and inclusively.

Accordingly, the scope of the invention should be determined not only by the embodiments and examples illustrated, but also by the appended claims and their legal equivalents.

I claim:

1. A system providing bidirectional communication with remote devices comprising a plurality of lamp fixtures in fixed positions, each lamp fixture having unique identification information; power lines connected to each fixture for supplying AC electrical energy for each lamp fixture; and a base station coupled to the power lines; each fixture comprising:

one or more lamps;

a power supply comprising a rectifier, a filter, and a dual voltage power supply, the power lines electrically connected to the power supply to provide AC electrical energy;

a power line carrier transceiver connected to the power lines adapted to receive a variable message including lamp fixture identification information transmitted by the base station over the power lines;

a radio transceiver;

a microprocessor control circuit having memory circuitry and programmed with lamp fixture identification information, the microprocessor control circuit coupled to the power line carrier transceiver and the radio transceiver, the microprocessor control circuit receiving the variable message from the power line carrier transceiver, the microprocessor capable of decoding the variable message, and, in response to identifying the lamp identification information and the decoded variable message, encoding a second variable message, including at least one remote device address and the identification information of the fixture, and activating the radio transceiver to transmit a radio signal with the second variable message; and the radio transceiver adapted to receive modulated radio signals from a remote device positioned to receive the second variable message transmitted by one or more radio transceivers of the fixtures, the remote device capable of decoding the second variable message encoded in the radio signal and responding to its address and the second variable message in the decoded radio signal by transmitting a second radio signal to the radio transceiver, the second radio signal including the identification information of the fixture from which the remote device received the radio signal.

2. The system as defined in claim 1 wherein at least one of the lamp fixtures includes a switching circuit, the power supply electrically connected to the switching circuit to supply high voltage electrical energy to the switching circuit, the switching circuit electrically connected to at least one lamp of the fixture to provide high voltage electrical energy to each said connected lamp; the switching circuit coupled to the microprocessor control unit, the microprocessor control circuit controlling the switching rate of the switching circuit to generate a plurality of frequencies to have the switching circuit modulate the high voltage electric energy supplied to each said connected lamp to modulate the light produced by each said connected lamp, the microprocessor control circuit capable of encoding a second variable message as an optical signal by generating a plurality of frequencies responsive to the encoded second variable message to have the switching circuit modulate the high voltage electrical energy supplied to each said connected lamp to frequency shift the light produced by each said connected lamp to generate and transmit the second variable message encoded as the optical signal.

3. The system as defined in claim 1, wherein at least one of the lamps is a gas discharge lamp.

4. The system as defined in claim 1, wherein at least one of the lamps is a fluorescent lamp.

5. The system as defined in claim 1, wherein at least one of the lamps is a metal halide lamp.

6. The system as defined in claim 1, wherein at least one of the lamps is a mercury vapor lamp.

7. The system as defined in claim 1, wherein at least one of the lamps is a sodium vapor lamp.

8. The system as defined in claim 1, wherein at least one at the lamps is a neon lamp.

9. The system as defined in claim 1, wherein each of the fixtures is capable of uniquely modulating the light generated by the fixture's lamps to generate and transmit unique optical signals.

10. The system as defined in claim 1, wherein microprocessor control circuit is capable of receiving the second radio signal from the radio transceiver and decoding the second radio signal with the second radio signal variable message, encoding a third variable message from the decoded second radio signal, and controlling the power line carrier transceiver to transmit the encoded third variable message via the power lines to the base station; and the base station is capable of decoding the third variable message, the third variable message including the identification information of the fixture receiving the second radio signal from the remote device.

11. The system as defined in claim 10, wherein the plurality of fixtures are located in predetermined locations such that the location of the remote device can be determined by the base station by monitoring the identification information of the fixture receiving the second radio signal from the remote device.

12. The system as defined in claim 1, wherein each fixture has a first lamp and a second lamp, each lamp being independently controllable by the microprocessor control circuit to modulate the light of the first lamp at a first frequency shift and to modulate the light of the second lamp at a second frequency shift different from the first frequency shift to produce different optical signals.

13. A system as defined in claim 1 including a switching circuit electrically connected to each lamp to provide high voltage electrical energy to each lamp to cause each lamp to produce light, the power supply electrically connected to the switching circuit, the microprocessor control circuit coupled to the switching circuit and controlling the switching rate of the switching circuit.

14. The system as defined in claim 13, wherein the microprocessor control circuit includes preprogrammed data that corresponds to the unique identification information of the fixture, the microprocessor control circuit, in response to the variable message from the power line carrier transceiver capable of generating switching rates to the switching circuit to modulate the light generated by the lamp in the fixture in response to the variable message and to in response to the preprogrammed data.

15. The system as defined in claim 13, wherein the switching circuit switching rate modulates the light generated by a lamp in the fixture.

16. The system as define in claim 1, wherein each lamp fixture has a unique identification information.

17. The system as defined in claim 1, wherein each radio transceiver has a unique identification information.

18. The system as defined in claim 1, wherein each remote device has a unique identification information.

19. The system as defined in claim 1, wherein the microprocessor control circuit includes preprogrammed data that corresponds to the identification information of the fixture, the microprocessor responsive to the variable message from the power line carrier transceiver activating the radio transceiver to transmit a radio signal in response to the variable message and to transmit a message in response to the preprogrammed data.

20. A method for locating a remote device, comprising:

transmitting a command signal with unique identification information for one or more lamp fixtures to a plurality of lamp fixtures;

receiving and decoding the command signal in the lamp fixtures with the unique identification information and encoding a message in a first radio signal, the first radio signal transmitted from radio transceivers in the lamp fixtures in response to the command;

receiving the first radio signal from at least one of the lamp fixtures by a movable remote device, the radio signal received by the remote device including the encoded message in the radio signal responsive to the command and including the address of the remote device and the identification information of the lamp fixture from which the remote device receives the radio signal; and transmitting a second radio signal from the remote device to the radio transceivers in the lamp fixtures with the unique identification information, the second radio signal including the identification information of the lamp fixture transmitting the first radio signal received by the remote device to thereby identify the lamp fixture.

* * * * *